United States Patent
Friedmann et al.

(10) Patent No.: US 7,124,871 B2
(45) Date of Patent: Oct. 24, 2006

(54) DISENGAGING SYSTEMS

(75) Inventors: Oswald Friedmann, Lichtenau (DE); Wolfgang Reik, Buehl (DE); Dirk Burkhart, Buehl (DE); Wolfgang Haas, Buehl (DE); Christian Scheufler, Buehl (DE); Laszlo Man, Ottersweier-Unzhurst (DE); Christoph Raber, Ottweiler-Steinbach (DE); Dirk Reimnitz, Buehl (DE); Markus Schaefer, Rheinau (DE)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 10/792,068

(22) Filed: Mar. 3, 2004

(65) Prior Publication Data

US 2004/0173429 A1     Sep. 9, 2004

(30) Foreign Application Priority Data

Mar. 3, 2003  (DE) ................ 103 09 066
Sep. 3, 2003  (DE) ................ 103 40 528

(51) Int. Cl.
  *F16D 19/00*     (2006.01)
(52) U.S. Cl. .................. 192/99 S; 192/89.24
(58) Field of Classification Search ............ 192/70.28, 192/70.29, 89.24, 93 B, 93 C, 99 A, 99 S; 74/518
See application file for complete search history.

(56) References Cited

U.S. PATENT DOCUMENTS

| 1,727,742 | A |  | 9/1929 | Athimon |  |
| 2,658,396 | A |  | 11/1953 | Christiance | 74/96 |
| 5,012,911 | A |  | 5/1991 | Kabayama | 192/89 |
| 5,501,305 | A |  | 3/1996 | Stalmeir et al. | 188/167 |
| 5,911,296 | A | * | 6/1999 | Cole et al. | 192/70.29 |
| 6,655,517 | B1 | * | 12/2003 | Cole et al. | 192/99 S |
| 6,712,189 | B1 |  | 3/2004 | Hirt | 192/84.6 |
| 2004/0026184 | A1 |  | 2/2004 | Baumann et al. | 188/72.7 |
| 2004/0262115 | A1 | * | 12/2004 | Weidinger et al. | 192/105 B |
| 2005/0029858 | A1 |  | 2/2005 | Forster et al. | 303/20 |

FOREIGN PATENT DOCUMENTS

| DE | 3019377 A1 | * | 11/1981 |
| DE | 100 46 981 |  | 4/2002 |
| FR | 1 353 241 |  | 2/1964 |
| WO | 90/14979 |  | 12/1990 |
| WO | 01/61205 |  | 8/2001 |
| WO | 03/016745 |  | 2/2003 |

\* cited by examiner

*Primary Examiner*—Saul Rodriguez
(74) *Attorney, Agent, or Firm*—Davidson, Davidson & Kappel, LLC

(57) ABSTRACT

A lever system for actuating a clutch or a brake for a vehicle, such as a motor vehicle. The actuating force for the clutch or transmission brake is changeable by displacing a fulcrum with respect to a lever. An energy storage mechanism may act at one end portion of the lever and a pressure plate of a clutch or a transmission brake may act, directly or indirectly, on the other end portion.

59 Claims, 42 Drawing Sheets

A - A

B - B

A-A

B-B

Fig. 21a
Fig. 21b
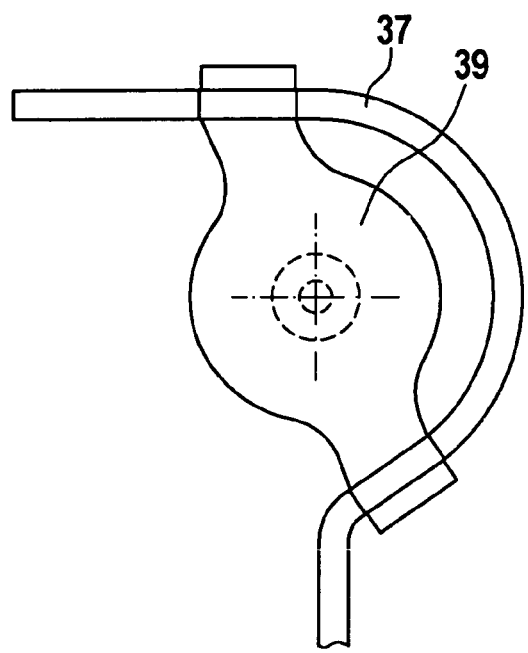
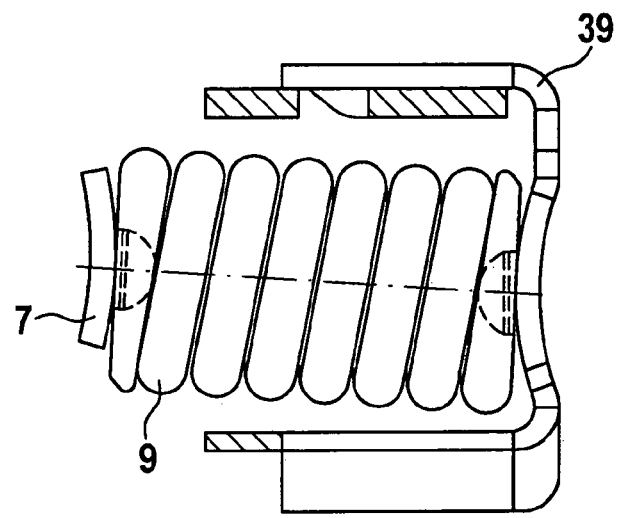

Ansicht A

DISENGAGING SYSTEMS

Priority is claimed to German Patent Application No. DE 103 09 066.5, filed on Mar. 3, 2003, and to German Patent Application No. DE 103 40 528.3, filed on Sep. 3, 2003. Both of those patent applications are hereby incorporated by reference herein.

The present invention relates to a lever system for actuating clutches or transmission brakes for vehicles—in particular for motor vehicles—where the lever system is modified to actuate the lever.

BACKGROUND

According to the known methods, clutches are actuated, for example, in a form in which a lever having unchanging lever lengths is actuated using increasing force. The clutch may also be actuated by a central disengager, however. This central disengager is driven by an electric motor, and the actuation occurs directly through a spur gear system. A disadvantage is that the electric motor must deliver its maximum torque in order to engage the clutch. To do so, it must be fully powered. In order to prevent damage to the clutch or the central disengager, after the clutch is engaged the electric motor must be braked immediately by an additional brake.

In order to be able to disengage the clutch, however, the brake must first be released again. The system is then self-opening.

Because of the high current demand of the electric motor during the disengaging process, active regulation of the contact force, and thus of the torque to be transferred, is not possible.

To actuate brakes in a motor vehicle transmission—in particular in automatic transmissions—according to the known methods, a large number of lamella or plate packs are pressed together by hydraulic force.

These known systems have a disadvantage that the requisite lever systems require a relatively large space, or in the case of hydraulic engaging systems for brake plate packs there must be a hydraulic system, which must be actuated using an additional hydraulic pump.

SUMMARY OF THE INVENTION

An object of the present invention, in consideration of the space conditions in the engine compartment, that a requisite actuating force for the clutch be regulatable with little expenditure of energy, and/or that the clutch disengage on its own if the power fails.

The present invention provides a lever system for actuating clutches (2a, 2b) or transmission brakes, in particular for motor vehicles, having a lever (7a, 7b, 10) having a first and a second side (i.e., end portion) and at least one support point (B), which at the same time is able to be a fulcrum (8, 8a, 8b), wherein by shifting the support point (B), or the fulcrum (8, 8a, 8b) the actuating force for the clutch (2, 2a, 2b) or the transmission brake is changeable. Thus the lever arms do not have unchangeable lever lengths. This is implemented in a form such that an action of force is realized on a first side of the lever arm by using an energy storage mechanism—designed for example as a disk spring. Thus the first side of the lever arm is determined by the particular position of the fulcrum. The second side of the lever arm causes the action of force on the clutch or transmission brake. In a rest position of the lever system according to the present invention, a changeable fulcrum is located at first essentially in the vicinity of the energy storage mechanism. Now if a clutch or brake is to be engaged, this fulcrum is moved toward the lever end portion whose application of force acts on the clutch or transmission brake. Hence because of the principles of the lever, at first the lever system is unable—at least substantially—to apply any force. But if the fulcrum of this lever system is far away from the energy storage mechanism, or to express it in another way, close to the end portion which acts on the clutch or brake, then great force is available to the lever system according to the invention.

But according to the present invention the lever system may also be used for actuating a clutch or transmission brake by shifting the point of action of a force along a (partial) lever axis, as is described in more detail below.

BRIEF DESCRIPTION OF THE DRAWINGS

The present invention is explained in greater detail below, with reference to the drawings, in which:

FIG. 21a–b shows a top view and side view of an energy storage mechanism mount;

DETAILED DESCRIPTION

Before describing the figures, it should be stated that the reference symbols have the same meaning throughout all of the figures. In addition, circumferential lines have been omitted from many depictions for reasons of clarity. Where they are included, this is self-explanatory from the nature of the depiction.

Figure 1:
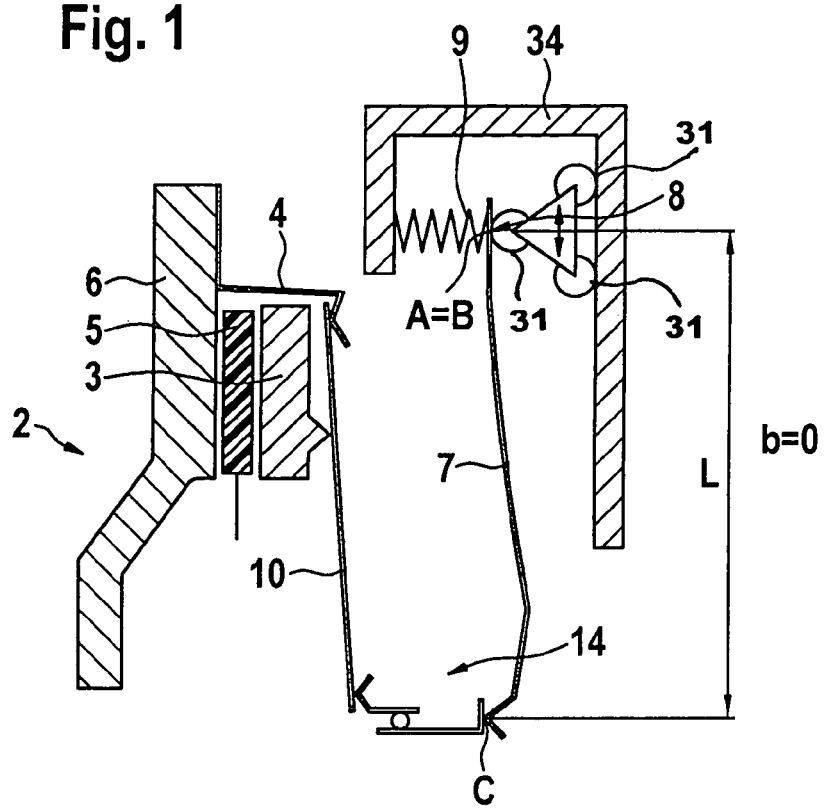
FIG. 1 shows a schematic structure of the lever system according to the present invention in combination with a clutch in the disengaged state.
Figure 2:
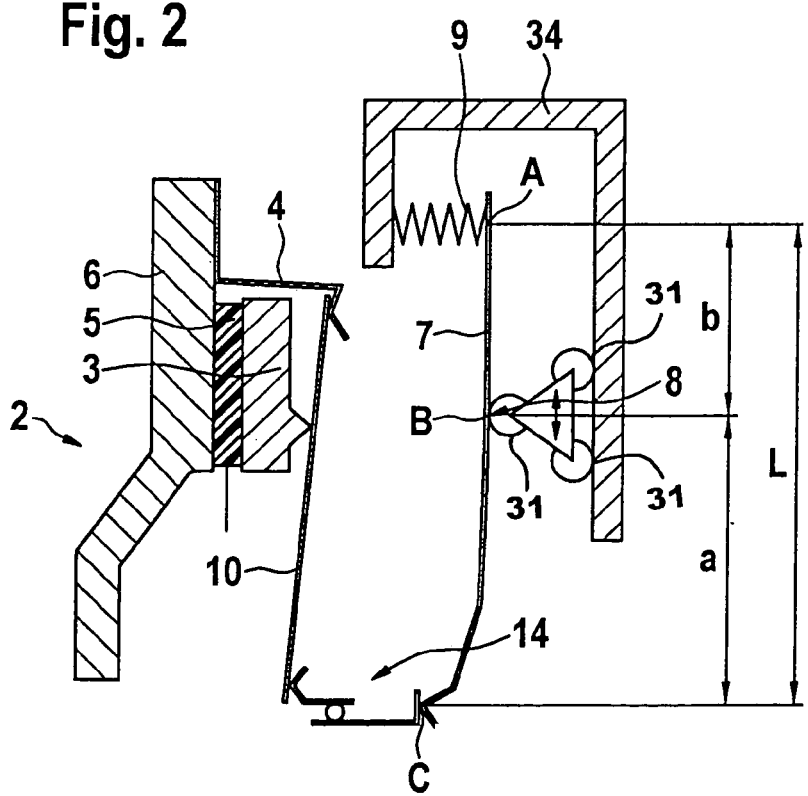
FIG. 2 shows the lever system according to FIG. 1, but in the engaged state.

In FIGS. 1 and 2, only a schematic representation of a clutch with its actuating mechanism according to the present invention may be seen. FIG. 1 shows a disengaged clutch 2, while FIG. 2 shows the same clutch 2 in the engaged state. FIGS. 1 and 2 may therefore be viewed in association. Clutch 2 is made up essentially of a counterpressure plate 6, a clutch disk 5, a pressure plate 3, a clutch cover 4 and a disengaging spring 10, which has the form here of a disk spring. An actuating mechanism for clutch 2 is made up essentially of a lever system which is positioned on a support 34. The actuating mechanism operates through its lever 7 on a thrust bearing 14 (which is positioned around a shaft 1, not shown here), thrust bearing 14 in turn acting on disengaging spring 10 of clutch 2. In the exemplary embodiments of FIGS. 1 and 2, support 34 is connected in a rotationally fixed manner with a transmission housing, not shown.

Because in clutch 2 depicted in FIGS. 1 and 2 the clutch is engaged by pressing the inner end of disengaging spring 10 to the left—where disengaging spring 10 here also represents a lever 7—this is also referred to as a "pressed" clutch. If the bearing points of disengaging spring 10, represented as a triangle, were positioned radially inside of pressure plate 3 and outside of clutch cover 4, it would be possible to reverse the effect and it would also be possible to engage the clutch by pressing disengaging spring 10. Clutches that are disengaged by pressing are therefore an object of the present invention, even if they are not shown.

In FIG. 1, an energy storage mechanism 9—designed here as a helical spring—the radial outer end of lever 7 and a movable fulcrum 8, which in this figure simultaneously coincides with bearing points A and B, are situated essentially on one action line. Since the figures in the present application represent essentially rotationally symmetrical parts which would have circumferential lines in their drawn representation, but the latter would be detrimental to clarity, these circumferential lines have been omitted from the figures in this application. For this reason, lever 7, for example, gives the impression that it is an element that is designed in the form of a bar and lies in the plane of the representation. Lever 7 may be designed as a disk having radial slots, so that individual levers 7 result, as it were. However, lever 7 may also be designed within the scope of the invention as a single radial lever 7, as illustrated in greater detail in FIGS. 13 through 17 and 33 through 36. Within the scope of the invention, it is unimportant whether the disk is partially slotted from the outside to the inside or from the inside to the outside, as long as movable fulcrum 8 is able to run toward the inside—or also toward the outside—on an essentially radial section of the disk. Lever 7 is not represented in FIGS. 1 and 2 as a straight line. From the perspective of movable fulcrum 8 it is concave shaped to a certain extent. Movable fulcrum 8 is made up of a plurality of rollers 31, which has the advantage that one of these rollers 31 is able to roll on the surface of lever 7 while another roller 31 is able to roll on the surface of support 34. If there were only a single roller 31 for movable fulcrum 8, rollers 31 on the lever surface and on support 34 would rotate in opposite directions, which would make radial shifting of this fulcrum 8 difficult.

In the described position of movable fulcrum 8, i.e., of bearing point B in FIG. 1, the tensile force of energy storage mechanism 9 acts on a lever length that equals zero. For that reason, no torque of lever 7 is able to act on disengaging bearing 14. If movable fulcrum 8 is now gradually moved radially inward (or downward in FIG. 1)—in practice that may take only a few milliseconds—the length of the lever between energy storage mechanism 9 and fulcrum 8 increases continuously. At the same time, the lever length from fulcrum 8 to its support point on disengaging bearing 14 becomes shorter. The shift of fulcrum 8 or support point B causes a change in the force on disengaging bearing 14 according to the formula $$F_G = F_F \frac{b}{a}$$

$F_G$=total force
$F_F$=spring force
a=spacing of fulcrum 8, i.e., from the disengaging bearing
b=spacing of fulcrum 8, i.e., from the effective spring force It can be seen from this equation that the closer fulcrum 8, i.e., support point B, moves to thrust bearing 14, the greater the disengagement force becomes.

Finally, in FIG. 2 movable fulcrum 8, i.e., support point B, has arrived at its radially inner position. Here a maximum moment of lever 7 is exerted on disengaging bearing 14 (see equation). In combination with disk spring 10 (disengaging spring), which for its part represents a lever system, the contact force on pressure plate 3 may be increased even more by this additional lever transmission.

The disk spring must have a greater force than the maximum contact force, so that there is always a minimum force present on rollers 31 at the outer support point in order to prevent the entire arrangement from spinning (the smallest contact diameter of rollers 31 is always greater than the support diameter to the clutch).

Because of the concave shape of lever 7, it is possible to shift movable fulcrum 8 radially without it having to overcome a "gradient." This has the advantage that shifting movable fulcrum 8, i.e., support point B, may also be accomplished with little expenditure of energy. Because of the concave shape of lever 7 (i.e., the concave shape of individual lever-shaped tongues of a disk spring 10), the tangent at the contact point of concave lever 7 is substantially parallel to the radial path of movable fulcrum 8, i.e., support point B.

Figure 3:
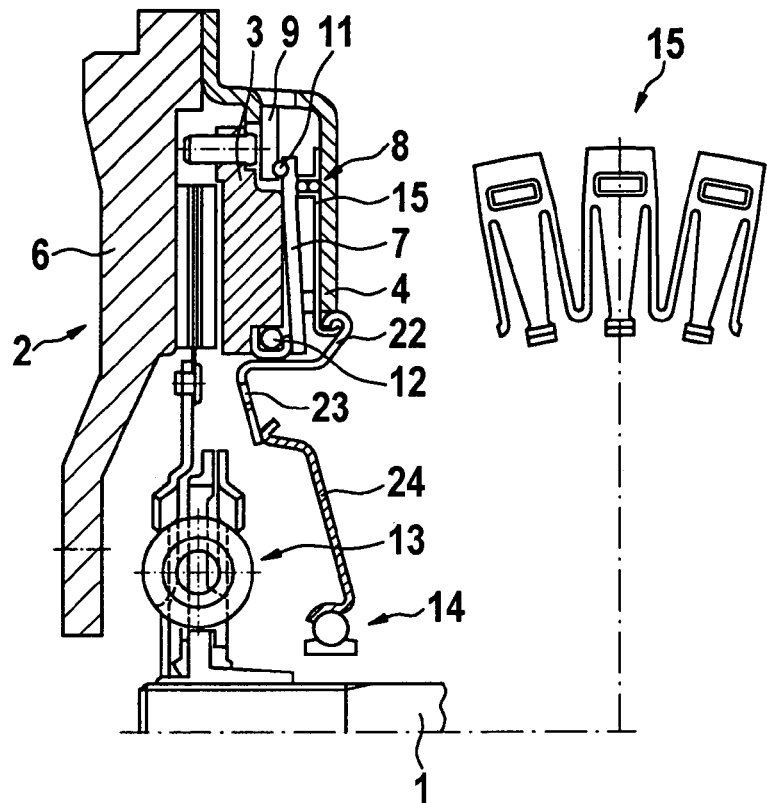
FIG. 3 shows a disengaged clutch with a meander spring for shifting the fulcrums.
Figure 4:
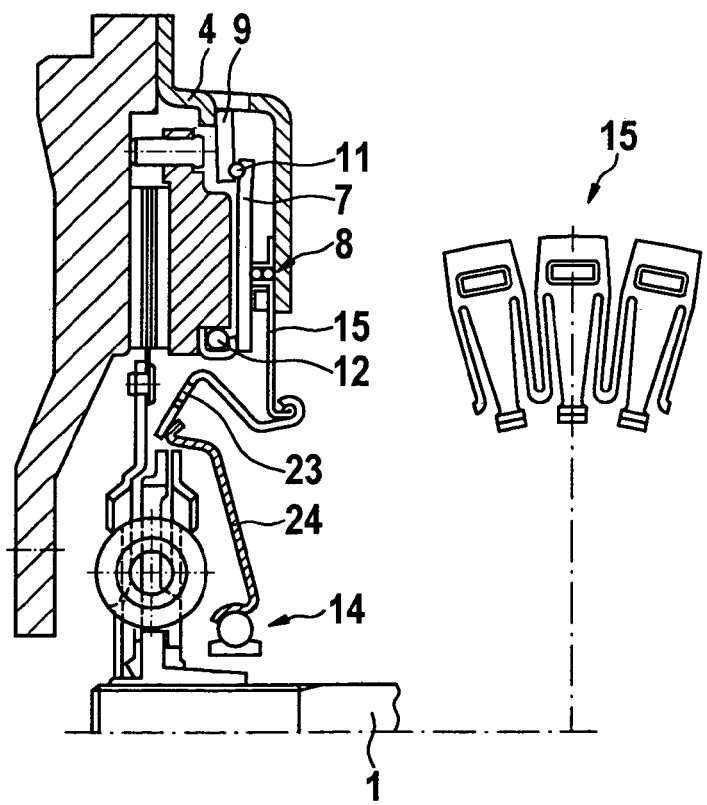
FIG. 4 shows the lever system as in FIG. 3, but in the engaged state.

FIGS. 3 and 4 show an embodiment of the principle of FIGS. 1 and 2. FIGS. 3 and 4 may again be considered in combination here, because FIG. 3 shows a disengaged clutch, while FIG. 4 shows an engaged clutch. In addition, clutch 2 is equipped with a torsion damper 13, which minimizes engine rotational irregularities in the transmission.

The clutch cover of clutch 2 has stamped indentations on which an energy storage mechanism 9—here in the form of a disk spring—is supported. The disk spring is under tension here, so that it forms essentially a flat ring. Between the energy storage mechanism and lever 7 at the upper end of the lever there is a radially fixed fulcrum 11. This fulcrum 11 is constructed for example as a wire ring bearing. While this fulcrum 11 does permit lever 7 to swivel in the plane of the depiction, it does not permit any radial displacement. On its inner surface—i.e., facing pressure plate 3—clutch cover 4 has a flat bearing surface. A meander spring 15 rests against this bearing surface. In addition to FIG. 3, this meander spring is also shown again in a section of its top view. In the upper—i.e., the outer—ends this exemplary embodiment has rectangular windows in which cylindrical rollers (rollers 31) are positioned in pairs, one above the other. The inner ends of this meander spring 15 have a type of hook, with which they form a mechanical connection with a special disk spring 22. Because of the choice of representation, in which no circumferential lines are shown, this disk spring 22 appears to be made of a gooseneck-shaped wire. The same confusion could arise concerning a disengaging dish 24, which is in operative connection with disengaging bearing 14. But if one keeps in mind that both disk spring 22 and the disengaging dish—as the very name says here—are dish-like elements, the manner in which these components work becomes clear more quickly. Disk spring 22 is characterized by the fact that it is partially slotted, both from its outer diameter approximately to its center and from its inside diameter in the direction of the outside diameter. In the present exemplary embodiment there is a ring-shaped, non-slotted area, located approximately in the inner third of disk spring 22. According to the rules of the theory of strength of materials, this non-slotted, ring-shaped area of disk spring 22 has a neutral axis 23. Now if disk spring 22 is subjected to the effect of a force toward the left in its inner diameter area, the unslotted, ring-shaped and simultaneously conical area of the disk spring must first of all "be pressed flat." If this flat-pressed state is exceeded, a conical shape again attempts to form, causing the motion of disk spring 22 to continue. The described action of force on disk spring 22 consequently results in shape-changing work that corresponds to the bending, because circumferential tension or compression forces form diametrically to the ring-shaped neutral axis. In the described elastic deformation of disk spring 22, the diameter of the neutral axis is not changed, but the ring of the neutral axis shifts axially to the left. The outer tongues of disk spring 22, which are formed by the outer slots, execute a vigorous swiveling motion around the neutral axis. Since these outer ends of disk spring 22 at the same time also engage the inner hooks of meander spring 15, the meander spring is pulled radially inward. This change in position of meander spring 15 is therefore possible because the individual segments of the meander spring are connected with each other by thin bridging links. In the right half of FIG. 4 one can see clearly how these links are moved closer together by the "inward pull of meander spring 15," so that it is possible for meander spring 15 to have both a smaller inside and outside diameter without the individual segments of meander spring 15 impeding each other. The radial motion of meander spring 15 causes movable fulcrum 8 to shift closer to shaft 1. Since movable fulcrum 8 is made up of two roller bearings positioned one above the other, when this fulcrum 8 moves there are no significant frictional losses, since beneficially the directions of rotation of the roller on lever 7 and the roller on the inside of clutch cover 4, as well as the rotational movement of the rollers with respect to each other, represent rolling on top of each other.

Once fulcrum 8 has been displaced radially toward the inside, in this case lever 7 presses against a wear readjustment device 12 that is located on pressure plate 3. The lever arm between fulcrum 8 and fixed fulcrum 11 then represents a relatively great length, so that energy storage mechanism 9 is able to introduce the force which it contains into lever 7 through fulcrum 11, and the clutch is engaged. If the clutch is to be disengaged again, all that is necessary is to reverse the sequence of motions.

Figure 5:
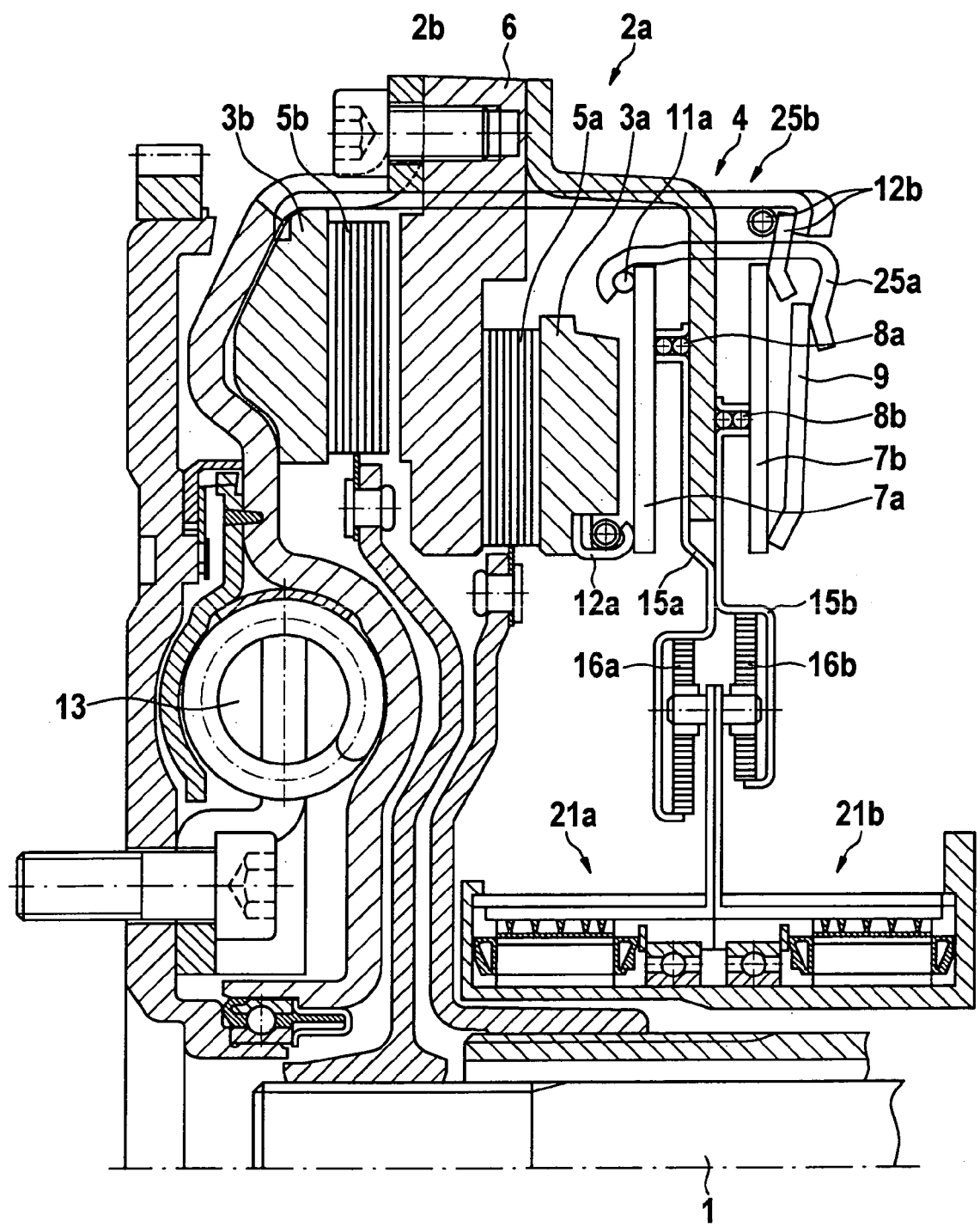
FIG. 5 shows a double clutch with two meander springs, which are adjustable using two electric motors.

FIGS. 5 through 8 each show a double lever system according to the present invention, in combination with a double clutch. In the double clutches in FIGS. 5 through 8, counterpressure plate 6 is centered between clutch disks 5a, 5b and between pressure plates 3a, 3b. Counterpressure plate 6 is connected in a rotationally fixed manner with a part of the housing of the double clutch. Clutch cover 4 is also connected with counterpressure plate 6, and hence with the housing of the double clutch. In FIG. 5, servomotors 21a, 21b are designed as starter-generators. The outer shell of servomotors 21a, 21b—usually called the stator—is of rotatable design here, so that the term stator—i.e., stationary part—is unsuitable here, and therefore the neutral term shell is used. In other words: the inner shell of servomotors 21*a*, 21*b* is non-rotationally connected to the non-rotating transmission body through a suitable mechanical bridge. Electric power is also supplied (not shown here) through this non-rotating part of servomotors 21*a*, 21*b*. An arm extends radially outward from each of servomotors 21*a*, 21*b*, a transverse axis with a roller being located at the end of each arm. The pin of servomotor 21*a* engages a radial spring band actuator 16*a*. This spring band actuator 16*a* (the same also applies to spring band actuator 16*b*) is made for example of a spirally wound spring (preferably made of metal), which has at least one of its ends connected to a meander spring in order to prevent this spring band actuator 16*a* from slipping in meander spring 15*a*. Since meander spring 15*a* (the same also applies to 15*b*) is connected in a rotationally fixed manner to clutch cover 4, when the shell of servomotor 21*a* does not rotate the result is a combing through of the pin in the layers of spring band actuator 16*a*, while the latter is either pulling the meander spring 15*a* inward radially or pressing it outward, depending on the direction of rotation of the double clutch and on the direction of winding of spring band actuator 16*a*. This results in a displacement of the radially movable fulcrum 8*a*. Lever 7*a* assigned to fulcrum 8*a* presses on a wear readjustment device 12*a* and a radially fixed fulcrum 11*a*. There is a flow of force in turn from fulcrum 11*a* to energy storage mechanism 9 via a clamp 25*a*. This energy storage mechanism 9 in turn acts on lever 7*b*, fulcrum 8*b* and lever 7*a*. It is a special characteristic in FIGS. 5 through 8 that in the double clutches shown there, and the lever systems according to the present invention that are also present in duplicate, there is only one energy storage mechanism 9 in each case, which is responsible for both lever systems, however.

Clamps 25*a*, 25*b* and their penetrations through the other parts (for example counterpressure plate 6 or clutch cover 4) can hardly be portrayed correctly without additional sectional drawings or additional views. For that reason, hatching and the depiction of penetrations is dispensed with here in some cases, so as to not further detract from the overall view.

Clamp 25*a* joins the two lever systems 7*a* and 7*b* with each other, while clamp 25*b* produces the operative connection from the lever systems to pressure plate 3*b*. Between the right end of clamp 25*b* and the outer end of lever 7*b* there is a provision for a wear readjustment device 12*b*, which acts on clamp 25*b* through a ramp ring and an axially serrated inner side.

In FIGS. 1 and 2 a thrust bearing 14 is necessary, because a rotationally fixed disengaging system, i.e., a rotationally fixed lever system, acts on rotating parts of clutch 2, and consequently relative rotary motions must be compensated for. To maintain the diameter for disengaging bearings, the flow of force is guided to the vicinity of the shaft diameter, and from there again to the actual pressing areas. This makes it possible to implement a small thrust bearing 14. If brakes are implemented, more precisely transmission brakes—for example in an automatic transmission—then rotating brake disks are braked first by pressure plates, which are rotationally fixed with respect to the housing (the counterpressure plate is already fixed with respect to the housing). But because the pressure plate is rotationally fixed here, it is possible to use a mechanism that is attached directly to the transmission housing to act directly on the pressure plate, which is also rotationally fixed, without need of a thrust bearing. The actuation of the double clutches from FIGS. 5 through 7 is therefore advantageous, because no thrust bearing 14 is needed here either.

When servomotor 21*b* is actuated using spring band actuator 16*b* and meander spring 15*b*, pressure plate 3*b* is moved. If meander spring 15*b* and its fulcrum 8*b* are moved radially far outward, pressure plate 3*b* then presses against clutch disk 5*b* and thus against counterpressure plate 6. But if the right clutch half is to be engaged—that is, pressure plate 3*a* is moved against the counterpressure plate—then in this case radially movable fulcrum 8*a* must be moved radially inward.

It was already indicated that the relative movement of the pins in spring band actuators 16*a* and 16*b* is responsible for the disengagement and engagement of the clutch halves. In order to not cause any shifting of fulcrums 8*a* and 8*b*, it is therefore necessary for the outer ring of servomotors 21*a*, 21*b* to rotate at the same speed as the double clutch. A radial displacement of meander springs 15*a*, 15*b* may thus occur by stopping the outer shell of servomotors 21*a*, 21*b*, or may also be brought about by increasing their speeds. A factor in actuating a clutch here is not only the direction and speed of rotation of the clutch and the direction and speed of rotation of servomotors 21*a*, 21*b*; but also, the positioning movements also depend on whether the particular spring band actuator is coiled "to the left" or "to the right."

Figure 6:
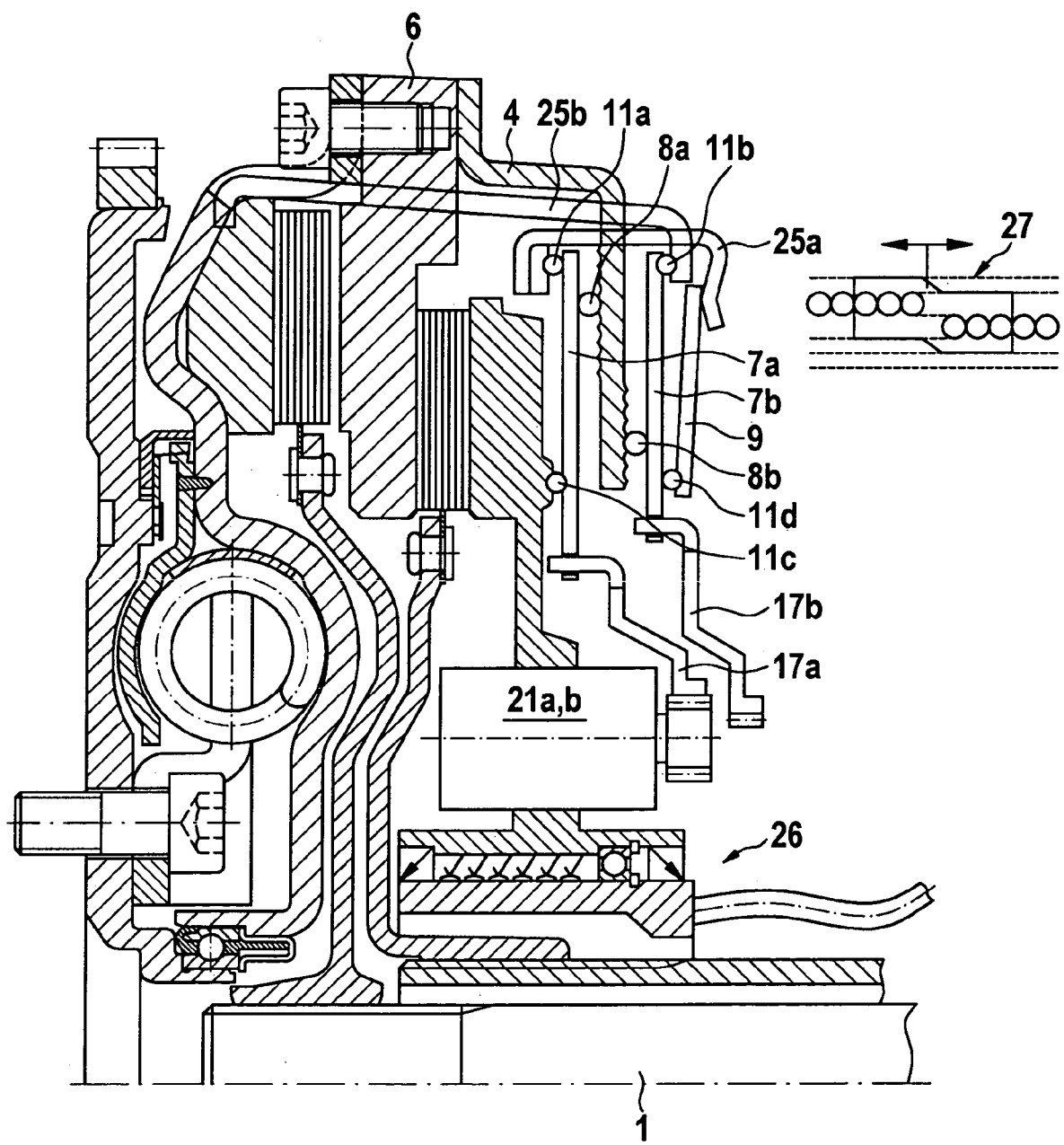
FIG. 6 shows a double clutch with eccentrically positioned servomotors for adjusting the fulcrums on full spirals.
Figure 7:
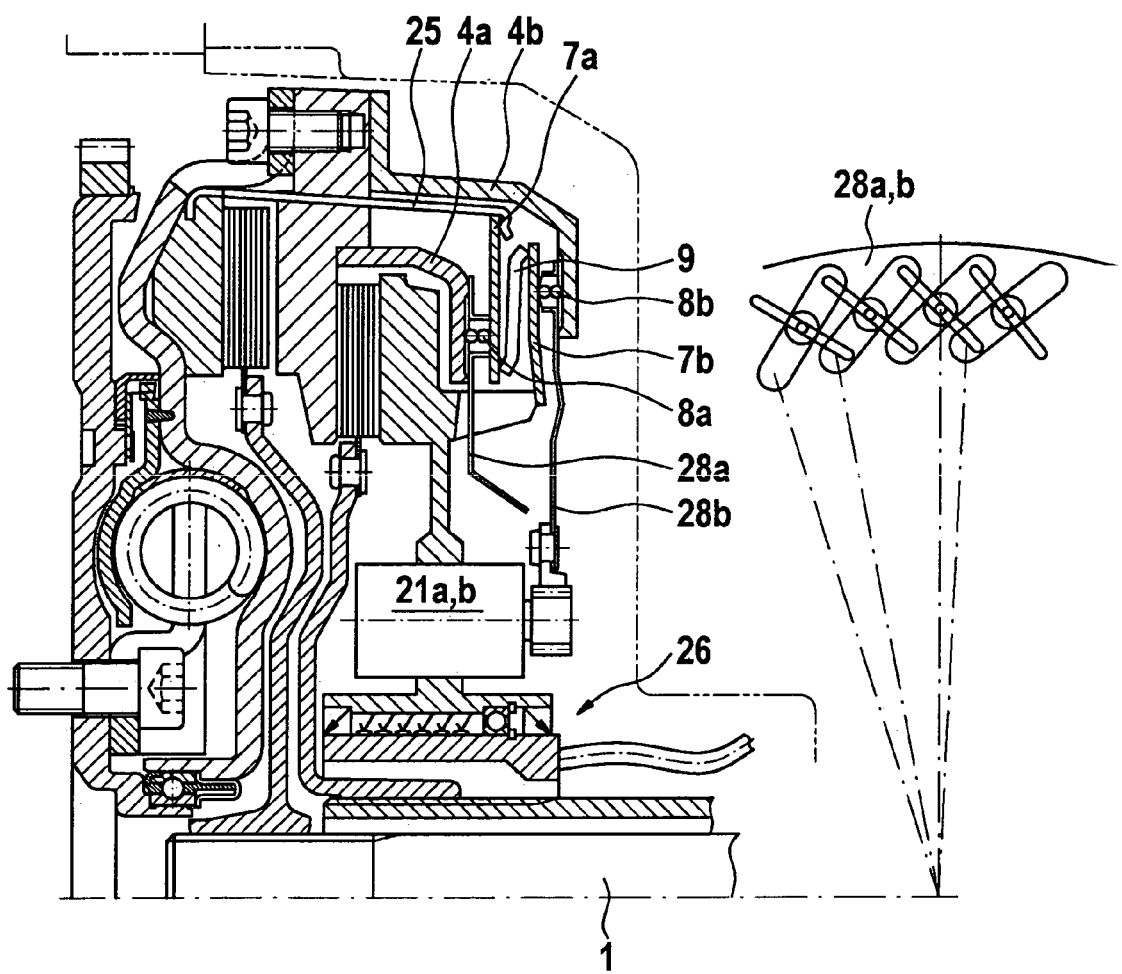
FIG. 7 is the same as FIG. 6, but with the fulcrums adjusted in spiral segments.

FIG. 6 shows another embodiment of the present invention. In this exemplary embodiment there are spiral-shaped grooves on both the inside and the outside in a plane that extends radially and runs rotationally synchronously with counterpressure plate 6. In this exemplary embodiment, this plane is advantageously formed by clutch cover 4. This has the advantage that as a result no additional component is needed. Levers 7*a*, 7*b* are mounted here in a special way; in addition to points 8*a*, 8*b* they are supported on fulcrums 11*a* through 11*d*, which are in the form of roller bearings 31. These roller bearings 31 each run in ring-shaped grooves. For example, if fulcrum 8*a* for lever 7*a* is to be shifted, disk-shaped lever 7*a* is rotated by a setting collar 17*a* (constructed here as an internal ring gear). On its inside diameter setting collar 17*a* has teeth which mesh with a pinion of an eccentrically positioned servomotor 21*a*. Due to the eccentric position of servomotor 21*a* it is unable to be connected directly to its power supply, because the connecting cable would wrap around shaft 1. This servomotor 21*a* is therefore electrically connected to the rotationally fixed surrounding by a current transfer device 26. This current transfer device 26 is made up essentially of sliding contacts that produce an electrical connection between a fixed and a rotating part of the current transfer device (in the drawing servomotor 21*b*, which belongs to setting collar 17*b* and hence to lever 7*b*, is behind servomotor 21*a*, and is therefore not visible in FIG. 6). Now for example if fulcrum 8*a* for lever 7*a* is to be moved radially inward, disk-shaped lever 7*a* is driven depending on the winding direction of the spiral-shaped groove. During this adjustment, lever 7*a* runs simultaneously on its fulcrums 11*a* and 11*c*. But since the grooves of fulcrums 11*a* and 11*c* are ring-shaped, i.e., circular, this produces no change in their radial position. Energy storage mechanism 9 for lever 7*a* does not act directly in the exemplary embodiment of FIG. 6. Clamp 25*a* is first required to establish an operative connection with energy storage mechanism 9. It can also be seen clearly in the exemplary embodiment of FIG. 6 that this energy storage mechanism 9 is also responsible simultaneously for lever 7*b*. Levers 7*a* and 7*b* of FIG. 6 are not slotted, at least in the areas traversed by fulcrums 8a, 8b, 11a, 11b, 11c, 11d, since otherwise the spirally or circularly moving balls could drop into the corresponding slots.

Because the balls are only capable of bearing on points, and because they move circumferentially, it is not sufficient in the exemplary embodiment of FIG. 6 to use a limited number of roller bodies, as may be done for example in connection with a meander spring 15. Here an entire ring of balls 31 should be positioned on the circumference of at least one spiral and on the circumference of bearings 11a, 11b, 11c, 11d. If balls 31 of a spiral which represent for example fulcrum 8a are located in the inside diameter of the spiral, this spiral line formed of balls 31 forms an angle of about 360°. But if on the other hand fulcrum 8a for example has been shifted radially very far outward, the spirally positioned balls form an angle smaller than 360°. To prevent balls 31 from becoming distributed unevenly over the spiral impressed in clutch cover 4, for example due to undefined load conditions, it is advantageous to have both ends of this "spiral of balls" fixed by a guide fork 27. This guide fork 27 is shown as a separate small figure in FIG. 6, where this figure reproduces the situation of the "spiral of balls" that exists at the radially inner position of fulcrum 8a. The inner and outer ends of the spiral of balls push into the ends of the fork slots of guide fork 27. The double arrow at guide fork 27 is not intended to indicate that balls 31 are pushed onto guide fork 27 by force, but that guide fork 27 moves in both these directions depending on the direction of adjustment. If the "spiral of balls" is on an outer diameter of the spiral-shaped impressed groove, balls 31 spread over a larger spiral circumference, so that the left, inner ball and/or the right, outer ball are no longer in the fork slots. This is not detrimental, however, because on the whole balls 31 are located essentially on only one course of the spiral, so that a ring-shaped fulcrum 8a results. But because of guide fork 27 no balls 31 are able to reach a spiral lying further inward or further outward, which could result in undefined bearing conditions.

FIG. 7 shows a combination of FIGS. 6 and 5. Servomotors 21a and 21b are again positioned eccentrically with respect to shaft 1. Movable fulcrums 8a and 8b are shifted by a gate 28a, 28b. Congruent spiral segments are formed in clutch cover 4a, 4b and in levers 7a, 7b. It can be seen from FIGS. 7a and 7b that disk spring 10, which according to FIG. 7b may also function as lever 7, may be furnished equally well with indentations (cages 61, beading 62), with which the rocking curve for rollers 31 is formed at the same time. This design results to a large extent in compensation for the contact force. Only slight shifting forces are needed in comparison to the contact force to rotate disk spring 10a, 10b.

Figure 7A:
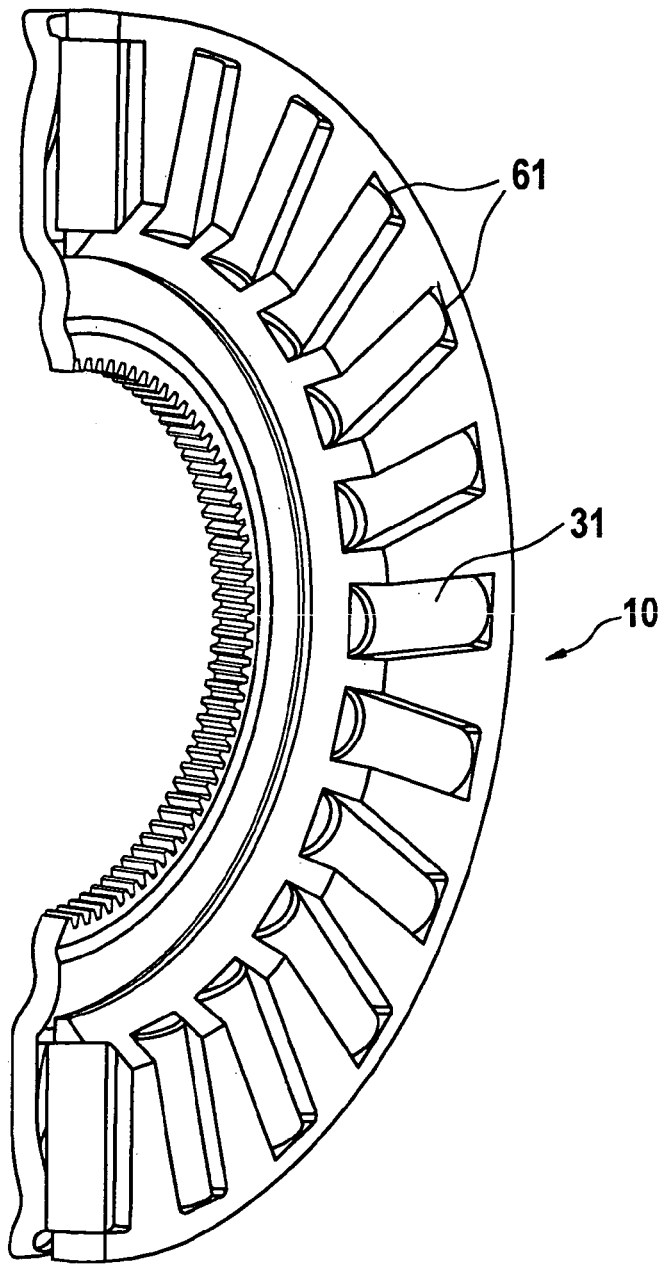
FIG. 7a shows a spiral disk spring with needle cage.
Figure 7B:
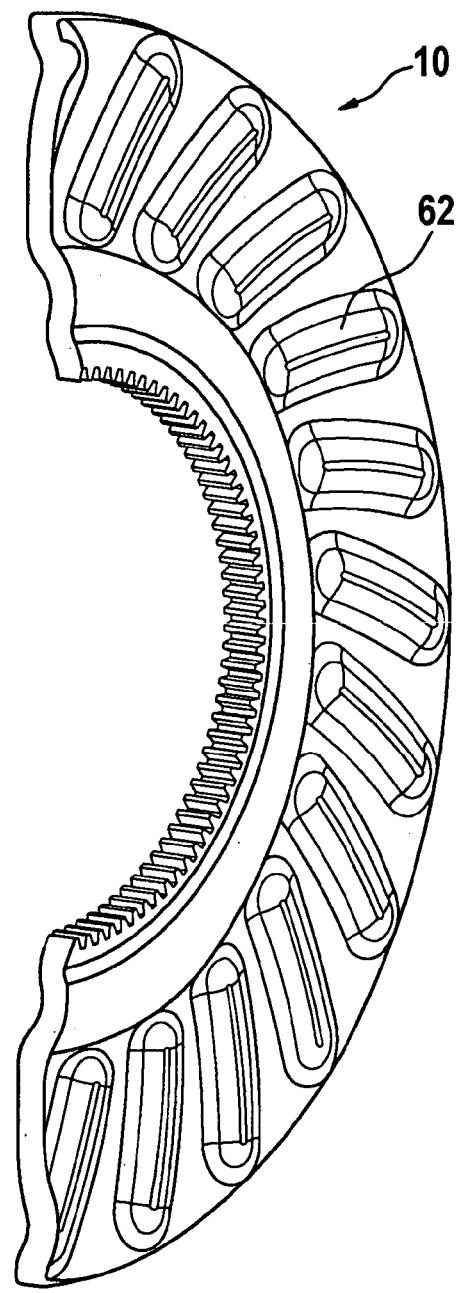
FIG. 7b shows a spiral disk spring with beading.

In FIG. 7b, beads 62 are braced against needles as a special design of roller bodies or rollers 31. The pressure or support point of disk spring 10a, 10b on pressure plate 3a, 3b moves from the outside to the inside through rotation of the spiral disk spring. This movement of the support point increases the disk spring force, and presses clutch 2a, 2b into the engaged position as a result.

Needles 31 are held in place outside at the other end by a support plate. On the inside they press against a pressure ring, which transfers the contact force.

It is beneficial for these spiral segments to be stamped, since this processing method is simple, quick, sufficiently precise, and hence also inexpensive. There are also spiral segments formed in gates 28a, 28b, but they are oriented essentially at right angles to the spiral segments of clutch cover 4a, 4b, i.e., levers 7a, 7b. A partial view of the gate arrangement is shown in the small figure next to the double clutch. The narrower indentation here represents a spiral segment of a clutch cover 4a, 4b, and the wider groove is the spiral segment of a gate 28a, 28b. Now if this gate 28a, 28b is rotated around the rotational axis of shaft 1 by a servomotor 21a, 21b, balls 31 of fulcrums 8a and/or 8b shift radially. It may also be seen again in FIG. 7 that energy storage mechanism 9 serves both lever 7a and lever 7b.

It was already stated in the description of FIGS. 3 and 4 that placing roller bodies one above the other makes it easier to shift fulcrums 8a and 8b. In FIG. 7, however, these are not cylindrical roller bodies, but balls 31. But it also makes sense in connection with balls 31 for these roller bodies to be positioned one over the other in pairs, so that the friction of displacement is also minimized here. Sliding of one ball 31 off of the other ball 31 is prevented according to the present invention by the fact that balls 31, positioned in pairs, are held in the one transverse direction by the gate, and in the other transverse direction by the spiral segments of clutch cover 4a, 4b and the spiral segments of levers 7a, 7b.

Figure 8:
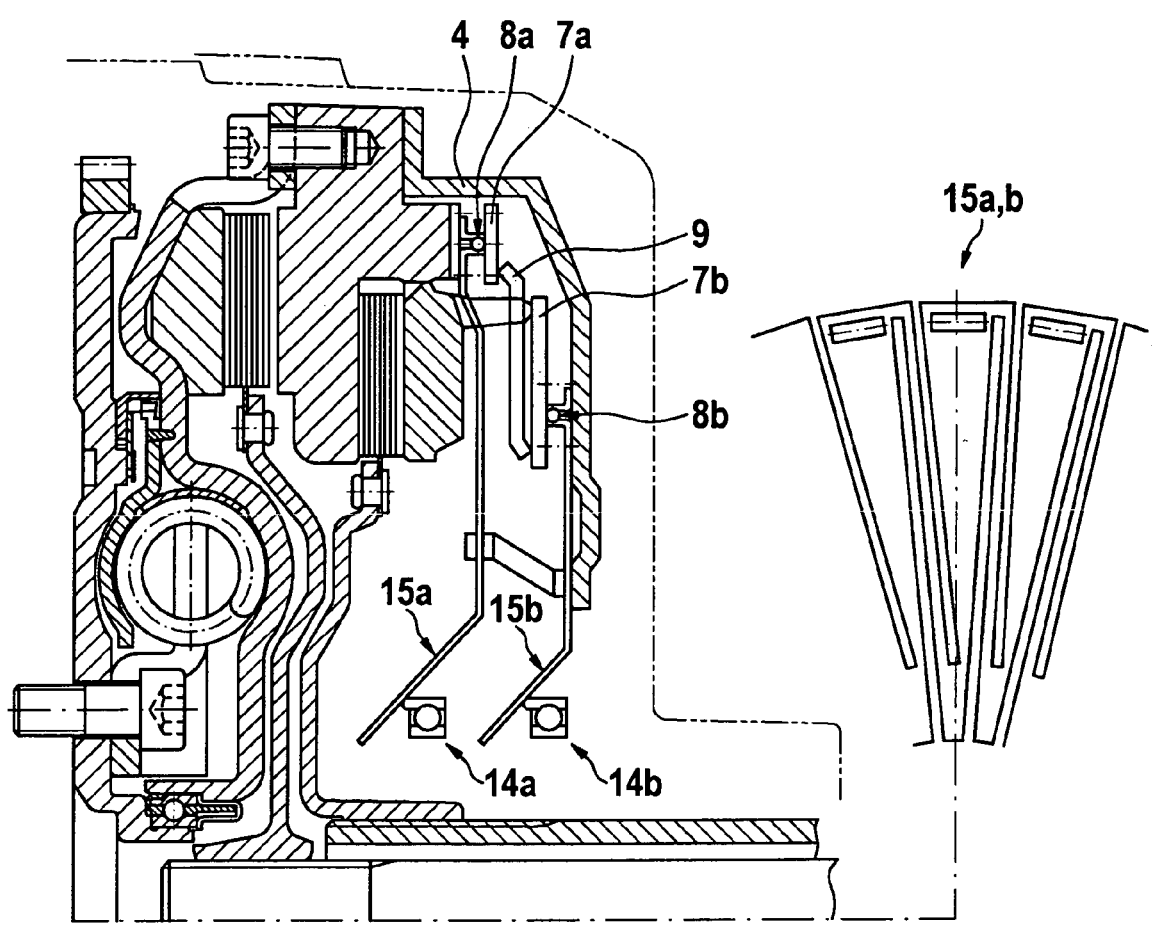
FIG. 8 is the same as FIG. 7, but with the fulcrums adjusted by thrust bearings.

FIG. 8 shows another design of a meander spring 15a or 15b. In the detail view belonging to FIG. 8, the circumferential rectangular slots indicate that cylindrical roller bodies will be placed here. The long radial slots extend alternately from the outside diameter of meander spring 15 to the inside diameter, and from the inside diameter close to the outside diameter, resulting in slender, pliant bridging links that enable the individual segments of meander springs 15 to be moved toward or away from each other.

The representation in FIG. 8 omits circumferential lines. The inner, diagonally running legs of meander springs 15a and 15b appear to be formed of wire in the two-dimensional drawing, but because of their rotationally symmetrical structure they are in fact conical. This conical shape offers an advantageous contact surface for thrust bearings 14a and 14b, whereby meander springs 15a, 15b may be moved outward radially. The meander springs may be moved inward radially for example by a spring mechanism, not shown. Also omitted in this representation are the clamps that are actuated by left pressure plate 3b.

Figure 9:
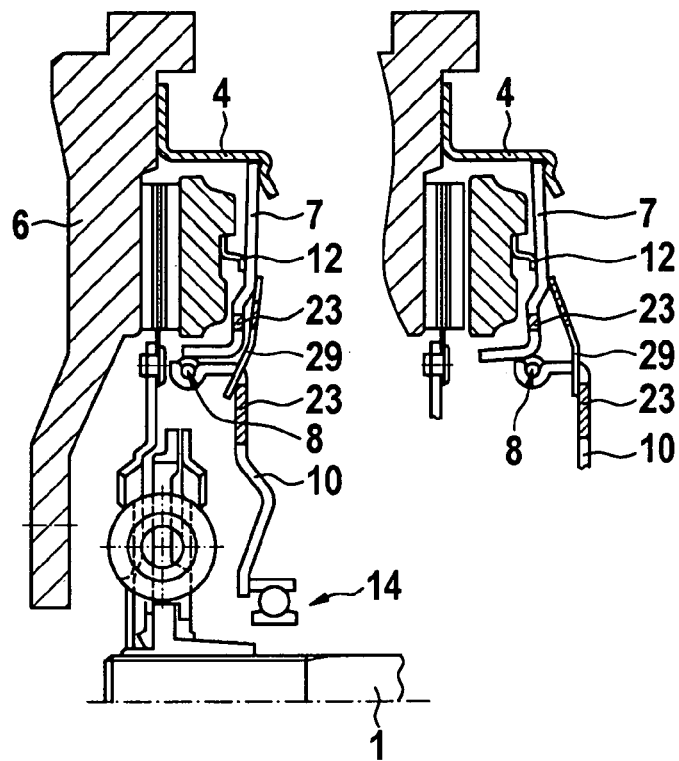
FIG. 9 shows a "pressed" clutch with centrifugal force compensation, in both the engaged and the disengaged states.
Figure 10:
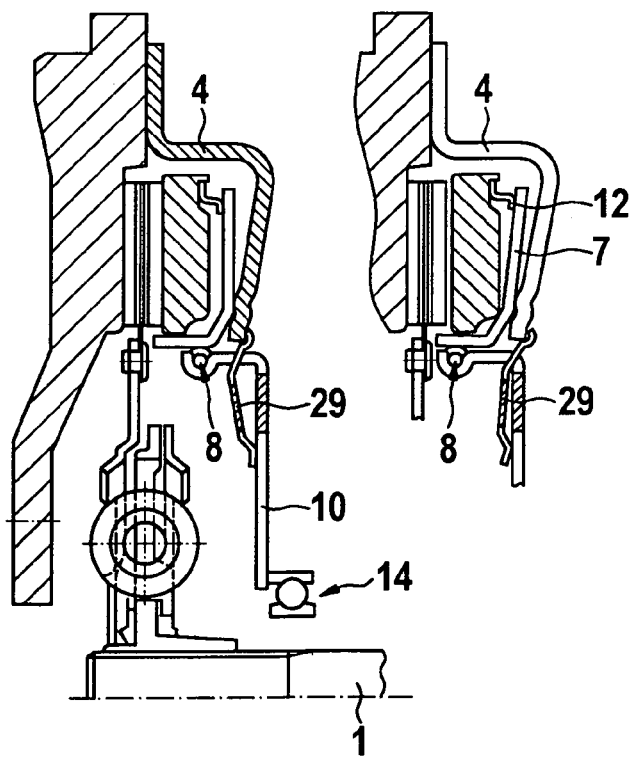
FIG. 10 shows a clutch "closed with spring force" in the engaged and disengaged states, with a lever system for "pedal feel"

FIGS. 9 and 10 each show 2 figures, the left figure in each case representing an engaged clutch and the right figure illustrating a section of the corresponding disengaged clutch.

In FIG. 9, clutch cover 4 is made up almost entirely of a narrow ring, which has a mounting flange at the end facing counterpressure plate 6 and a doubly crimped edge at its other end. This crimped edge serves as a radially immovable fulcrum for lever 7. Lever 7 rests on a contact point of wear readjustment device 12.

Here too, lever 7 takes the form of a disk spring, this disk spring 7 being made up of a narrow, slot-free inner ring, relatively long outer tongues, and short, bent inner tongues. The ring, that is, the slot-free part of disk spring 7 (corresponding to the hatched area), has an essentially centered neutral axis 23 around which it turns if a force is applied to at least one of the tongues. In other words, the position of the slot-free area within a disk spring 7 is important in determining how it works, since the position of the neutral axis defines the area that is not subject to deformation.

The rotational movement of the clutch—and hence also of lever 7—gives rise to centrifugal forces by which the radially extending long tongues are hurled outward to an particularly strong degree. A counterclockwise moment develops around neutral axis 23. A return spring 29 (here again in the form of a disk spring) presses disengaging spring 10 to the right. As may be seen in the right part of the figure, disengaging spring 10 has a slot-free area located in the area of the outer two thirds. This area has a neutral axis 23 which differs from that of lever 7. In the right part of the figure it is also possible to see that this slot-free area is slightly conical in form. For that reason, this disk spring 10 is at the same time also the energy storage mechanism 9 here, which elastically deforms its conical area when moving to the left and in so doing becomes stressed.

If disk spring 10 is now pressed to the left by thrust bearing 14, a roller 31 placed in the outer tongues of disk spring 10 moves to the left on the surface of the underside of lever 7. As this occurs, the point of introduction of force on the inner, short, bent tongues of lever 7 is also shifted to the left. For disk spring 10 to move to the left, it is necessary to apply the tensile force of return spring 29, the deforming force for disk spring 10, and the closing force for lever 7.

In conjunction with FIG. 9, disk spring 10 is intentionally not called a disengaging spring, because the illustrated clutch is engaged by pressing thrust bearing 14 against the clutch. That would make disk spring 10 more of a pressure spring than a disengaging spring. Because of this clutch construction, these clutches are also known as "pressed" clutches. However, it is nevertheless possible in these clutches for the clutch to be disengaged by a device that brings about a kinematic reversal with the clutch pedal depressed, because when the force on thrust bearing 14 decreases, return spring 29 would press disk spring 10 to the right and thereby disengage the clutch. Clutches are also frequently "pressed closed" by an electric motor.

The clutch in FIG. 10 is again a "normal" clutch, meaning that the clutch disengages when a clutch pedal is pressed. Because there is no electric motor operation with this design, the foot is in direct operative connection with disk spring 10. For this reason this is also referred to as clutches with pedal feel. The slot-free area of lever 7—here again in the form of a disk spring—is entirely at the inner rim in this case. Because of the position of the neutral axis of this area, there is no tipping of the tongues around an approximately centered diameter area, as in FIG. 9.

Figure 11:
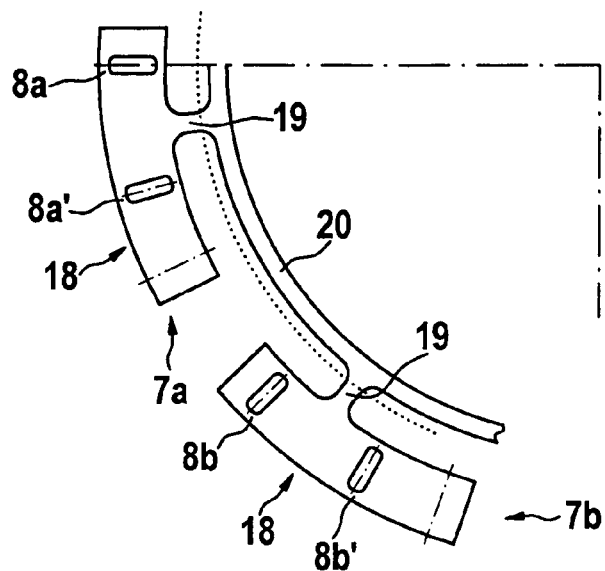
FIG. 11 shows a section of a segmented ring lever.
Figure 12:
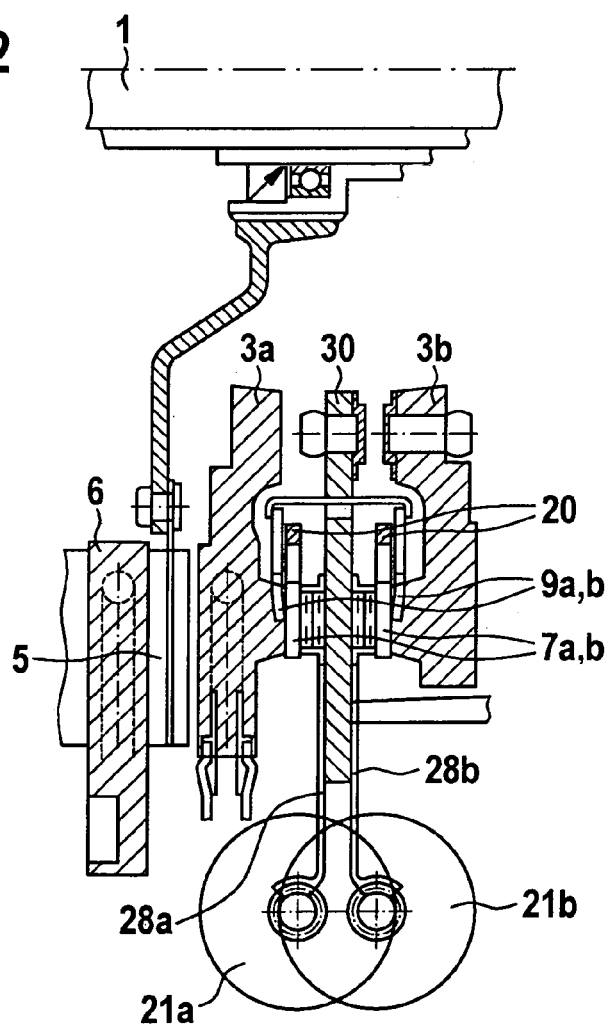
FIG. 12 shows a section of a transmission having a segmented ring lever.
Figure 13:
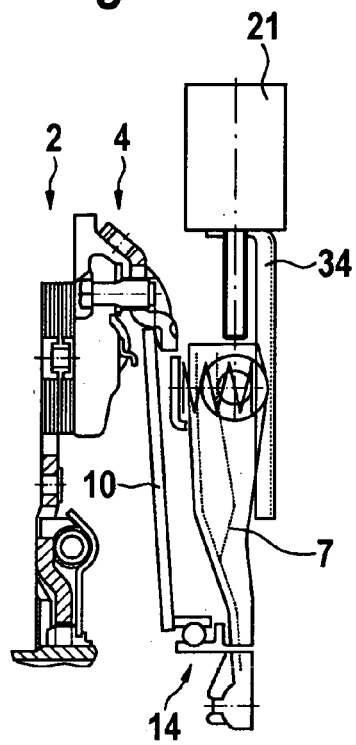
FIG. 13–17 show various views of a lever system according to the present invention having a roller.
Figure 14:
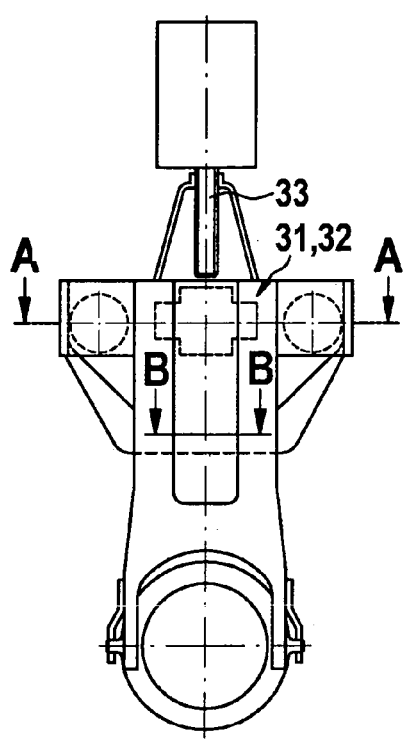
Figure 15:
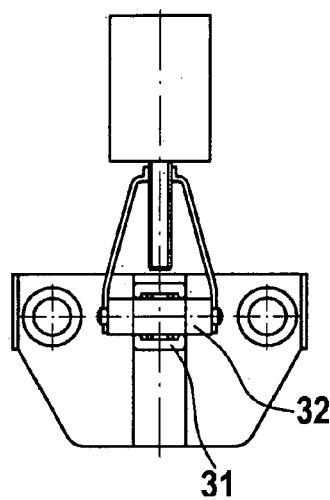
Figure 16:
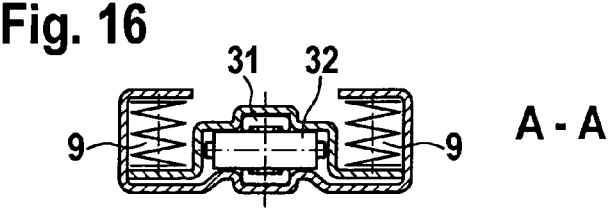
Figure 17:
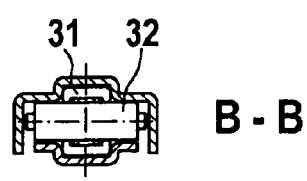

FIGS. 11 and 12 show a lever system in which the at least one lever 7a, 7b is attached to a retaining ring 20. This design of a lever 7 is also called a segmented ring lever 18. Retaining ring 20 is positioned essentially concentrically to the clutch or transmission brake that is to be operated. FIG. 11 shows a section of this ring-shaped structure, while FIG. 12 clarifies a longitudinal half-sectional view to shaft 1. Levers 7a, 7b are rotatable around a radial axis by small angular increments. In this FIG. 12 the rotation is caused by an elastically deformable bridging link 19. Roller bodies 31 that may be moved circumferentially are positioned radially on the surface of levers 7a, 7b. Each of these roller bodies 31 forms a movable fulcrum 8a, 8b (or 8a', 8b' after the shift). The radial dash—here on the longer end of the lever—indicates the line of contact of the energy storage mechanism.

In FIG. 12, between two actuating devices for pressure plates 3a, 3b there is a guide surface 30 which is attached in a fixed position in a transmission housing. On this surface, roller bodies lying one above the other run, each in a gate 28a, 28b. The outer roller bodies 31 touch the surface of levers 7a, 7b. Gates 28a, 28b are rotated around the rotational axis of shaft 1, each by a separate servomotor 21a, 21b. The mechanical linkage of gates 28a and 28b is provided by a worm gear profile and a worm on servomotor 21a, 21b.

If gate 28a is now rotated for example around the rotational axis of shaft 1, the fulcrum shifts from 8a to 8a' or vice versa. Since the one end of lever 7a is under load from energy storage mechanism 9a, the result is that energy storage mechanism 9a produces a large torque through a long partial lever. Since the other partial lever is short, it presses with great force onto pressure plate 3a, which causes it to move against disk 5 (here it is a transmission brake disk). Since counterpressure plate 6 is immovable, brake disk 5 is finally held between plates 6 and 3a. When gate 28a swivels back, the brake disk is gradually released again.

The dashed lines in plates 3a and 6 indicate that the plates may be partially hollow in design. That enables them to be provided with a cooling system (water cooling), so that heating of the friction surfaces, the friction linings and the adjacent bodies may be minimized.

It should also be remarked in connection with FIGS. 11 and 12 that the mechanism shown is usable not only for a transmission brake, for example in an automatic transmission, but also for a clutch 2. Conversely, the exemplary embodiments in which a clutch 2 is shown may also be used in combination with transmission brakes.

FIGS. 13 through 17 show various views of another embodiment of the present invention. Using a servomotor 21 attached to support 34, and preferably an adjusting spindle 33 driven by adjusting motor 21, a roller 31 and its associated axis 32 are moved along support 34 and lever 7. In this embodiment, roller 31 rolls on support 34 and axis 32 on the inside contour of lever 7 (dotted line). Because of the different diameters of roller 31 and axis 32 there may be constraints, so that roller 31 and axis 32 may only be moved radially with difficulty (in reference to the rotational axis of clutch 2). It is therefore advantageous for roller 31 to be mounted on its axis 32 using a bearing, preferably a needle bearing.

As long as roller 31 is close to energy storage mechanism 9, no force is able to act on thrust bearing 14 and hence on disk spring 10 of clutch 2. When roller 31 and axis 32 are moving on the path to the center of the shaft, in this example axis 32 rolls along a non-straight line. This is advantageous, for example, if on path segments where normally little energy is required servomotor 21 is nevertheless supposed to be kept under uniform load (for example in order not to produce any unnecessarily long clutch operating times). On these path segments, actuating time may be gained by a modified gradient in the lever surface.

If roller 31 and axis 32 have traveled relatively far inward, as already mentioned, energy storage mechanism 9 (here as a pair and implemented as a helical spring) is able to press on a long partial lever, and thus powerfully on disk spring 10 or some other sort of mechanism.

If servomotors 21 are used for actuating the device according to the present invention, it is advantageous to not switch them just according to a simple on-off principle, but to trigger them by an intelligent controller. It is especially advantageous here if the controller is connected to sensors and the actuation is performed by a digital program. If a plurality of servomotors 21 are present in a transmission, it is advantageous to trigger them from a common controller, because it is then possible to better match the functions of the individual motors 21 to each other.

Figure 18D:
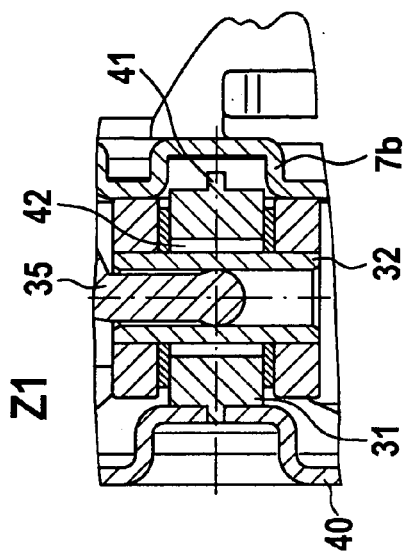
FIG. 18a–d shows various views of a lever system in a case.
Figure 18C:
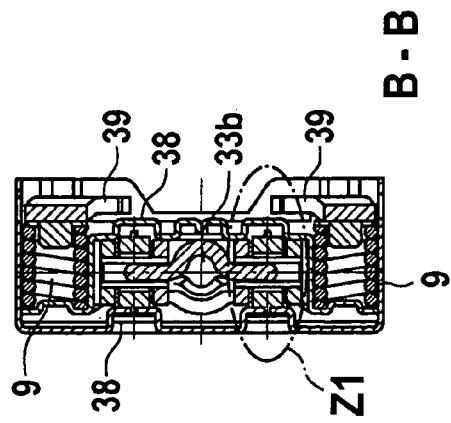
Figure 18A:
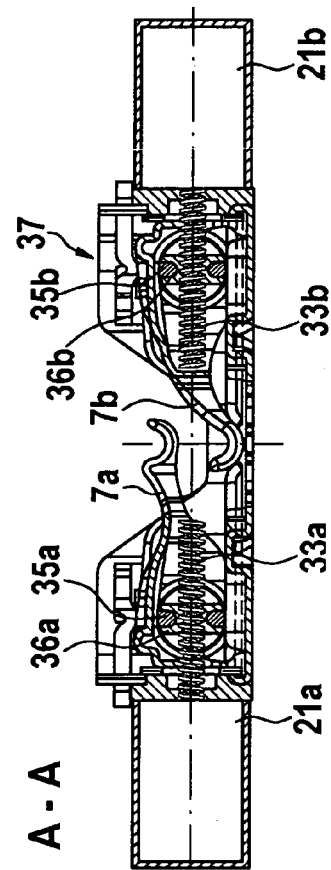

In FIGS. 13 through 17, lever 7, support 34 and the linkage of servomotor 21 to roller 31 (for example roller axis 32) are made of sheet metal. In another advantageous embodiment of the present invention, the lever system according to the present invention is located in a case 37. This case 37 is produced for example from sheet metal by stamping. Lever 7a, 7b may also be designed as a sheet metal stamping. FIGS. 18a through 18d provide a first overview of this embodiment of the present invention. In these figures a double lever system can be seen, which may be used for example for actuating a double clutch. FIG. 18a shows a longitudinal section through FIG. 18b along line A—A. FIG. 18c in turn depicts a section along line B—B. Detail Z1 from FIG. 18c is shown in FIG. 18d. To understand the lever system better, these FIGS. 18a–d must always be considered in an overall view.

It is easy to recognize how servomotors 21a, 21b may be easily flange-mounted, because of the arrangement of the lever systems in case 37, i.e., the edge of the case, enabling adjusting spindles 33a, 33b to penetrate directly into the interior of case 37. Adjusting spindles 33a, 33b are surrounded by adjusting nuts 36a, 36b, and convert the rotational motion of servomotors 21 into linear movement. Since adjusting nuts 36a, 36b are coupled via a connection with rollers 31, or with axes 32 of roller 31, they are also moved during the linear motion. Rollers 31 are linked by an omega-shaped part, there being a bow in the middle area of this part that loops around the servomotor. The latter is therefore also designated as a yoke 35a, 35b. The ends of this yoke 35a, 35b are of spherical design and engage the hollow axis of roller 31. This "ball end" is preferably positioned in the axial center of roller 31, thereby advantageously causing torque-free guidance of rollers 31. If the spherical end of a yoke 35a, 35b (FIG. 18d) were outside of the axial center, there would be a controlling moment ("a steering motion") on roller 31. As may also be seen in FIG. 18d, there is a groove in the case floor 40, in which a "comb" 41 of roller 31 runs. Since roller 31 is guided by the slot in case floor 40 with the help of comb 41, an axial eccentricity of the spherical or ball-shaped end of yoke 35a, 35b could result in rubbing of comb 41 in the slot.

As already mentioned, FIGS. 18a–d (and also FIGS. 19a–c) represent an embodiment of the lever system according to the present invention in the form of a double lever system. Since this double lever system is used to actuate a double clutch, and nested actuating sleeves (not shown in the figures) are positioned on the transmission input shaft for this purpose, levers 7a, 7b engage bearing points, positioned axially one behind the other, of the actuating sleeves. In other words, levers 7a, 7b are unable to impede each other, because the fork of lever 7a moves a front sleeve and the bearing fork of sleeve 7b moves a rear actuating sleeve. The bearing forks of levers 7a, 7b therefore do not clash. For this reason, at least in its area of the bearing fork, lever 7a is shaped differently than the area of the bearing fork of lever 7b.

Levers 7a, 7b, and case floor 40 also have another special feature. These parts preferably have a profile 38, which may in turn run for example parallel to sectional axis A—A. Part of the profile of case floor 40 was previously visible in FIG. 18d; it is not the slot in case floor 40 that is to be understood here as profiling, but the essentially rectangular bead. The profiling of levers 7a, 7b is most readily visible in FIG. 18b. An oversized "E" appears to be stamped here. Common to the profiles is that they give tremendous stability to both case floor 40 and levers 7a, 7b. The lever system according to the present invention portrayed here is located in a case floor 40, case floor 40 having a profile. It has a running surface for roller 31 and profiling of levers 7a, 7b, and a running surface for the axis 32 of roller 31. To minimize the friction between roller 31 and axis 32, there is a needle bearing 42 between the two. When shifting a fulcrum 8a, 8b (each made up here of two rollers), roller 31 rolls on case floor 40, while roller axis 32 rolls on the inner lever surface. The rotary motion of roller axis 32 also results in a relative movement between the inner surface of hollow roller axis 32 and the spherical end of yoke 35, because yoke 35 ultimately brings about only a linear motion. This relative movement between the spherical end of yoke 35 and the interior of axis 32 and the associated friction is not significantly detrimental, however, because here only the force that is required to shift roller 31 or roller axis 32 affects the sliding surfaces. According to the present invention, the forces for this shifting are only very small relative to the forces at the lever ends. Because of the slightness of this frictional force at the spherical yoke end, complicated bearing mounting is not requisite here.

Figure 18B:
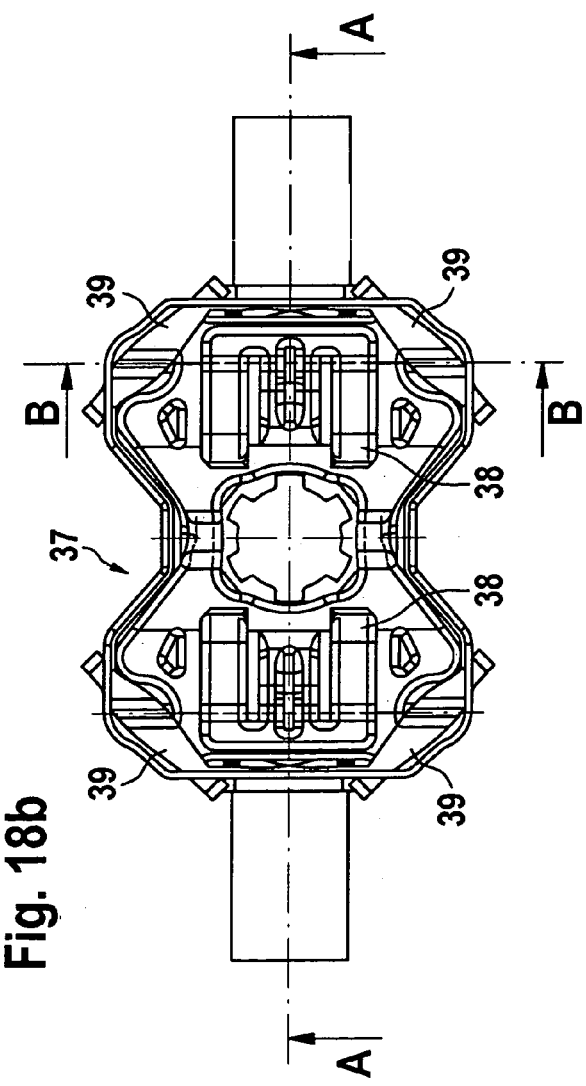

The attachment of energy storage mechanism 9, here in the form of a helical spring, is also visible in FIGS. 18a–c. The one end of energy storage mechanism 9 is supported by a stamped shoulder of levers 7a, 7b. The other end of energy storage mechanism 9 rests on abutment 39. Abutment 39 is advantageously—because simply—secured in slots of case 37. So that energy storage mechanism 9 need withstand only little or no resistance directed against it in the form of a transverse motion, in the variants portrayed here the abutments are provided with a bead 62 that functions as a sliding bearing point. In the end of energy storage mechanism 9 facing the bead, there is a stopper of a bearing shell facing bead 62. Since when levers 7a, 7b are actuated the bearing fork moves along the center axis of the transmission input shaft, but at the same time lever 7a, 7b makes a swiveling movement due to the displacement of fulcrum 8a, 8b, the ends of levers 7a, 7b facing servomotors 21a, 21b undergo a slight radial movement toward the transmission input shaft. In other words, the end of energy storage mechanism 9 facing lever 7a, 7b must also execute a radial movement. The form of energy storage mechanism 9, which is essentially cylindrical here, results in the "transverse rigidity" mentioned earlier. It is therefore advantageous for energy storage mechanism 9 to have its ends mounted as well as possible, in order to minimize this transverse rigidity.

Figure 19A:
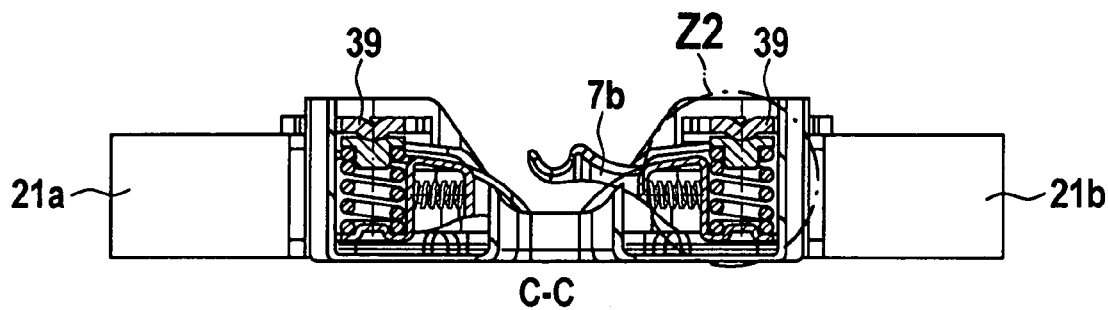
FIG. 19a–c shows additional views of a lever system in a case.
Figure 19B:
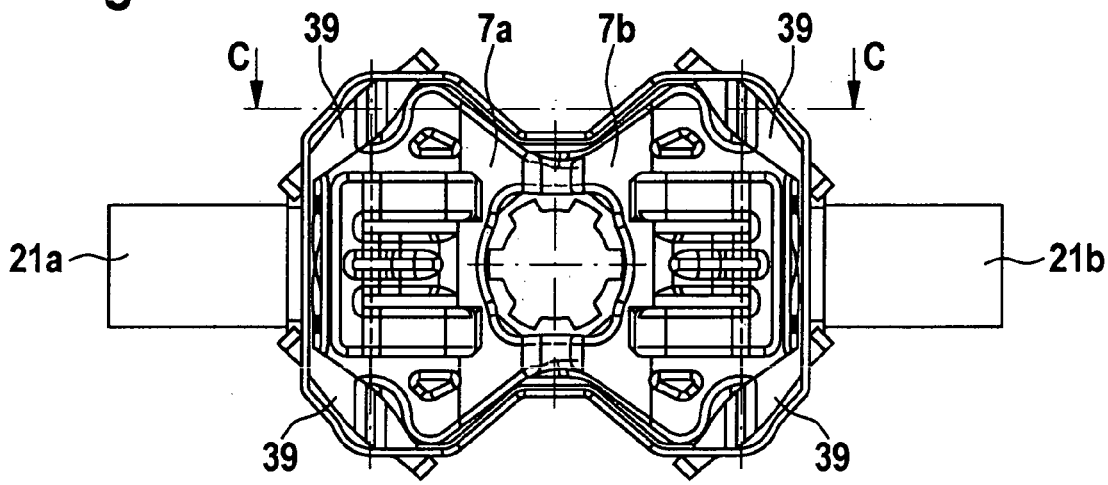
Figure 19C:
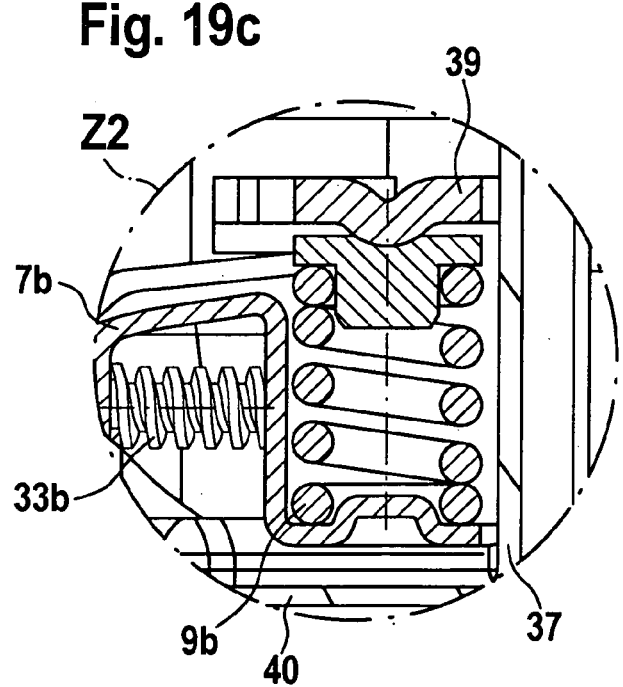

FIGS. 19a–c show the same object as FIGS. 18a–d. FIG. 19a portrays the section C—C from FIG. 19b. Detail Z2 of FIG. 19a is visible in FIG. 19c. The position of section line C—C was therefore chosen especially to illustrate the design of the mounting of energy storage mechanism 9, for which reason special attention is given here to FIG. 19c. Lever 7b is clearly visible in its stamped shoulder. Stamped onto the right end of lever 7b is a small projection, which guides the lower end of energy storage mechanism 9b. In the upper end of energy storage mechanism 9b is a stopper, with a bearing shell oriented perpendicular to the plane of the drawing. In this bearing shell, the outer surface of bead 62 engages abutment 39.

FIGS. 18, 19 and 21b are drawn using a method in which even transitions, for example from a flat to curved element, are designated with an edge. That eliminates the imaginary intersections, which are sometimes usual even today. But since the imaginary intersections do not represent a clear geometric position, their use can lead to confusion. The form of depiction used in the present application results in a large number of additional edges which may be confusing, but these lines correspond exactly to the geometric position.

Figure 20A:
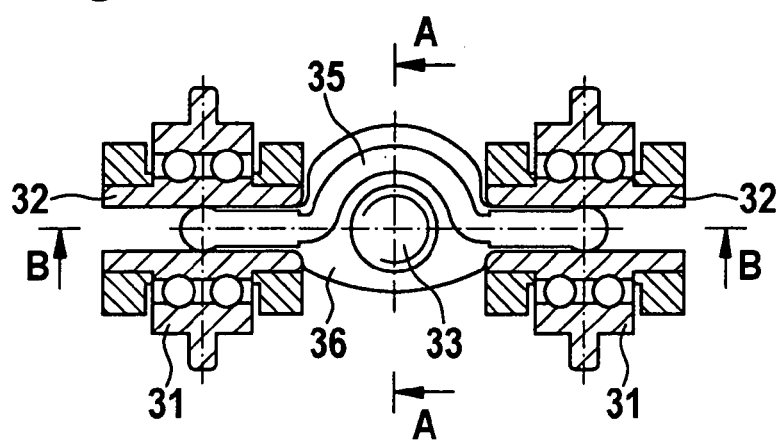
FIG. 20a–c shows various views of a shiftable fulcrum.
Figure 20C:
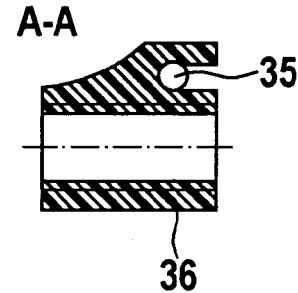
Figure 20B:
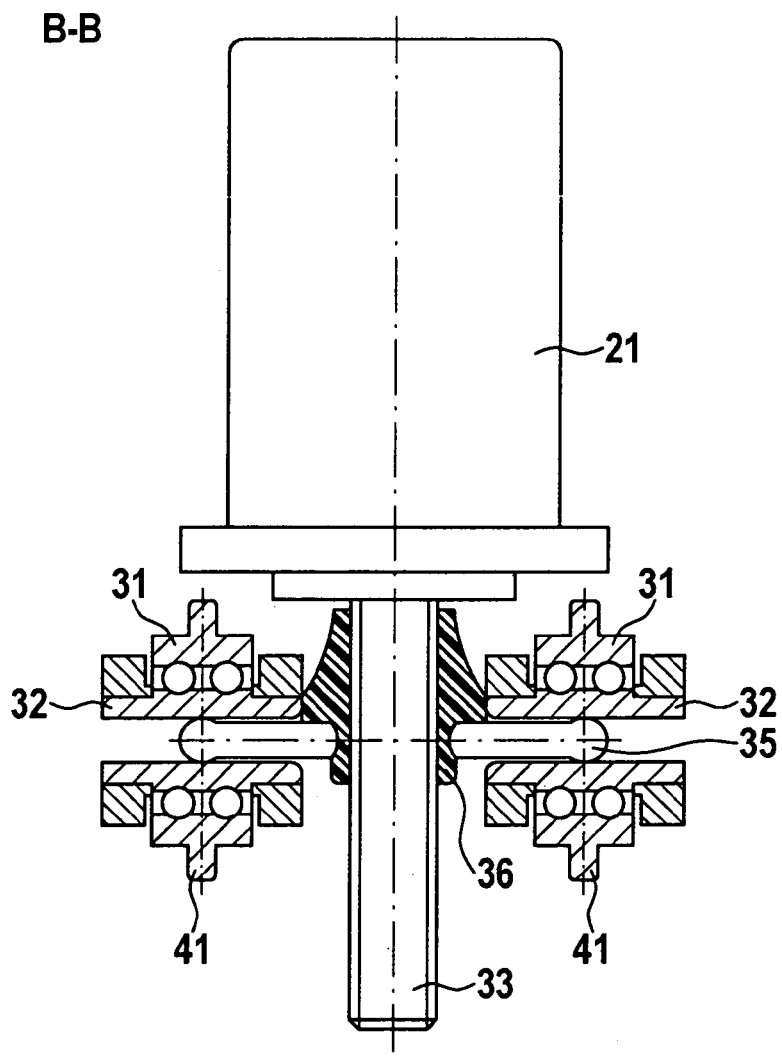

FIGS. 20a–c illustrate the principal structure of a movable fulcrum 8 in combination with a joining yoke 35 and adjusting nut 36. Movable fulcrum 8 (8a, 8b) for its part is made up here of two rollers 31, each roller 31 having an axis 32 that is hollow here. Yoke 35 for its part has spherical ends, whose centers are positioned essentially in the axial center of rollers 31. In FIG. 20c (corresponding to Section A—A) it may be seen that yoke 35 snaps into a curved slot of adjusting nut 36. This inexpensive method of attachment is possible because adjusting nut 36 is produced as an injection molded elastic plastic part. The inexpensive connection between adjusting nut 36 and yoke 35 is also possible because the forces on the yoke during the adjusting movement of movable fulcrum 8 are small, at least when moving in the direction of servomotor 21. That enables the snap forces of adjusting nut 36 to carry yoke 35 along with it reliably. In FIGS. 20a and 20b, the construction of a roller 31 with its axis 32 is clearly recognizable once more in simplified form. Here (as earlier in FIGS. 18 and 19), axis 32 has a disk at each end, which causes the running diameter of axis 32 to be enlarged. This enlargement is advantageous, because when there are slight imperfections on the running surface of the axis a greater diameter has less rolling resistance. Placing these rings on the ends of the axis does not make it more difficult to position a double ball bearing between the axis and roller 31, however.

FIGS. 21a and 21b show the top view and side view of a design of the mounting of energy storage mechanism 9 in case 37. FIG. 21a shows a latchable abutment 39 which is able to use hooks, which are preferably stamped, to engage recesses in the walls of case 37. Because abutment 39 has a certain elasticity, it is able to snap properly into this recess. FIG. 21b at the same time also shows another mounting of energy storage mechanism 9. The end does not have a separate stopper, as shown for example in FIGS. 18 and 19, but rather abutment 39 is slightly spherical, so that energy storage mechanism 9 may roll on this sphericity when moving transversely. To prevent the transverse motion from being hindered at the other end of energy storage mechanism 9 by the rigidity of the energy storage mechanism, lever 7 (only a section is visible here) is also provided with sphericity. These sphericities may be either barrel-shaped or conical. To fix energy storage mechanism 9 in its working position, both abutment 39 and lever 7 have guide projections on their inner side.

Figure 22A:
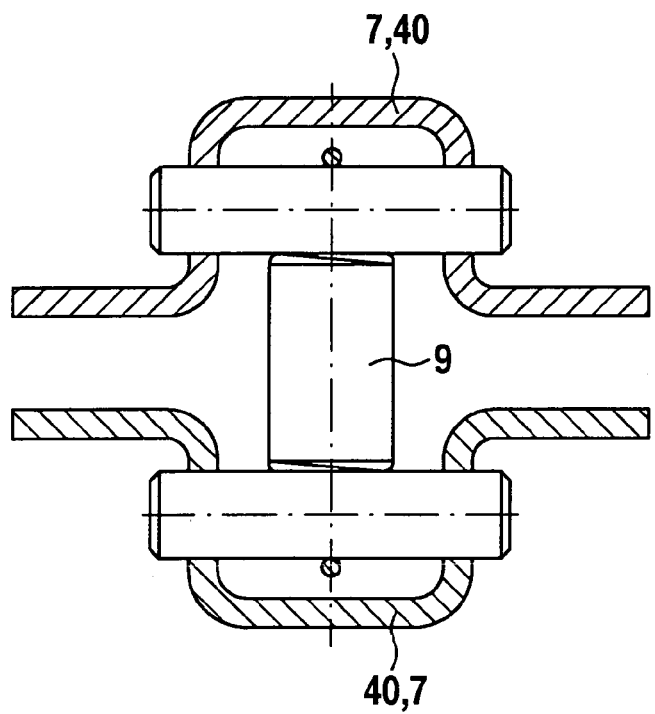
FIG. 22a–b shows a top view and side view of a different energy storage mechanism mount.
Figure 22B:
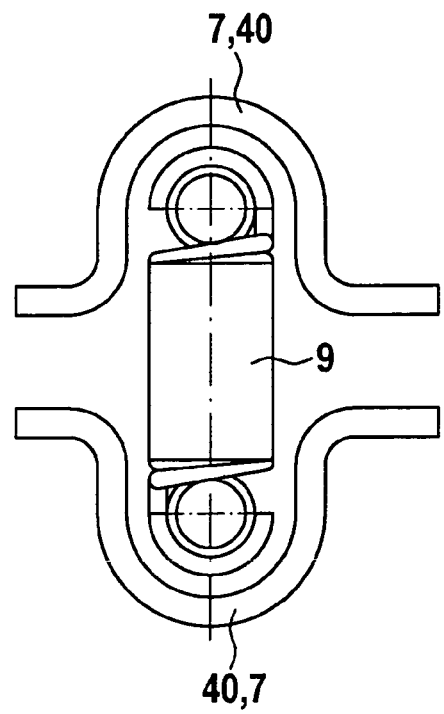

FIGS. 22a and 22b represent a different design of the mounting of energy storage mechanism 9. Energy storage mechanism 9 has been drawn here only in stylized form. FIG. 22a represents a section through energy storage mechanism 9, while FIG. 22b reproduces a simplified side view. Energy storage mechanism 9 is designed here as a tension spring, with its two ends being provided with appropriate eyelets. Because of the presence of the eyelets, a pin may be inserted through them; the combination represents a mounting. This has the advantage that a separate swiveling mechanism is not required.

Figure 23A:
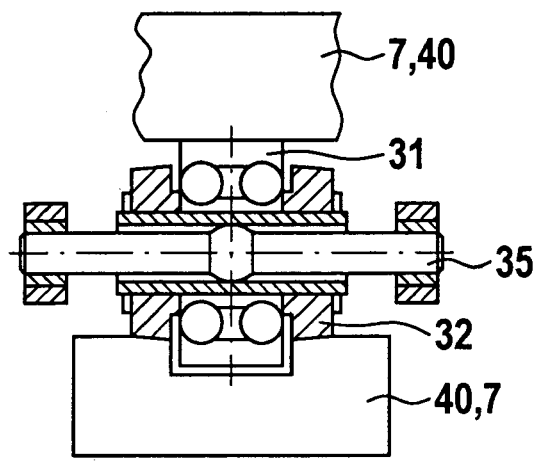
FIG. 23a–d shows various designs of a bearing unit (shiftable fulcrum)
Figure 23B:
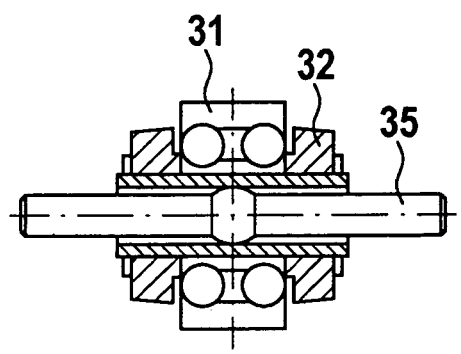
Figure 23C:
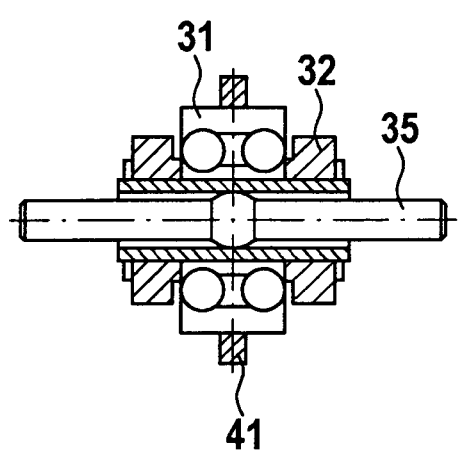
Figure 23D:
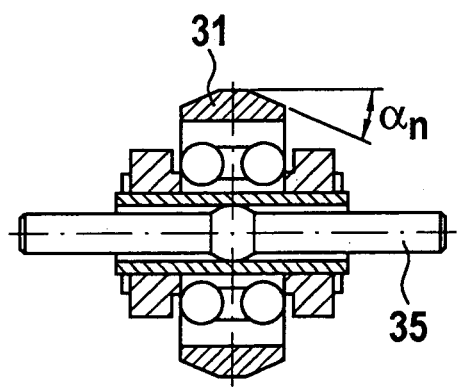

FIGS. 23a–d show different variants for guiding the bearing unit. The guiding system may be a cylindrical forced guide or a guide with inclined active surfaces of the inner bearing axis or of the outer bearing. Each bearing unit is rotationally and transversely movable and is mounted on yoke 35. The sloping guideway, and also the guide groove, may be provided on case 37 or to lever 7a, 7b. In FIG. 23, on a double-grooved ball bearing, a roller comb 41 is attached as a separate part, which represents roller 31. In FIGS. 23a and 23b, the larger diameter of axis 32 has a conical chamfer. If this conical surface runs on a running surface that is essentially parallel to it, the result is a stabilized running motion perpendicular to the plane of the drawing. This guiding effect is comparable to self-centering, as known from a pair of train wheels between two rails. In FIG. 23d, roller 31 has two oppositely oriented conical chamfers. If such a roller 31 runs in the v-shaped courses that are essentially parallel to these conical surfaces, a self-centering effect arises here as well. The self-centering effect not only causes guidance in the axial direction, but also causes a steering motion of roller 31 and/or axis 32.

Figure 24A:
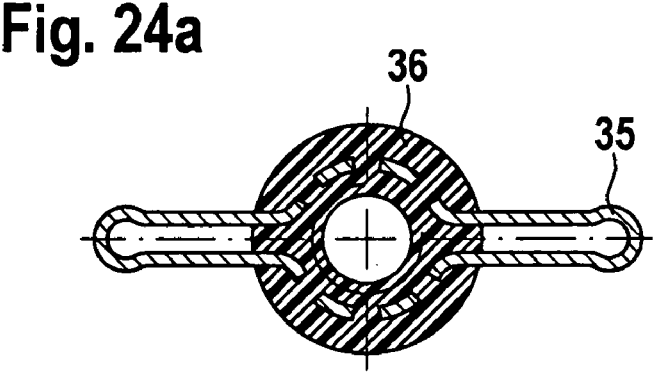
FIG. 24a–c shows a bearing unit having an injection-molded nut.
Figure 24B:
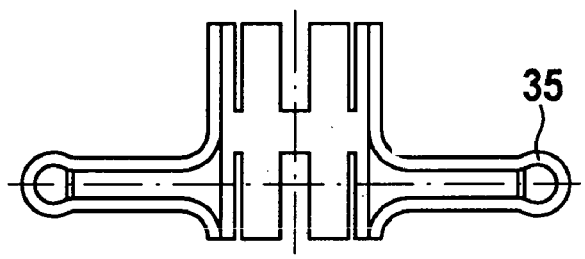
Figure 24C:
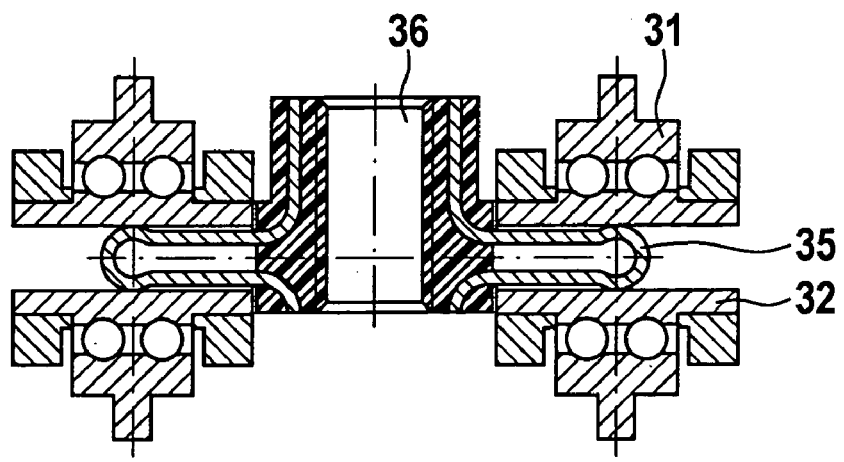
Figure 25A:
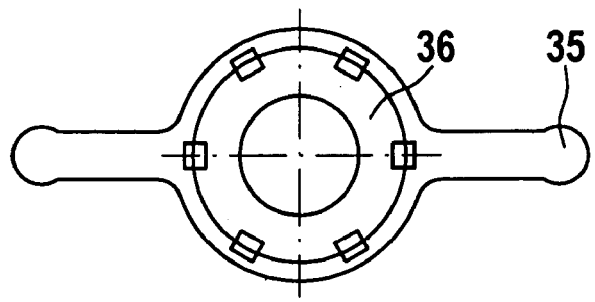
FIG. 25a–c shows a snap connection in the bearing unit.
Figure 25B:
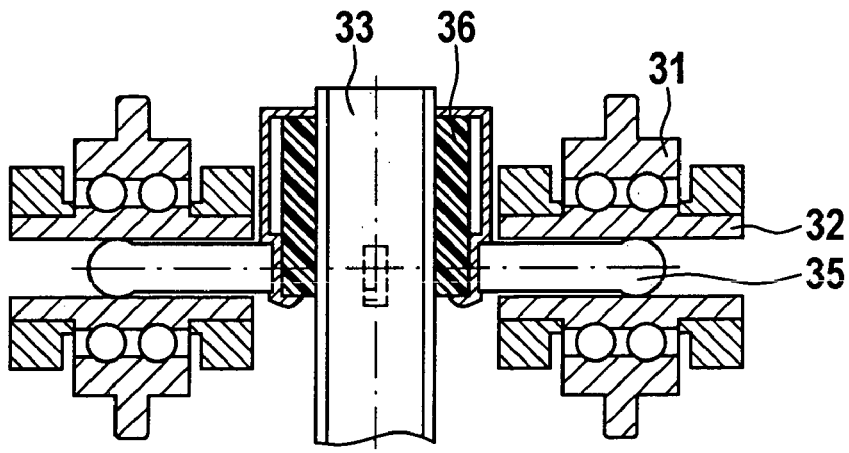
Figure 25C:
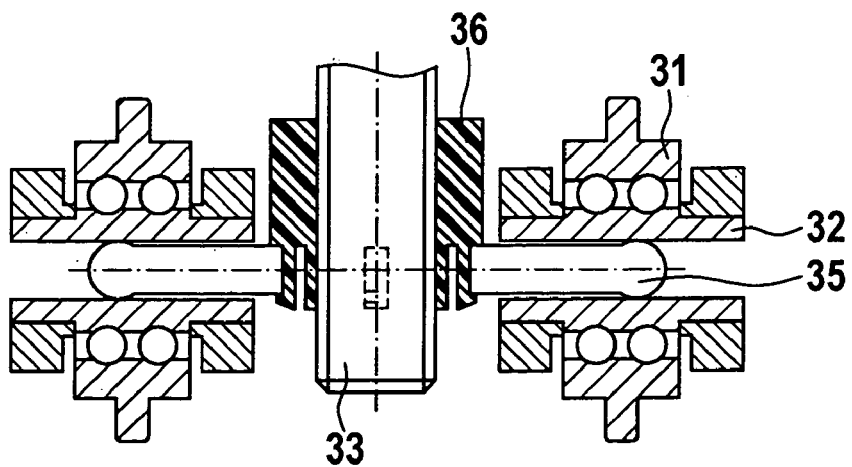

FIGS. 24a–c reveal a variant in which yoke 35 is manufactured of two individual, dish-shaped stamped parts and then extrusion coated with plastic. If the plastic coating has an inside thread in which an adjusting spindle 33 is able to slide, this plastic coating constitutes an adjusting nut 36. FIG. 24c shows this design of yoke 35 and adjusting nut 36 assembled. In FIG. 25a yoke 35 is no longer omega-shaped, but has a closed ring in the center. In this case yoke 35 is joined with adjusting nut 36 by a ring snap connection. The design according to FIG. 25b shows a bearing unit that is surrounded by a sheet metal cage which both holds adjusting nut 36 and connects yoke 35. In FIG. 25c, yoke 35 is either ring-shaped as in FIG. 25a or omega-shaped, as already described in other examples. The special feature of FIG. 25c compared to FIG. 25b is that adjusting nut 36 is not enclosed by a separate sheet metal jacket or housing, but instead yoke 35 is held directly by elastic snap hooks of adjusting nut 36.

Figure 26A:
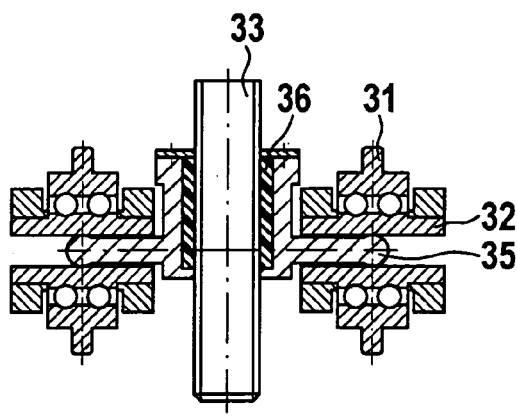
FIG. 26a–f shows various designs of a connection between the adjusting spindle and the nut of a bearing unit.
Figure 26B:
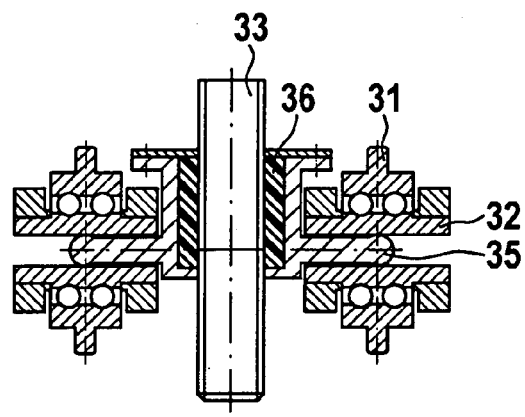
Figure 26C:
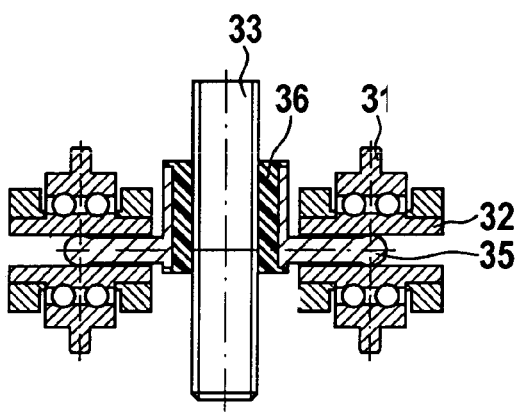
Figure 26D:
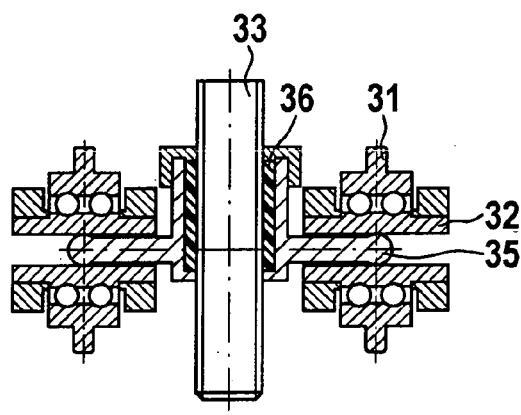
Figure 26E:
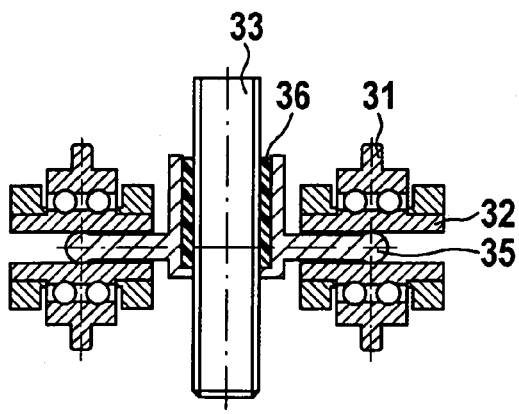
Figure 26F:
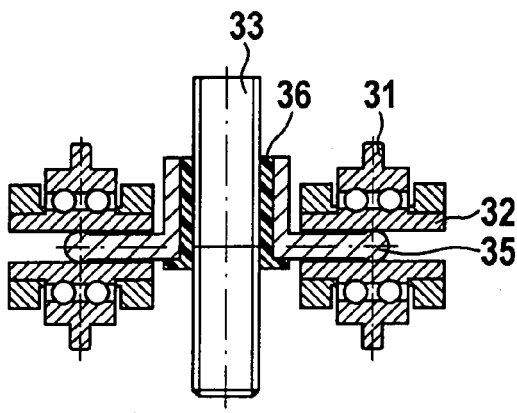
Figure 27A:
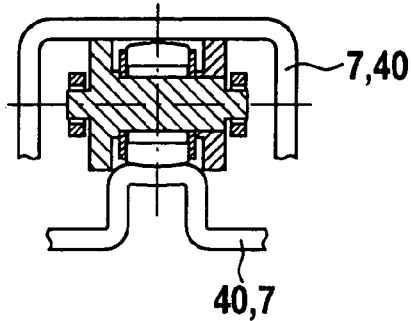
FIG. 27a–h shows variants of the bearing unit.
Figure 27E:
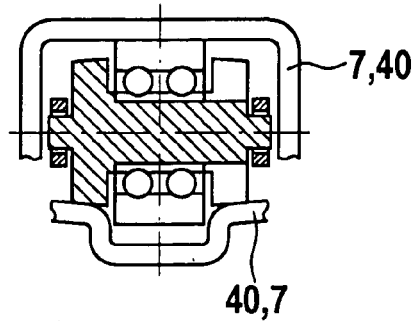
Figure 27B:
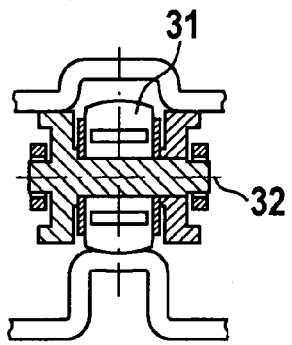
Figure 27F:
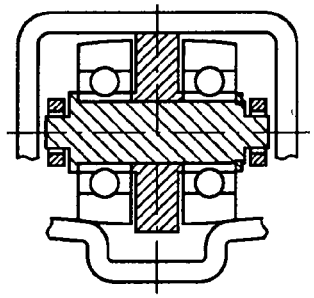
Figure 27C:
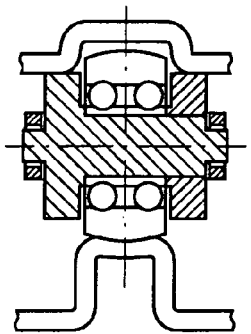
Figure 27G:
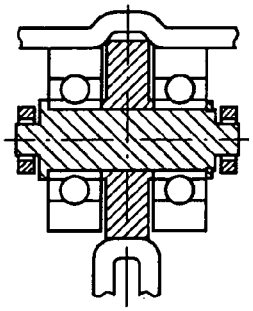
Figure 27D:
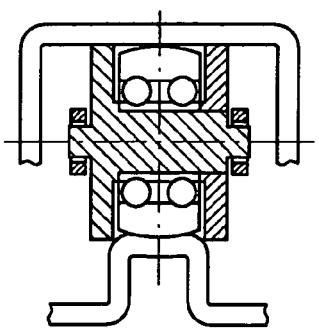
Figure 27H:
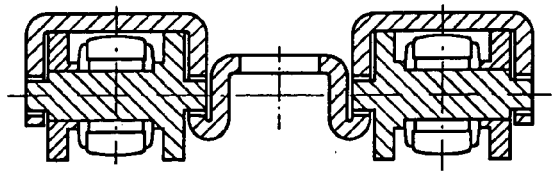
Figure 28A:
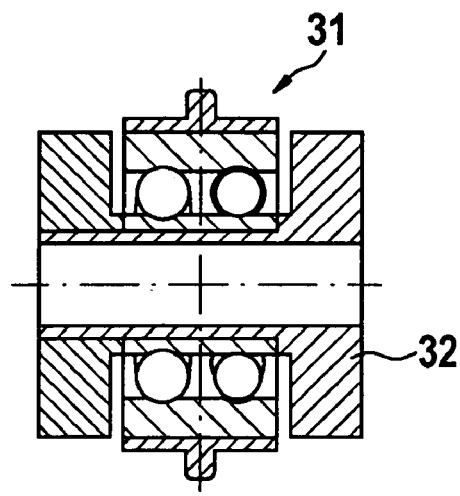
FIG. 28a–d shows additional variants of the bearing unit.
Figure 28B:
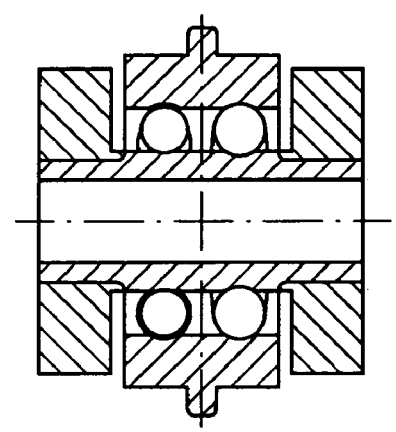
Figure 28C:
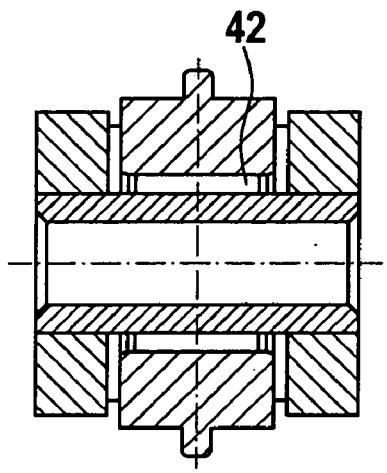
Figure 28D:
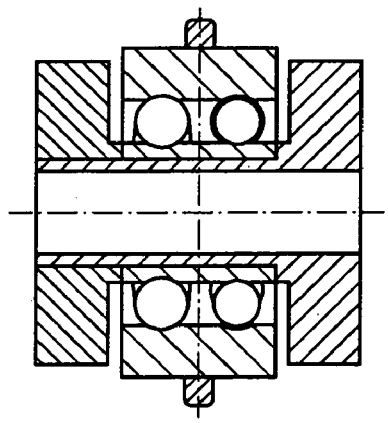

FIGS. 26a–f show additional designs of the connection of adjusting nut 36 and yoke 35. In FIG. 26a, the thread of adjusting nut 36 is inserted rotationally rigidly as a sleeve on a body on which the yoke is also formed at the same time. To prevent the nut sleeve from sliding out axially, a closing plate is attached on top. In FIG. 26b, to provide a better attachment for this closing plate a flange is formed so as to be able to attach screwed or riveted connections better. In FIG. 26d the upper closing plate is of a sleeve-shaped design, with attaching options (shown as dashed and dotted lines) applied radially in the body, on which the yoke is also formed at the same time. In FIG. 26e, the actual thread of adjusting nut 36 is pressed into the basic body. The effect of pressing in is that the adjusting nut thread is both rotationally fixed and sufficiently secured axially. In FIG. 26c, the adjusting nut thread encircles the supporting body, which also holds yoke 35. This encircling of the supporting body in any case secures the adjusting nut thread axially. If the adjusting nut thread is applied here later, i.e., after yoke 35 and the basic body are produced, this threaded body is already connected to the basic body in a rotationally fixed manner by the shrinkage tensions of the nut thread. In FIG. 26f, the nut thread is cemented into the basic body and/or yoke 35. This is advantageous, because as a result there are no deformations caused by a subsequent spraying process. FIGS. 27a–h show various designs of a movable fulcrum 8. Part 40.4 shows either a lever 7 or a case floor 40. It is correspondingly true of the other part with the designation 40, 7 that this part may be either a case floor 40 or a lever 7. The different choices of hatching make it clear which contours represent a part and how they are positioned with respect to each other. The depiction of the embodiment of the system according to the present invention in FIG. 27 is therefore self-explanatory. A characteristic fact is that the axis 32 of roller 31 is designed in each case as a solid shaft.

Figure 29:
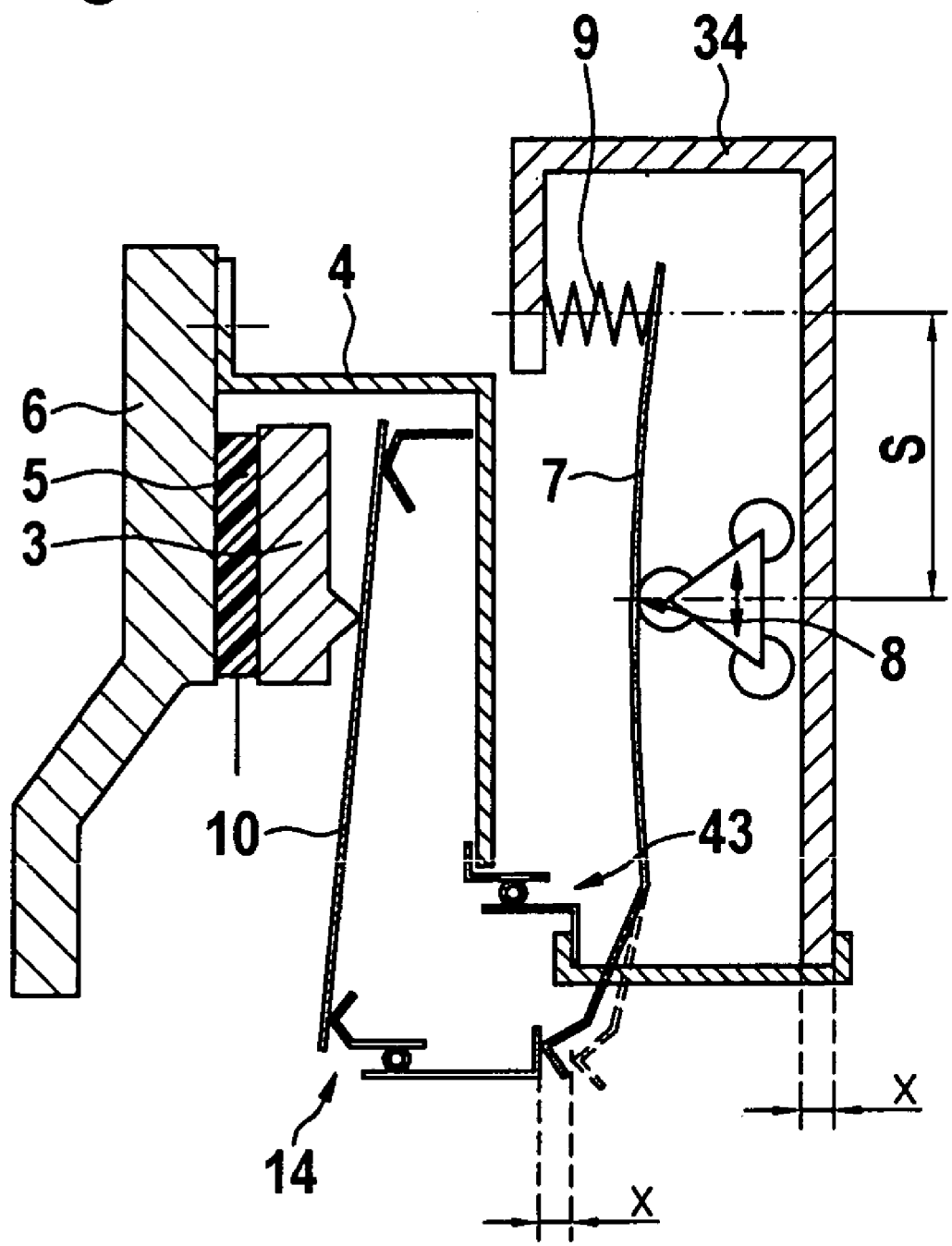
FIG. 29 shows the tolerance equalization mechanism on a lever system.

The depiction in FIG. 29 corresponds essentially to those in FIGS. 1 and 2. However, a special feature is that support 34 is axially connected to clutch cover 4 via a clutch cover bearing 43. Support 34 is therefore no longer provided for example on a wall of the transmission, but on clutch 2 itself. However, to capture a reaction moment by means of the lever system according to the present invention, there may be a torque support on the transmission housing. The axial linkage of the lever system according to the present invention to clutch cover 4 by means of clutch cover bearing 43 has the advantage that plastic, thermal and/or elastic deformations in the clutch system and lever system may be compensated for by an adjustment by the amount X. If support 34 were to be supported on the housing wall, thermal changes in length for example between the transmission and the clutch could result in a maladjustment of the lever system.

Figure 30A:
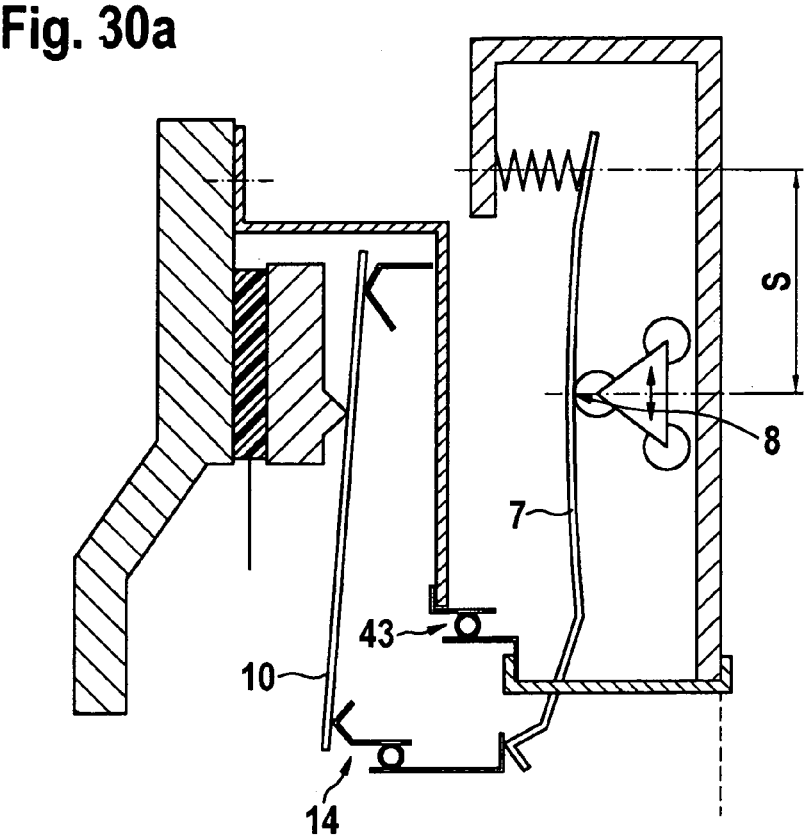
FIG. 30a–b illustrates the measurement method for the tolerance equalization mechanism.
Figure 30B:
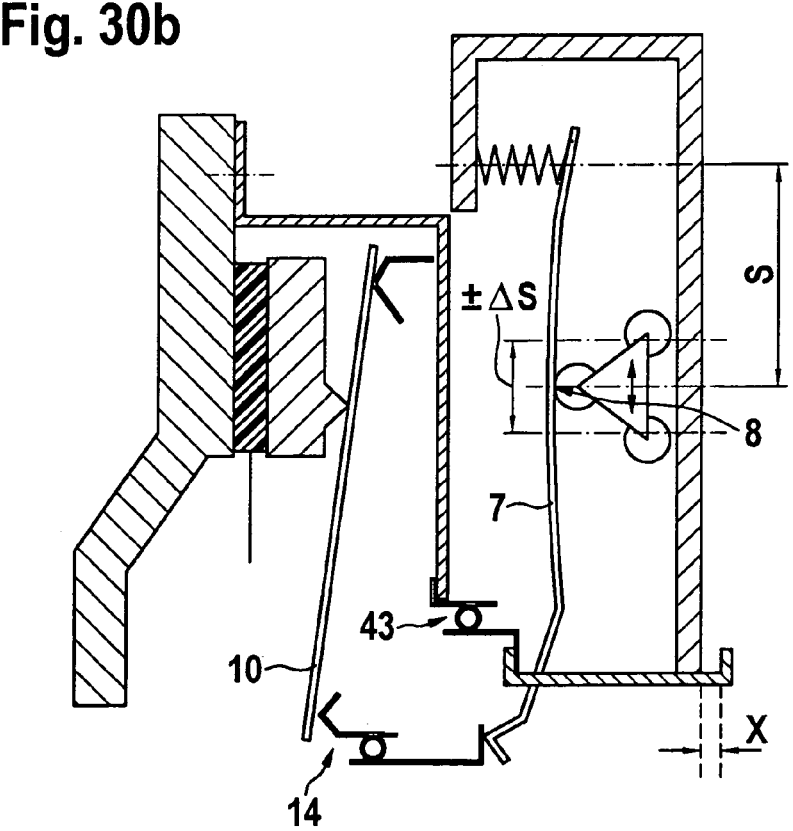

FIGS. 30a, 30b build on the concepts of FIG. 29, and illustrate a measuring method whereby the nominal position for the movable fulcrum 8 may be set when installing the lever system according to the present invention in the vehicle, i.e., between the clutch and the transmission. In the nominal position, because of adjustment of the lever system, a specified nominal contact force is present on disengaging bearing 14 or disk spring 10.

If an ideally "symmetrically" adjusted lever system is assumed in FIG. 30a, in a diagram of force over distance S, an increase in S produces a curve that is almost parallel to the horizontal axis, if the shape of lever 7 is designed so that hardly any exertion of force is needed to shift fulcrum 8. When movable fulcrum 8 is returned—i.e., with a reduction of S—the result for the force of movement is inversion of the mathematical sign but the same magnitude. The graph of force over distance then mirrors the horizontal diagram axis, which is why one therefore also speaks of "symmetrically" adjusted lever systems.

If it is assumed for example as in FIG. 30b that with a desired symmetrical force/distance profile the lever system is not yet correctly adjusted, it is possible to determine the actual contact force by moving movable fulcrum 8 within relatively small values for·s. If this results in a deviation from the nominal contact force, the nominal contact force may be found by shifting the lever system by an amount X.

It should be pointed out in this connection that within the scope of the present invention not only symmetrical force/distance diagrams are desired. In an advantageous embodiment of the present invention, both force/distance diagrams are in the negative range or both are in the positive range (depending on the directions defined for tension or pressure). The only deciding factor in this interpretation is that if servomotor 21 fails and if a non-self-locking adjusting spindle 33 is used movable fulcrum 8 moves by itself into a non-critical position. Depending on the intended safety strategy, a non-critical position here may be for example the position in which the particular clutch 2 is disengaged.

Figure 31:
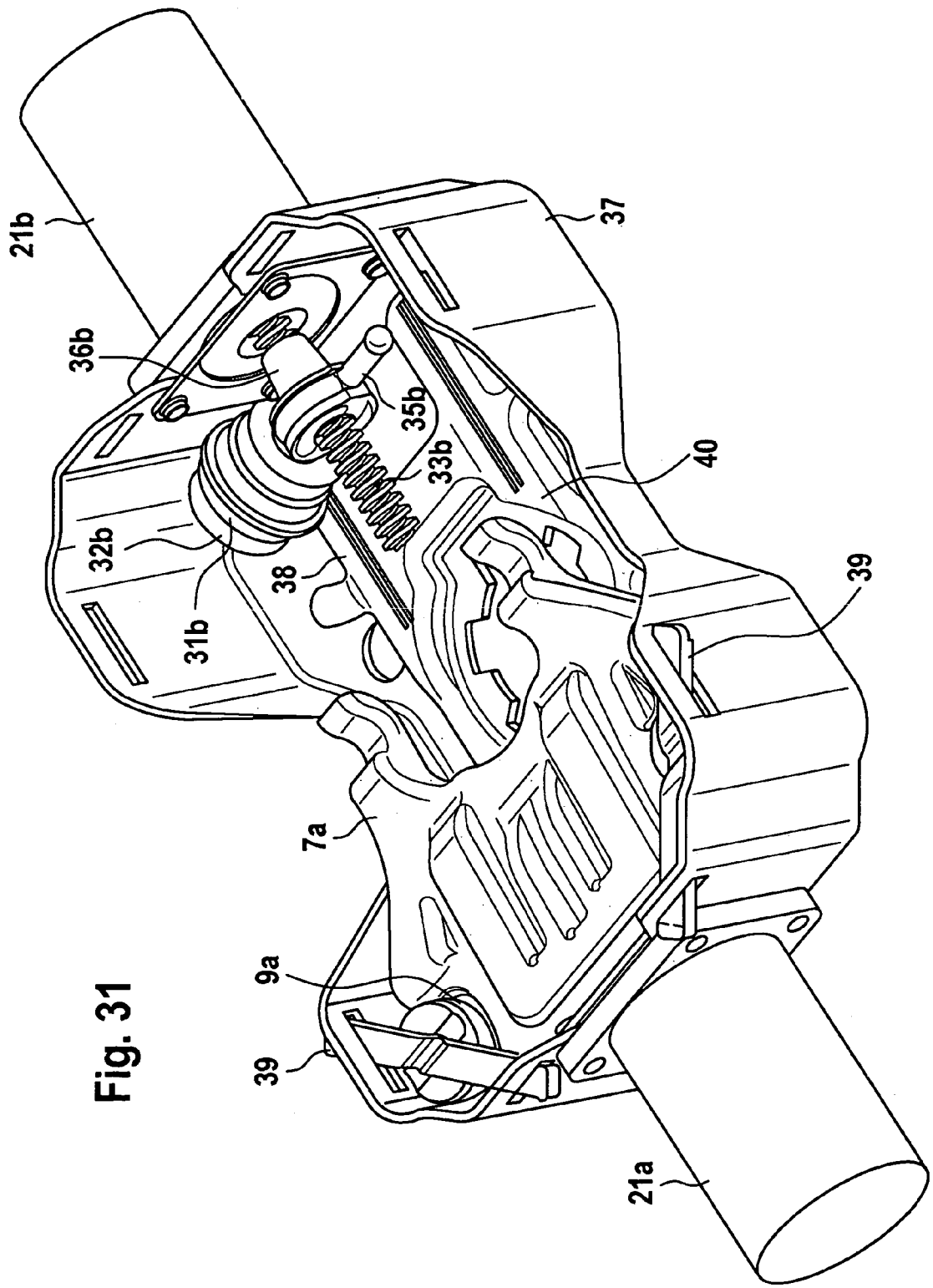
FIG. 31 shows a perspective and partially cutaway representation of a double lever system in a case.

FIG. 31 shows a clear, perspective view of a double lever system. This lever system has been partially cut away, in order to be able to also show the interior better. In the lower left area no parts have been removed for the sake of clarity, so that a complete lever system is visible there. In the upper corners of case 37 there are abutments 39, which are inserted or latched into slots of the case. These abutments 39 have a bead whose underside engages a basin-shaped indentation of a stopper, this stopper for its part engaging the one energy storage mechanism 9a. Lever 7a has strong profiling 38, which is designed in the shape of a printed "E" with two "center bars." The right end of lever 7a has two forks, which act on a sliding sleeve for a double clutch 2a, 2b. Servomotor 21a, which is represented only in stylized form, is attached to the wall of the case by riveted or screwed connections. In the upper right part of the double lever system, two abutments 39, energy storage mechanism 9b, lever 7b and a right roller 32b have been removed in order to better show the other parts. An adjusting spindle 33b is attached to servomotor 21b. The motor shaft and adjusting spindle 33 are adjustable as a single piece. This is possible advantageously and inexpensively using roller technology. However, adjusting spindle 33 may also be a part that is built separately and attached to the motor shaft during assembly—for example by shrinking. Adjusting spindle 33b (and naturally also adjusting spindle 33a) are preferably equipped with a motion-transmitting thread. An example of such a motion-transmitting thread is a trapezoidal thread.

Adjusting nut 36b encircles adjusting spindle 33b, adjusting nut 36b in turn being partially encircled by a yoke 35b. At the right end of yoke 35b the spherical end is recognizable. At the left end of the yoke is part of the bearing unit, which is made up of a roller 31b and an axis 32b. In the exemplary embodiment, roller 31b has a conical running surface. In combination with the profiling of case floor 40, the result is a guiding effect for the complete bearing unit, which also includes an additional roller and an additional axis. The star-shaped recesses in the middle of case floor 40 are to enable the double lever system located in case 37 to be placed on a transmission input shaft. If there are corresponding cams in the area on the transmission wall, it is also possible at the same time to capture a reaction moment to case 37 by using the star-shaped recesses.

Figure 32:
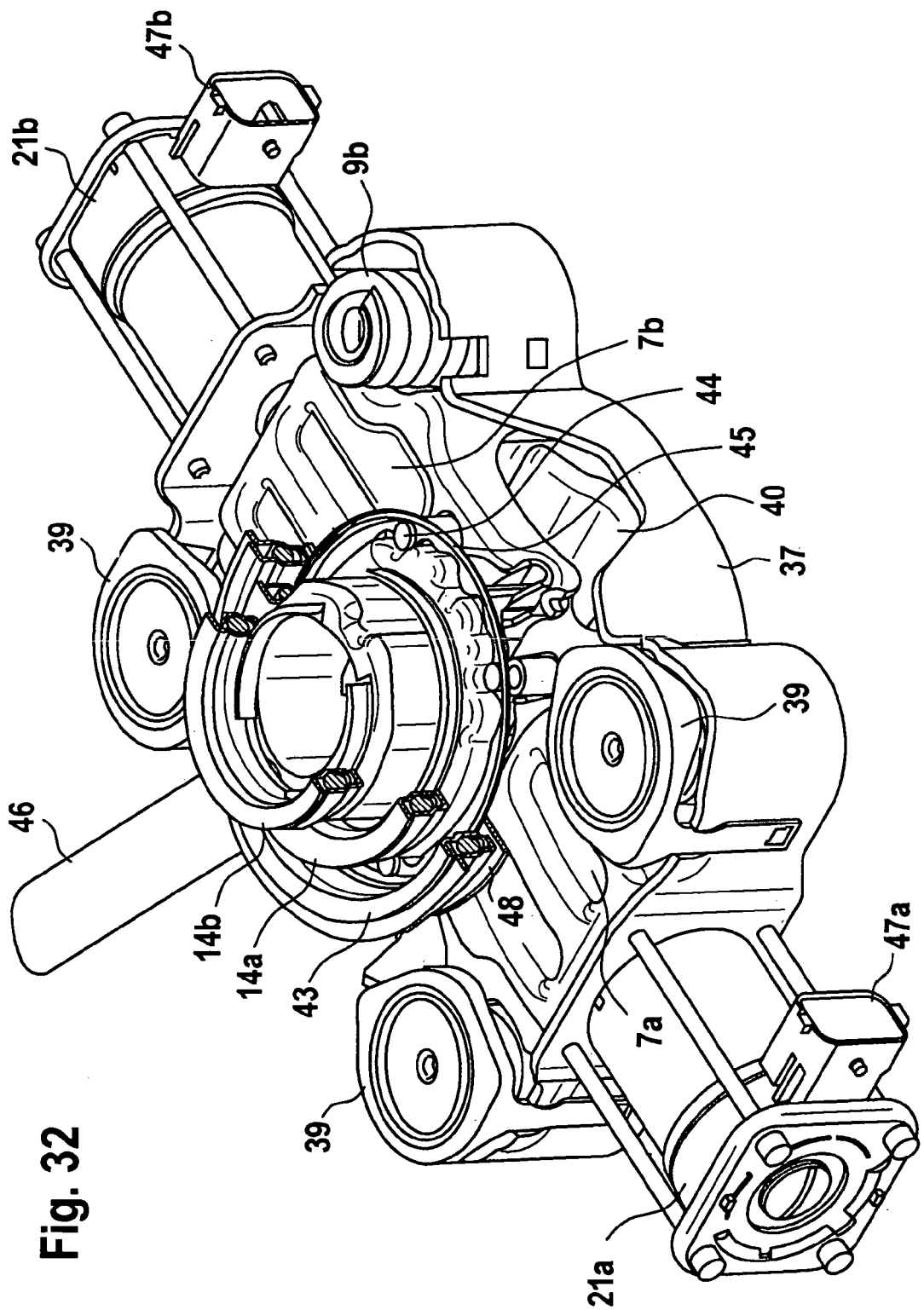
FIG. 32 shows another perspective and partially cutaway representation of a double lever system in a case.

FIG. 32 is an even more detailed depiction than FIG. 31. To avoid verbal repetitions of equivalent parts, let it be pointed out here once again that the reference symbols apply to the entire application.

The depiction in FIG. 32 shows the essentially axially operative bearings 43, 14a and 14b in cutaway. Bearings 14a and 14b here represent the thrust bearings—or disengaging bearings—for double clutch 2a, 2b. Clutch cover bearing 43 rests on a ring 48 which is connected to case 37 by spacer pins. These spacer pins 44 (only two of them are visible because of the cutaway depiction) are preferably riveted to ring 48 and case 37. The side of clutch cover bearing 43 that faces clutch cover 4 (not shown) may be connected to clutch cover 4 for example by a bayonet lock. This bayonet lock may be designed in such a way that the ring of clutch cover bearing 43 which turns when the vehicle is operated has tabs which snap into grooves of clutch cover 4.

The adjustment mentioned in connection with FIGS. 30a and 30b may be made by inserting at least one spacer ring of appropriate thickness between ring 48 and clutch cover bearing 43. It is advantageous here for this spacer ring to be radially slotted essentially in one place, so that it may be tightened thereby even after the final installation of the lever system.

A special feature of the design is also made recognizable because right abutment 39 has been removed to make the depiction clearer. That makes one of the energy storage mechanisms (in this case energy storage mechanism 9b), which is constructed of two interleaved helical springs, visible. By combining various spring characteristics it is possible to produce greatly varying overall spring characteristics. It is also possible to influence the properties and behavior of the energy storage mechanisms 9 by using opposing coiling directions. The use of opposing coiling makes it possible for example to compensate for twisting of the helical springs—which may occur during compression and/or release of the springs—whereby frictional moments of the springs with their contact surface are largely prevented, making the spring characteristic more hysteresis-free overall.

Figure 33A:
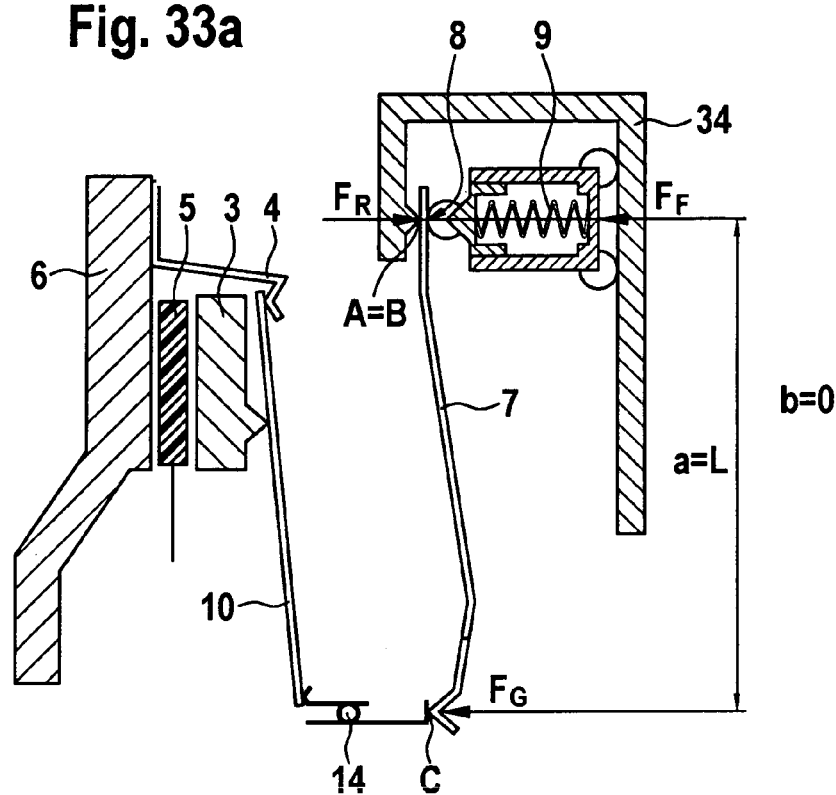
FIG. 33a shows a schematic layout of the lever system according to the present invention, representing a disengaged clutch with a different design of the pressure spring.
Figure 33B:
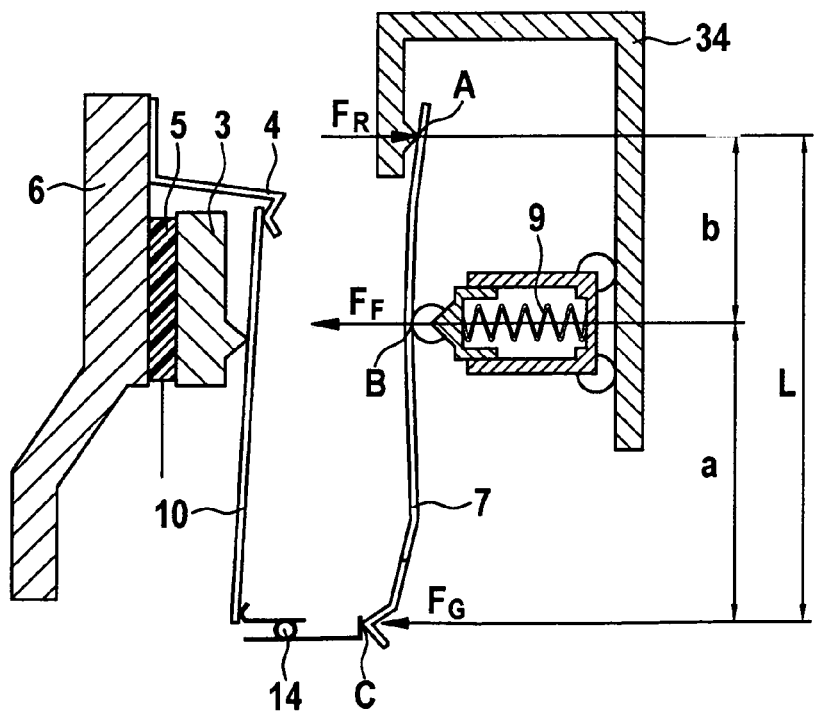
FIG. 33b shows the lever system according to FIG. 33a, but in the engaged state.

FIGS. 33a and 33b show a schematic representation of the system according to the present invention, where a change in the length ratios at lever 7 are brought about by shifting the roller, i.e., support point B, and hence fulcrum 8.

In FIG. 33a, which shows clutch 2 in the disengaged state, equilibrium of forces prevails between spring force $F_F$ of energy storage mechanism 9 and force $F_R$ acting on the roller. In this position, the spacing from support point C to resulting force $F_G$ on lever 7 has length "l", since the line of action of energy storage mechanism 9 passes through fulcrum 8, which is congruent with support points A and B at this position.

The engaged state of clutch 2 may be seen from FIG. 33b. In this figure the shift of support point B is visible schematically, whereby length "l" of lever 7 is subdivided into length "a" and length "b" and thus a division of force occurs simultaneously.

The resulting force (actuating force) which is transmitted via support point C is thus found from the equation:

$$F_\delta = \frac{F_F \times b}{l}$$

This principle of the arrangement of energy storage mechanism 9 is put into effect in FIGS. 3, 5, 36 and 40.

Figure 34:
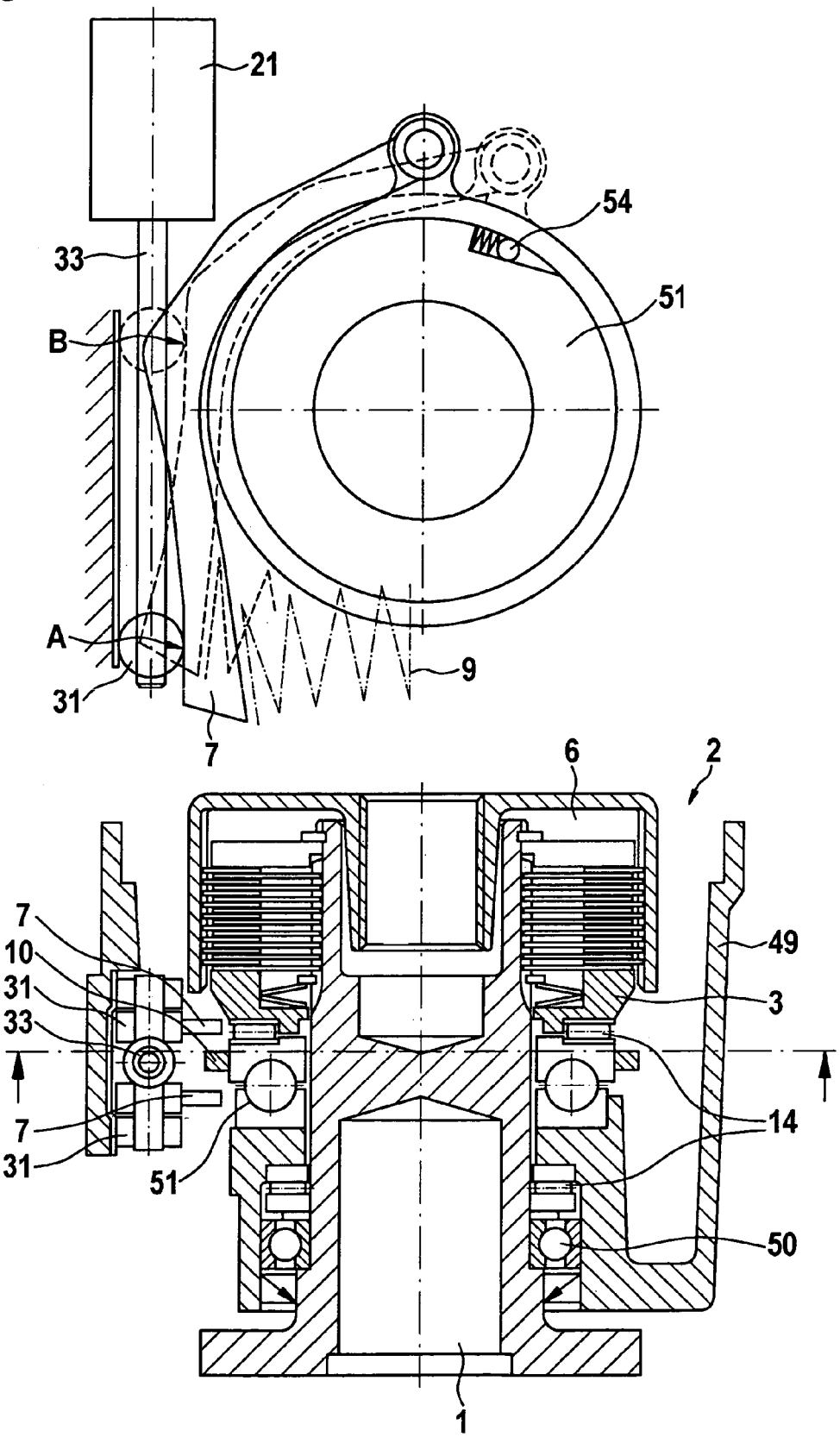
FIG. 34 shows a central ramp disengager having radially positioned rocking levers.

FIG. 34 shows a mechanical ramp disengager in which lever 7 is designed like a fork and is attached to the circumference of ball ramp 51 and is provided with a raceway. This raceway provides two end positions for rollers 31 positioned in pairs on both sides of the fork, between which they are movable.

In order to disengage or engage clutch 2, lamellas 5c must be compressed or opened correspondingly by the mechanical ramp disengager. To that end, the pressure force coming from servomotor 21 is transmitted by adjusting spindle 33 to rollers 31 or brought from their starting position A. Fork-like lever 7, which in this position is in contact by its running surface with rollers 31 on the one side and with energy storage mechanism 9 on the other side and is in force equilibrium with the latter, is moved into position B by the movement of adjusting spindle 21 and the counterpressure of the pressure spring (energy storage mechanism 9) via the connection of rollers 31 and raceway, in which the rocking curve is formed. This movement causes a change in the length ratios at lever 7.

To guarantee that the starting position of lever 7 remains constant, there is a free-wheeling clutch 54 on the ramp disengager, whose purpose is to compensate for wear that develops as a result of material fatigue, abrasion, etc., by repositioning. The large number of clutching procedures leads to the phenomenon that lever 7 no longer assumes the position shown in FIGS. 33a and 33b, but inclines. For the disengagement process this means that a greater actuating force must be applied by adjusting spindle 33. If a certain limiting value is exceeded, adjusting spindle 33 moves past point A, causing the free-wheeling clutch to overtake or readjust ball ramp 51. The point in time for a necessary wear readjustment is detected through increased power demand at servomotor 21 or longer reset times during de-energized runback of the spindle.

This radial arrangement of the ramp disengager is especially advantageous when the construction space does not allow any other option.

Figure 34A:
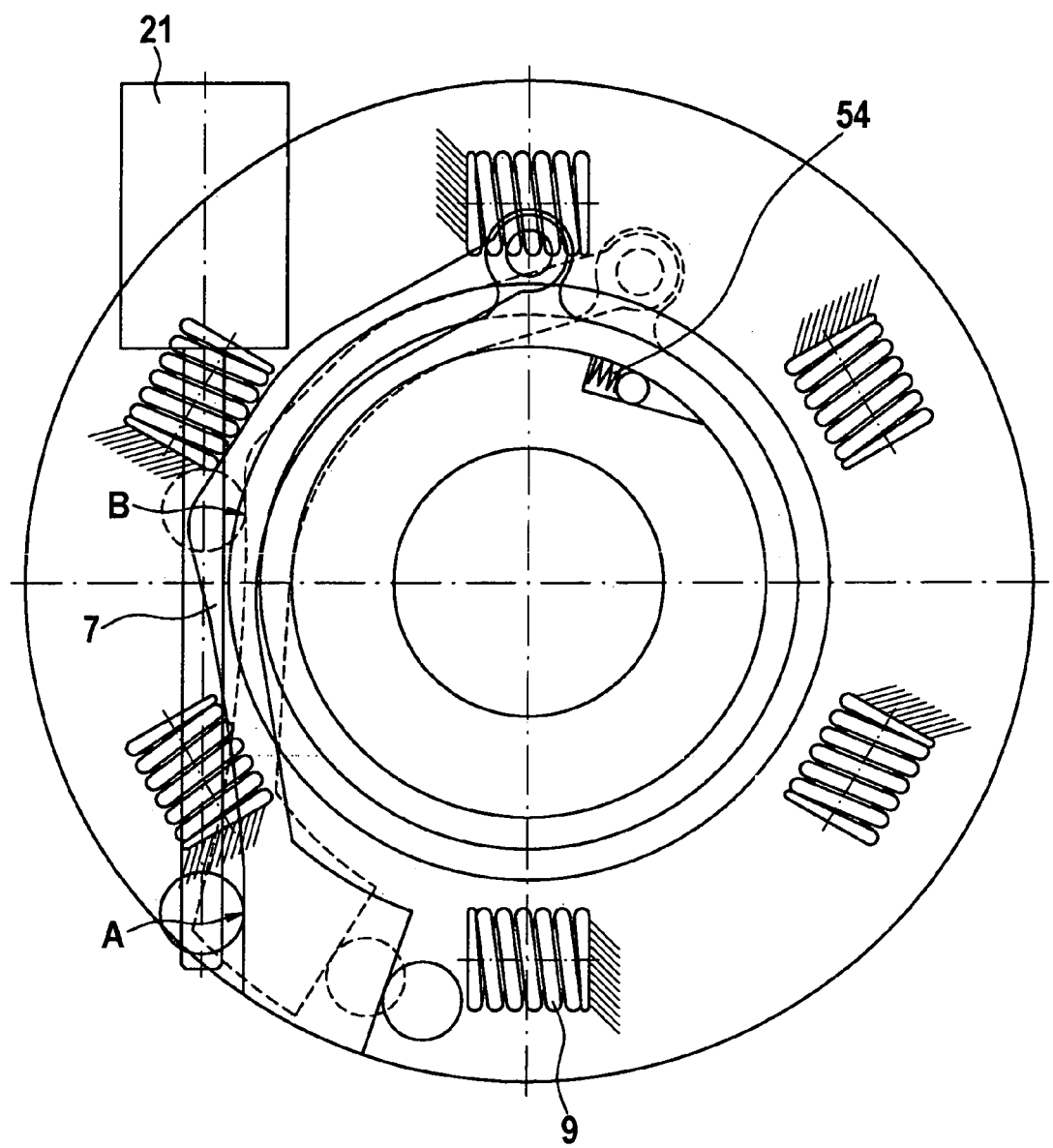
FIG. 34a shows ramp disengagers having radially positioned pressure spring storage mechanisms.

FIG. 34a also shows a ramp disengager in which lever 7 is located on the circumference of ball ramp 51. The special feature of this version is that the single energy storage mechanism 9 illustrated in FIG. 34 has been replaced by a plurality of energy storage mechanisms 9 in the form of spring energy stores distributed over the circumference, similar to those used in torsion dampers for clutch disks. That makes it possible to accommodate more energy storage mechanisms 9 in a radial construction space, in order to obtain greater storage capacity. The energy or spring force stored in the individual energy storage mechanisms 9 is passed along to lever 7 through a torque support.

This version is also provided with a free-wheeling clutch 54, which causes the starting position of lever 7 to be constant and hence actuating force $F_G$ to remain the same.

Figure 35:
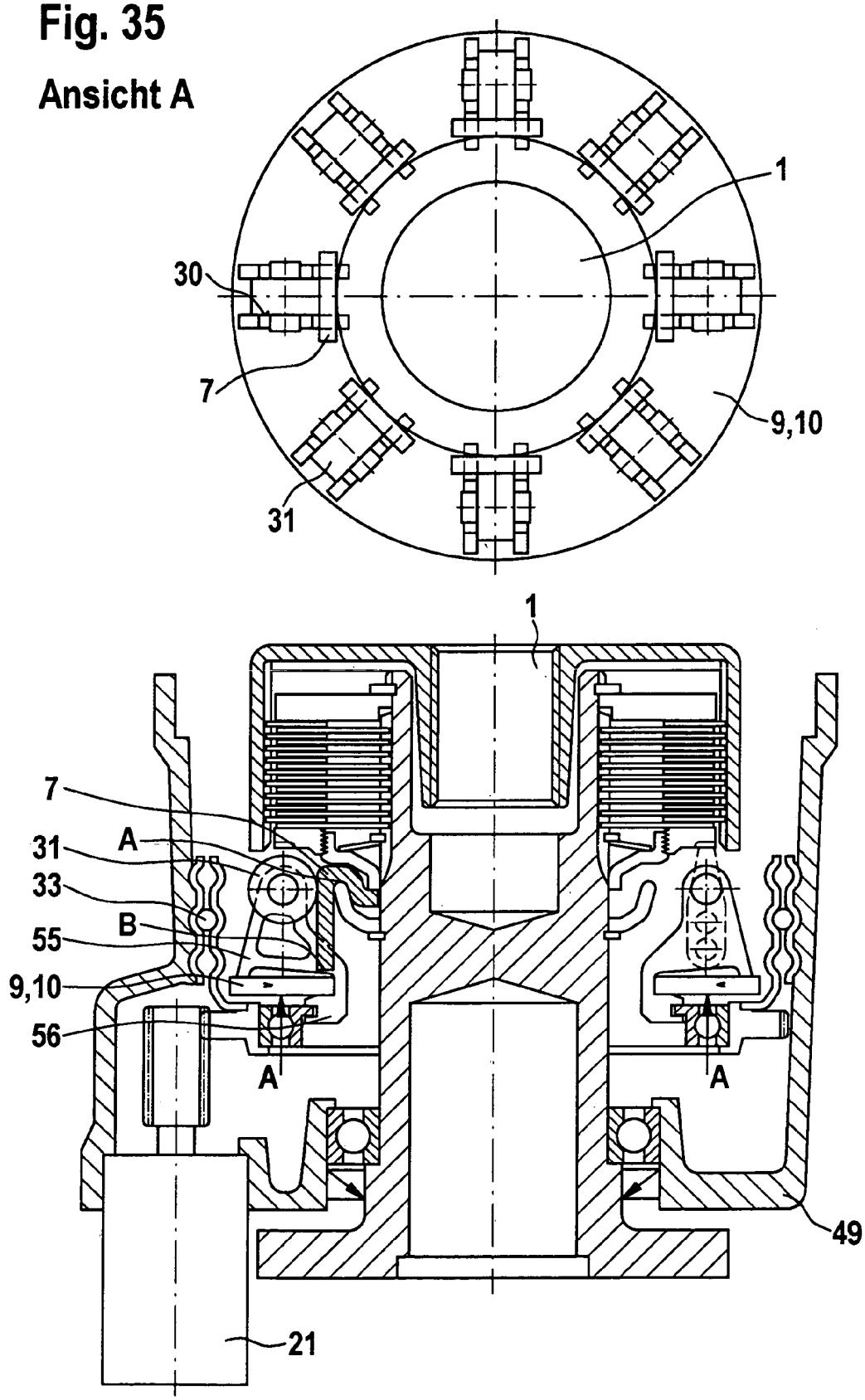
FIG. 35 shows radially positioned rocking levers, where the disk spring also functions simultaneously as a pressure spring.

In contrast to the preceding exemplary embodiments, FIG. 35 represents a variant of the system according to the present invention in which the disengagement process is implemented by levers 7 positioned radially on the ramp disengager, known as rocking levers. This embodiment also differs from the previous embodiments in the fact that disk spring 10 simultaneously takes over the function of energy storage mechanism 9, so that the latter may be omitted.

In this embodiment, disk spring 10 or energy storage mechanism 9 is thus moved along lever 7 with rollers 31. Levers 7 each have a predefined curve (rocking curve), on which rollers 31 are forced to roll. Rollers 31 are also moved axially on these raceways. During the transfer of force, rollers 31 are braced by a piece of housing sheet 55 attached to disk spring 10.

With the help of the rocking curve, equilibrium of force and energy is created between lamella pack 5c and disk spring 10. The axial movement of rollers 31, i.e., the axial displacement of support point B, is initiated by a threaded sheet 56 which is supported on the outside of housing 49.

Figure 36:
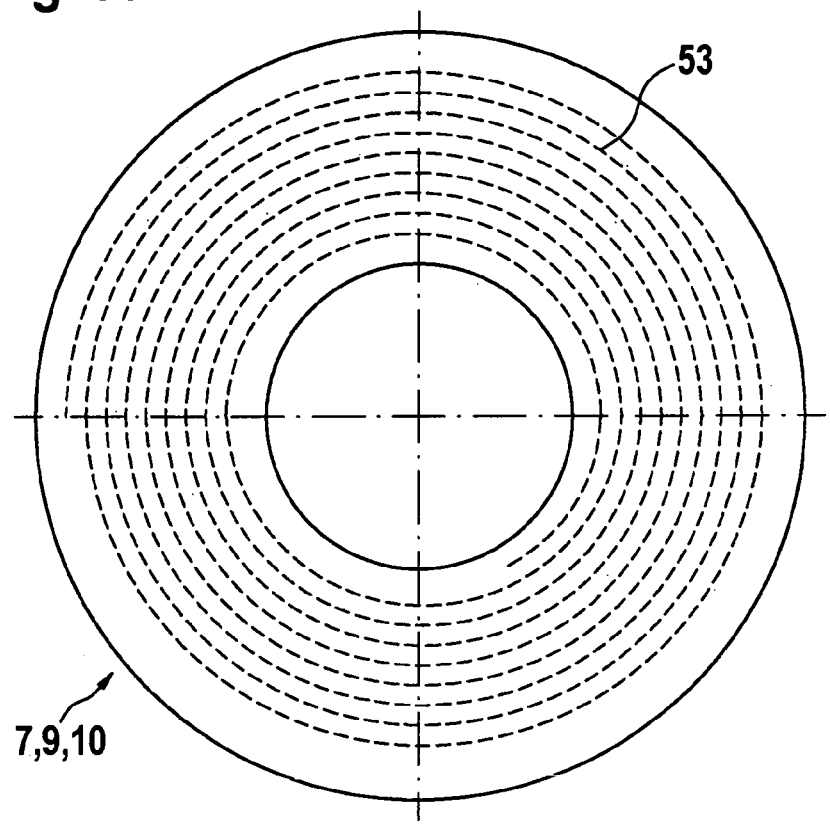
FIG. 36 shows ramp disengagers having a spiral disk spring as the means of force transmission.
Figure 36:
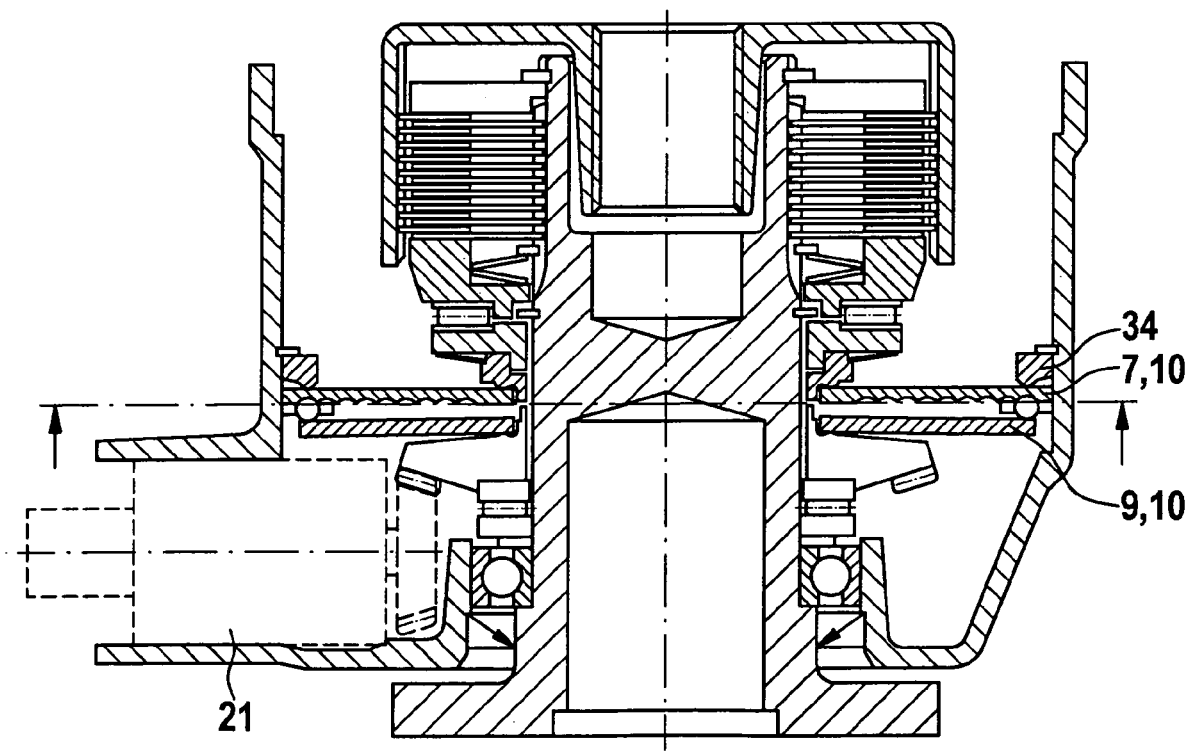

FIG. 36 shows a variant of the clutch engagement by two disk springs 10, where in this variant, in contrast to the previous embodiment, one of disk springs 10 also performs the function of an energy storage mechanism 9 and is pre-tensioned (spirals provided directly on the disk spring). Second disk spring 10 (which could also be called a diaphragm spring) in this case is identical with lever 7. This disk spring 10, i.e., lever 7, is not pre-tensioned, but rather is relatively soft axially. Built into one of the two disk springs 10, 7 or 10, 9, depending on the design, there are one or more spiral-shaped raceways, known as ball raceways 53, on which a plurality of balls 31 (as a special form of rollers) move.

Two effects are utilized here to engage clutch 2. First, the support point of the disk spring is made smaller, and thus at the same time the force of the disk spring is increased. Second, the length ratios of the rollers acting as a lever are changed, triggering the actuation.

By rotating one of the disk springs, for example 10, 9, balls 31 are moved along this raceway 53, causing the outer support point of disk spring 10, 9 and thus the force of the disk spring to change. That applies overpressure to opposite disk spring 10, 7 and engages clutch 2. To compensate for the force and energy, disk spring 10, 7 attached to the output side also has the shape of a rocking curve which is unwound on the spiral. In principle, however, the rocking curve may also be attached to second disk spring 10, 9. The shape of the spiral and of the rocking curve depend on the particular clutch 2. The spirals may thus also be much shorter. For example, the spirals may be on an angle of only 45°, so that a plurality of spirals must be formed, distributed around the circumference. When a plurality of spirals are used, one ball 31 runs in each raceway 53. When there is only one raceway 53, many balls 31 are located in direct succession, guided by a cage. The torsion of disk spring 10 located on the clutch side is accomplished for example by an upstream system of bevel gears.

Figure 37:
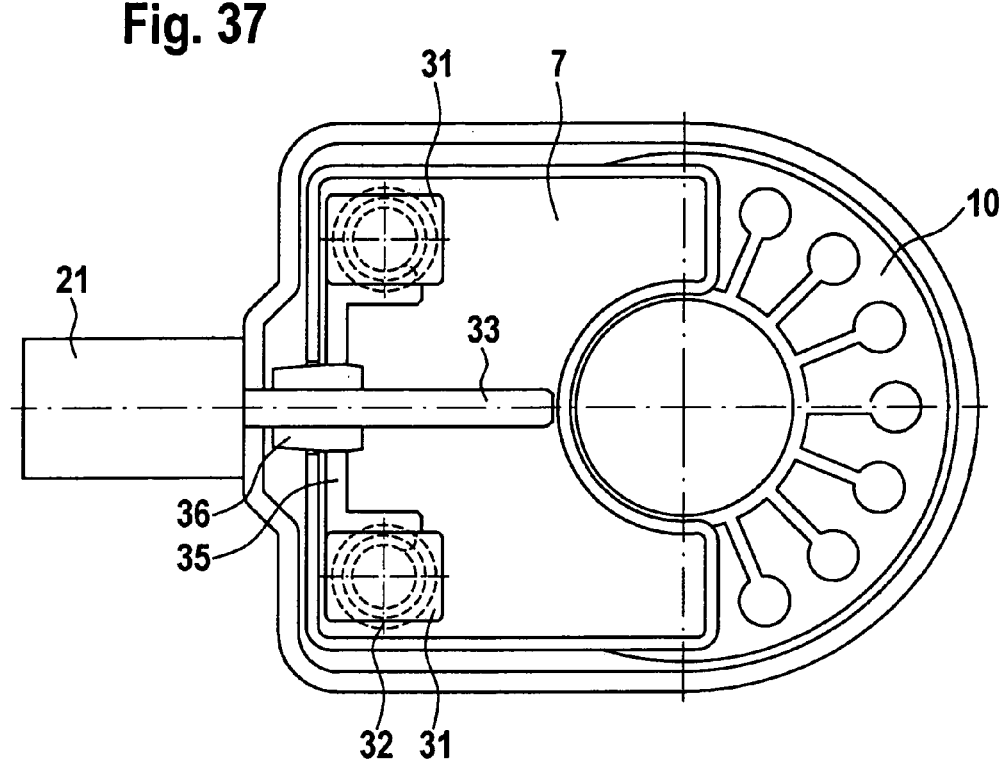
FIG. 37 shows axially positioned ramp disengagers having a special configuration of the pressure springs.
Figure 37:
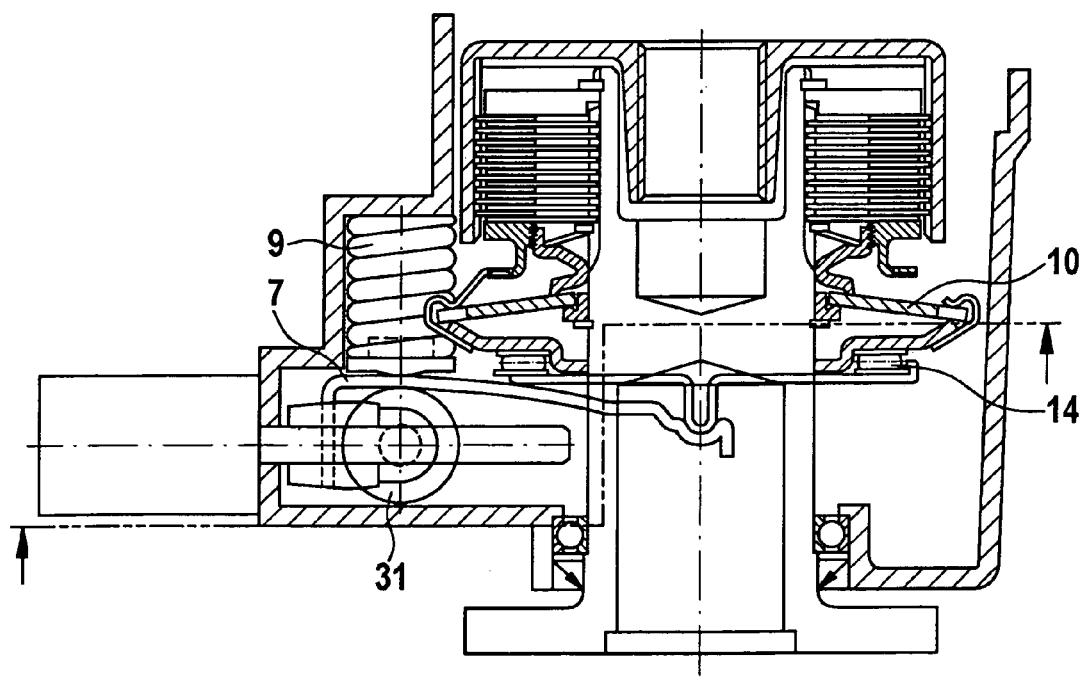

It can be seen from the variant according to FIG. 37 that energy storage mechanism 9 is positioned axially above rollers 31 which are connected to each other by a yoke 35, in order to utilize the existing axial construction space. In this case pressure is applied to disk spring 10 indirectly through lever 7. Rollers 31 are moved accordingly on their raceway by actuating adjusting spindle 33 of adjusting motor 21, lever 7 simultaneously actuating disk spring 10.

Figure 38:
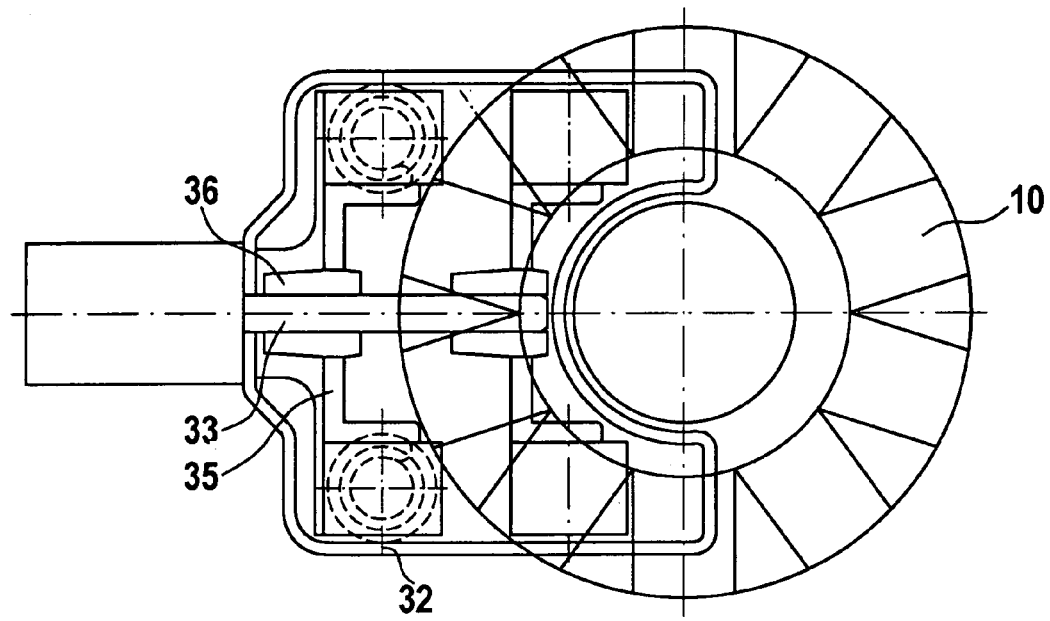
FIG. 38 shows ramp disengagers as in FIG. 37 with an emergency unlocking device.
Figure 38:
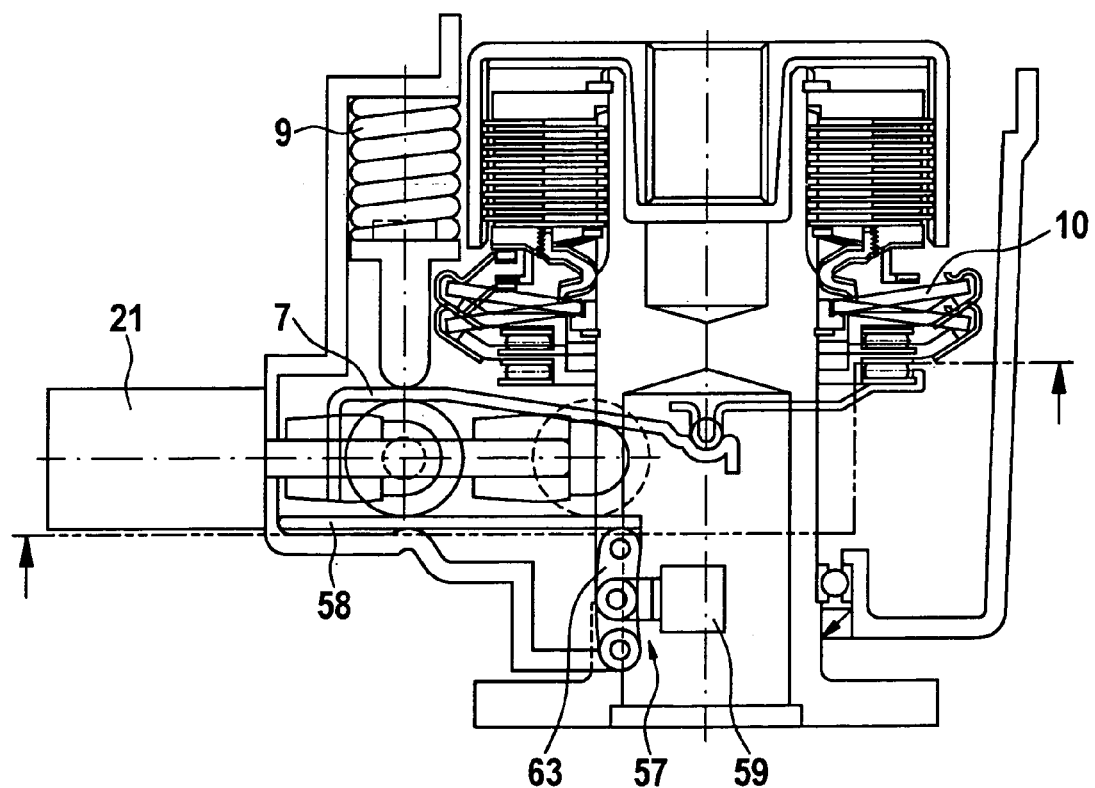

FIG. 38 shows an additional embodiment of the system according to the present invention, with two different positions of disk spring 10. It differs from FIG. 37 in that in this embodiment there is an emergency unlocking device 57, so that clutch 2 is able to disengage by itself if the power fails. One possibility for triggering the emergency unlocking system is to design the rocking curve for roller 31 so that there is always a restoring force available. That means that the force of energy storage mechanism 9 is great enough so that rollers 31 are always pressed into their starting position in the direction of adjusting motor 21. This means that the maximum actuating force would increase, however.

In order to avoid this, an additional metal plate 58 is introduced, which is rotatably supported on the one side on housing 49 and is held on the other side by electromagnet 59 via a toggle system 63. If the power fails, electromagnet 59 loses its magnetic force and it is possible to open toggle system 63. In addition, the supporting force for rollers 31 is lost and clutch 2 disengages. By returning rollers 31 past the starting point, additional metal plate 58 may be returned to its starting position. That re-tensions toggle system 63, and it may easily be held by electromagnet 59. Since electromagnet 59 has no other function than to hold the toggle system in a certain position during operation, it may be relatively small.

Figure 39:
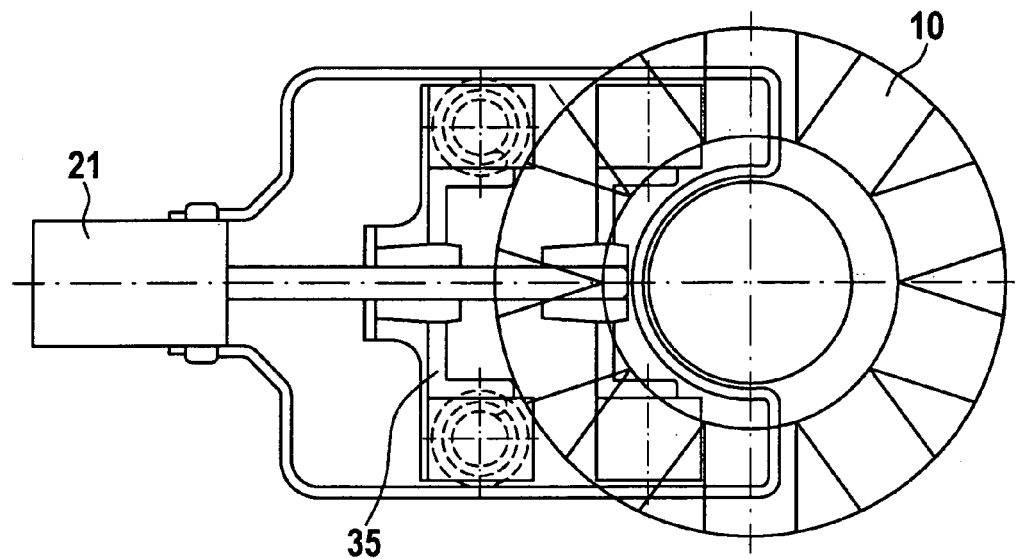
FIG. 39 shows a ramp disengager in which the force is transmitted by moving an additional metal plate having a rocking curve profile.
Figure 39:
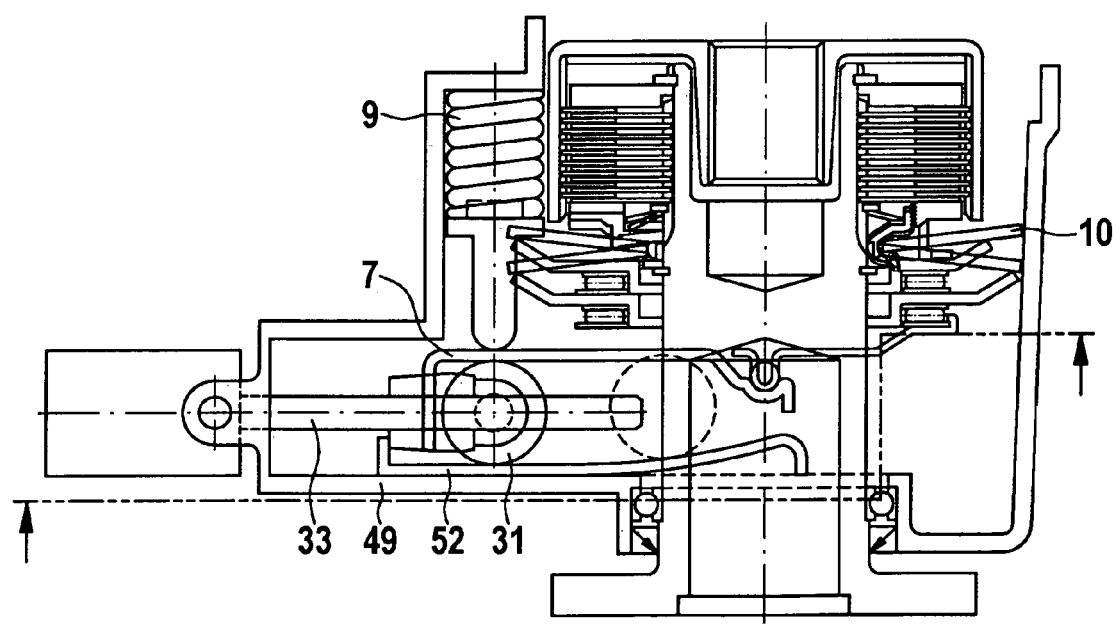

FIG. 39 shows an additional variant of a disengager according to FIG. 38. In contrast to FIG. 38, a shaped metal plate 52 on which the rocking curve for roller 31 is stamped is supported on housing 49. In this variant, lever 7 is flat. Roller 31 rolls along the rocking curve of shaped metal plate 52 in the direction of shaft 1, and in so doing presses lever 7 against disk spring 10, which is depicted in two positions. This variant, having an additional shaped metal plate 52 with rocking curve, makes it possible to shift the latter relative to energy storage mechanism 9. That shifts the contact line of lever 7, and a different momentary increase in the area of lever 7 may be set for each position of rollers 31. In the area of the full contact force, it is therefore always possible to achieve complete compensation of the disengaging force. Only in the area of the air space and the flat lining resilience characteristic is it impossible to achieve complete compensation, since an initial incline comes about as a result of the shift in the rocking curve.

This embodiment is preferably suited for wet clutches with oil lubrication. For dry clutches a roller guide would be needed under energy storage mechanism 9. Another difference from the embodiment according to FIG. 38 is the rotatably mounted adjusting motor 21, to enable height compensation when running up the rocking curve.

Figure 40:
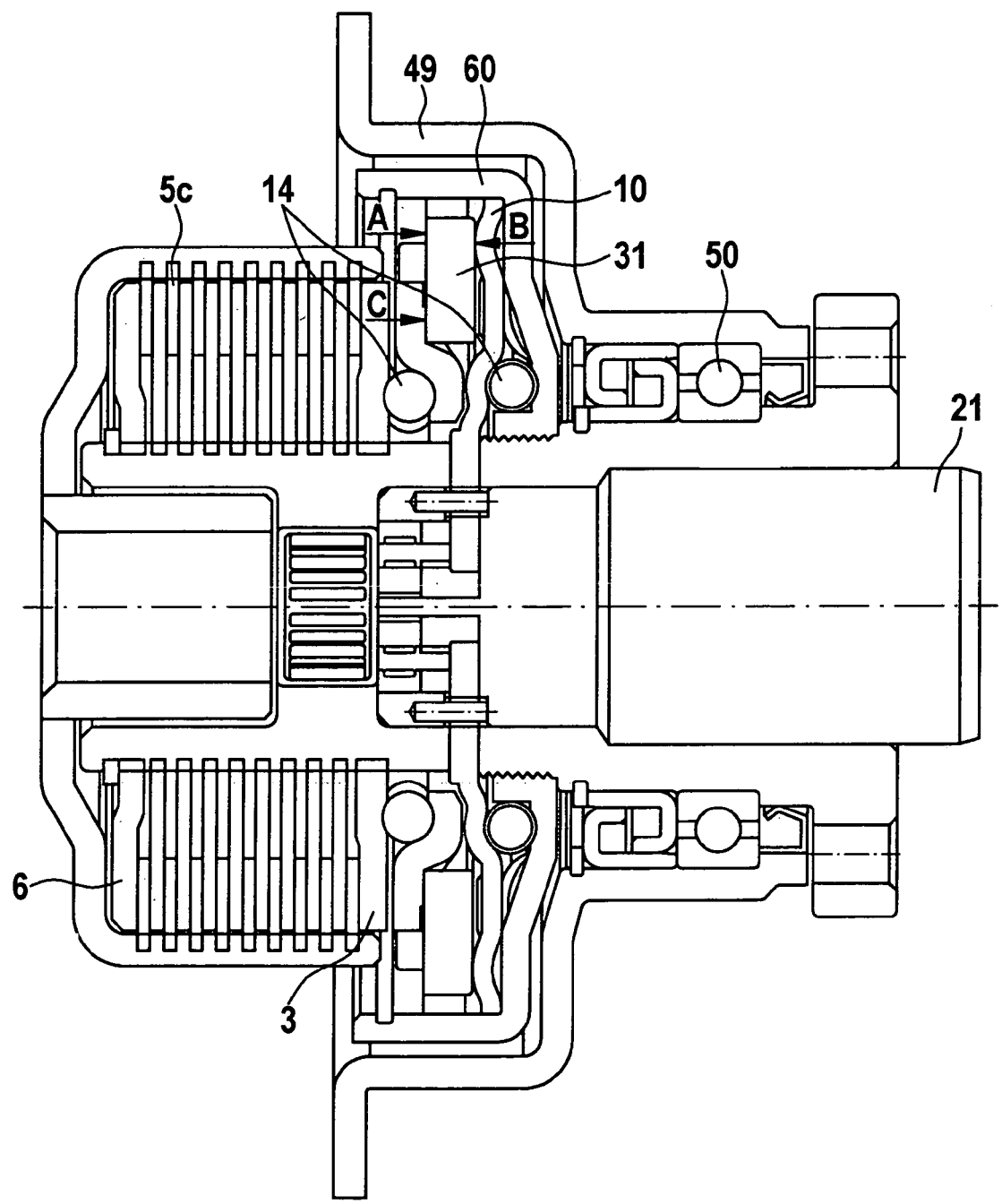
FIG. 40 shows a disengager having an internal electric motor.

FIG. 40 shows another possibility for implementing a disengager. In this case servomotor 21 is located on the inside, so that adjusting spindle 33 may be eliminated. This results in a different possibility for transmitting force. The force coming from servomotor 21 is thus not introduced into the disengager from outside, as in the past, but from inside. That results in corresponding changes in regard to the further transfer of force, since disk spring 10 is in direct contact with the shaft of servomotor 21 through a planetary gear. During disengagement this rotates disk spring 10, which causes the roller bodies to roll on beads 62 of disk spring 10 according to FIGS. 7a and 7b. In this example, the roller bodies are simultaneously rollers 31 and part of lever 7. The displacement of support point B between disk spring 10 and roller bodies 31 results both in an increase in the force of the disk spring and in tipping of roller bodies 31, which compress lamella pack 5c of clutch 2 through pressure plate 3. Conversely, when the direction of the shaft of servomotor 21 is changed, the lever system produces a spacing of the individual lamellas of lamella pack 5c. In order to largely prevent friction (specifically boring friction) when rotating disk spring 10, it is necessary to insert an additional roller bearing 14 in series at inner support point C of rollers 31. This compensates for the additional distance of rollers 31 from outer support point A to inner support point C. Disk spring 10 is also supported on housing 49 via a roller bearing 14, so as to minimize friction here also.

In order to preserve the optimal axial position of disk spring 10 with respect to lamella pack 5c in the event of wear, there is threading on pot 60. If wear occurs, pot 60 is rotated by servomotor 21 relative to housing interior 49 via a stop in disk spring 10, and thus the entire disengaging system is advanced with respect to lamella pack 5c. That ensures a constant air gap, and thus constant actuating moments, over the life of clutch 2.

Figure 41:
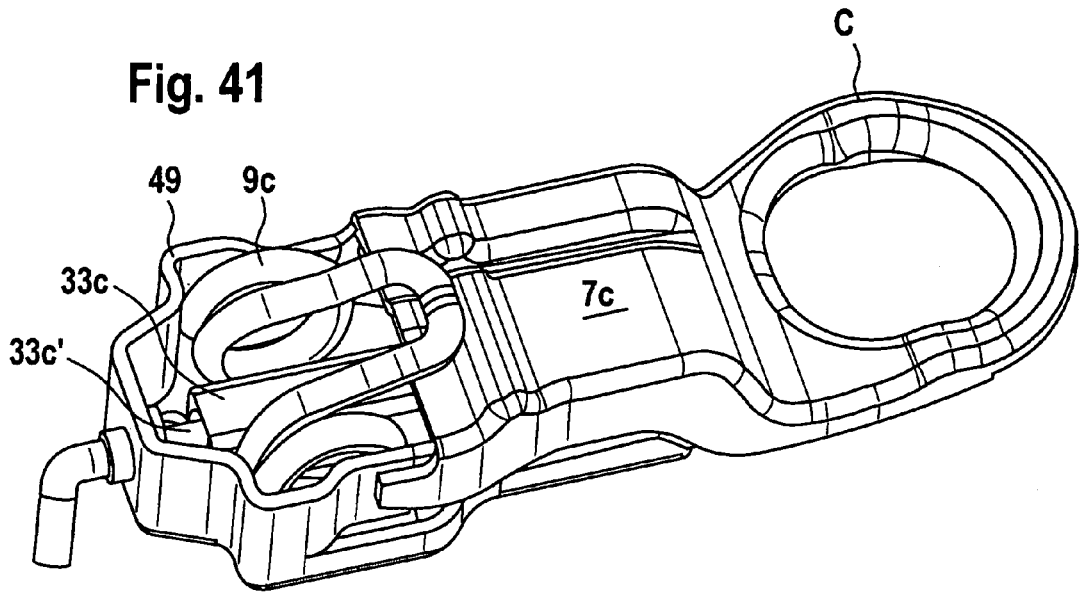
FIG. 41 shows a hydraulically actuatable disengager in the form of a rocker lever.
Figure 41A:
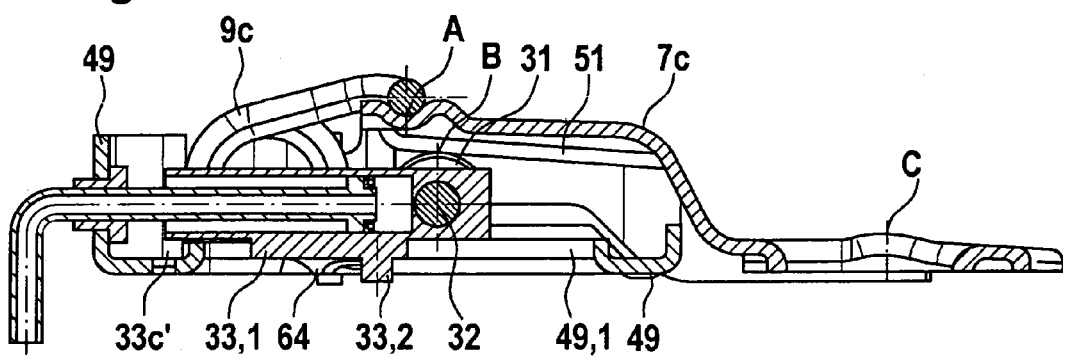
FIG. 41a shows a sectional view through the disengager according to FIG. 41.
Figure 41B:
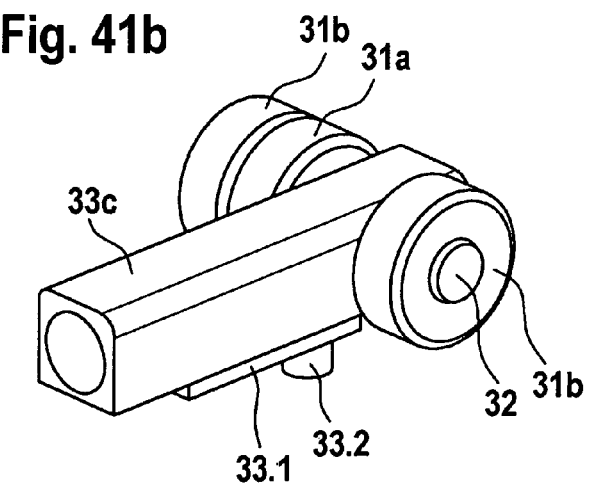
FIG. 41b shows a unit of a hydraulically actuatable cylinder having rollers 31 (which act on the lever (31a) and roll on the housing 49 (31b))
Figure 42:
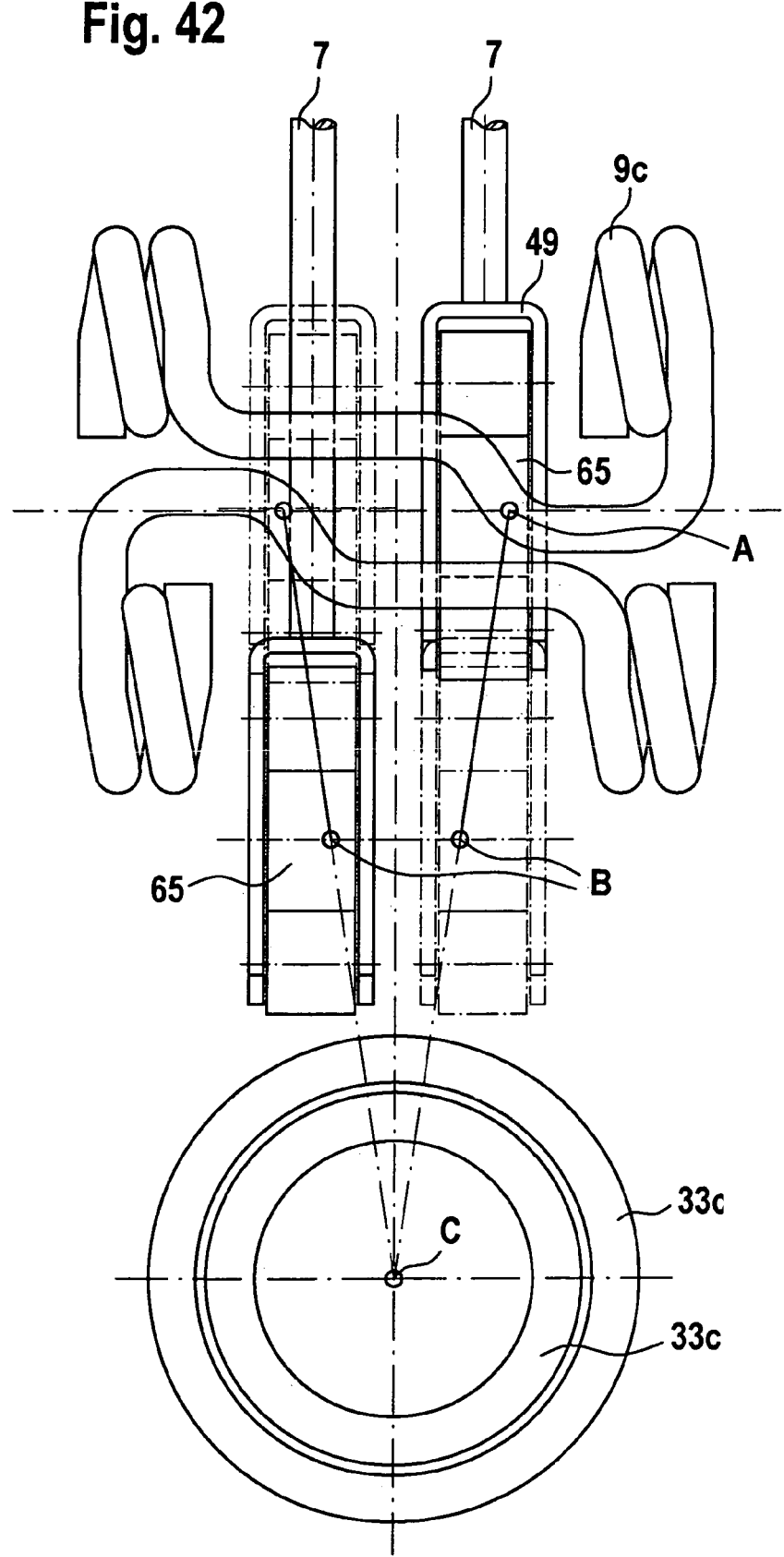
FIG. 42 shows the basic principle of a double hydraulically actuatable rocker lever disengager (left disengager in engaged position, right disengager in disengaged position)
Figure 42A:
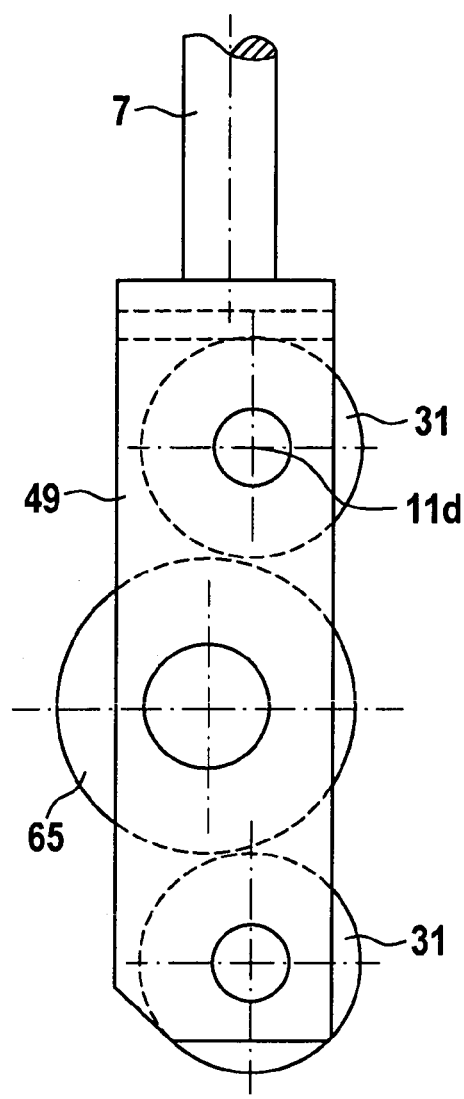
FIG. 42a shows a side view of the double rocker lever disengager represented in FIG. 13.
Figure 43:
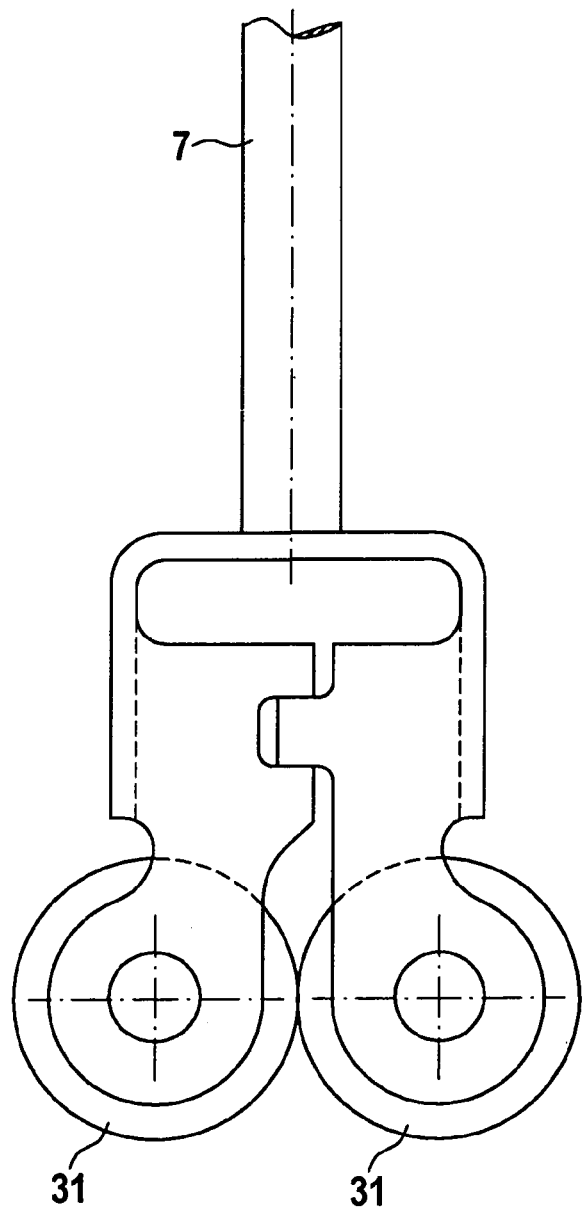
FIG. 43 shows a design of a roller carriage.

An additional possibility for applying the basic principle according to FIG. 2 is illustrated in FIG. 41. This involves a hydraulically driven disengager in the form of a rocker lever disengager. FIG. 41b shows how rollers 31 are coupled to a hydraulic cylinder 33c. Hydraulic cylinder 33c is connected to roller axis 32 and piston 33c' to housing 49. The base of this disengager is housing 49, designed as a shaped sheet metal part, which is normally rigidly mounted on the transmission housing in the vehicle. Secured in housing 49 is a two-legged spring, as energy storage mechanism 9c, whose force acts on the free end of engaging lever 7. Engaging lever 7 is guided by leg spring 9c. Lateral stops on housing 49 support this guiding.

When pressure is applied, hydraulic fluid is pressed through fixed piston 33c' into movable hydraulic cylinder 33c. Since hydraulic cylinder 33c tends to tilt to the side due to the asymmetrical structure of the 3 roller concept (FIG. 41b), it is guided in housing 49 by housing guide 49.1 (FIG. 41a). The displacement of hydraulic cylinder 33c caused by the application of pressure also causes a displacement of rollers 31 (FIG. 41a), in which the two rollers 31b roll on housing 49 and roller 31a runs on engaging lever 7c. The support or support point B of engaging lever 7c is also displaced, since engaging lever 7c rests on roller 31a with its curved path. The load is transferred from this roller 31a via roller axis 32 to rollers 31b to housing 49. Roller 31a and rollers 31b (movable support) are shifted hydraulically. To enable rollers 31 to regain their starting position, the curved path of engaging lever 7c is designed so that in every position of engaging lever 7c a contrary force component acts on hydraulic cylinder 33c, so that rollers 31 are returned to their starting position.

Figure 44:
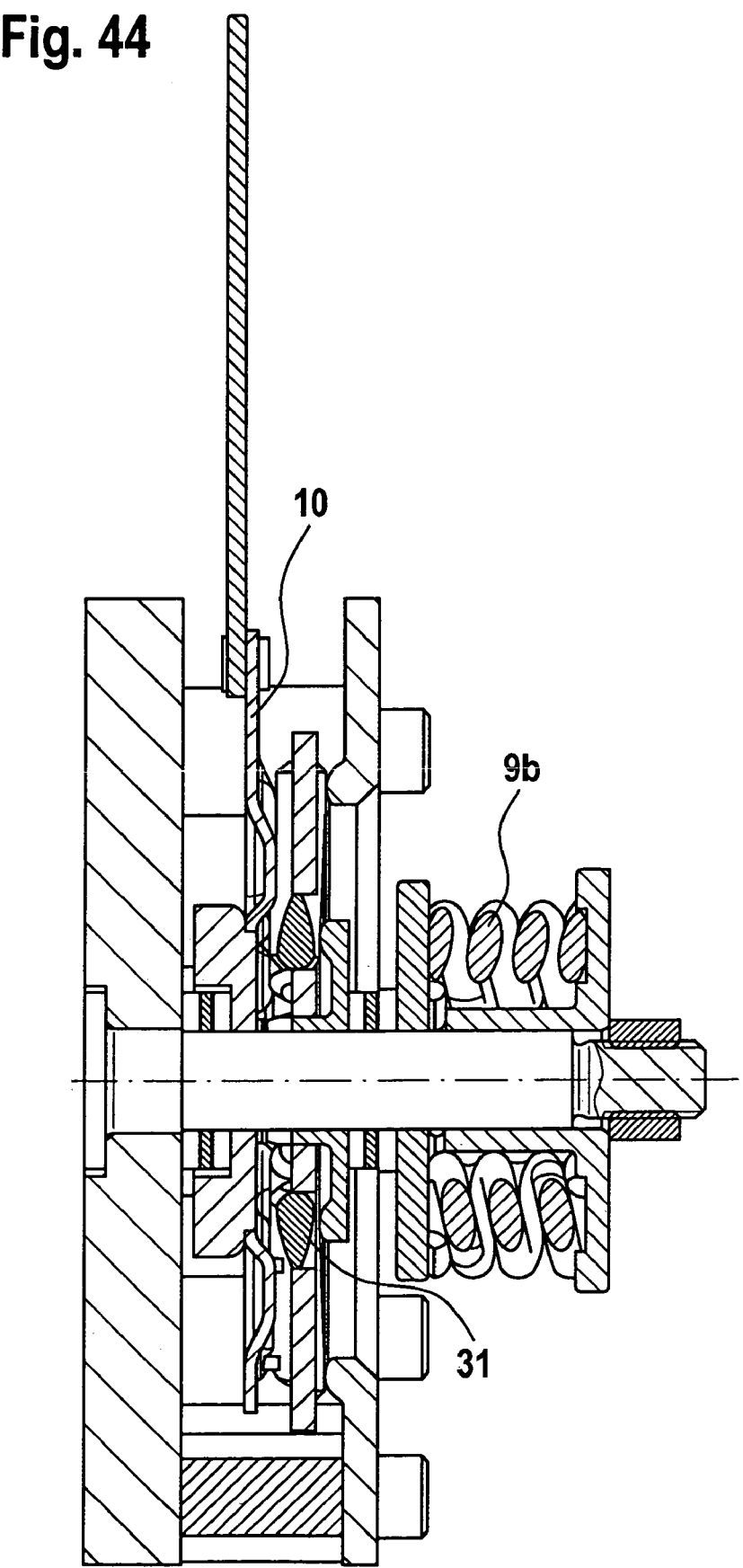
FIG. 44 shows sectional views of an additional variant of a disengager.
Figure 45:
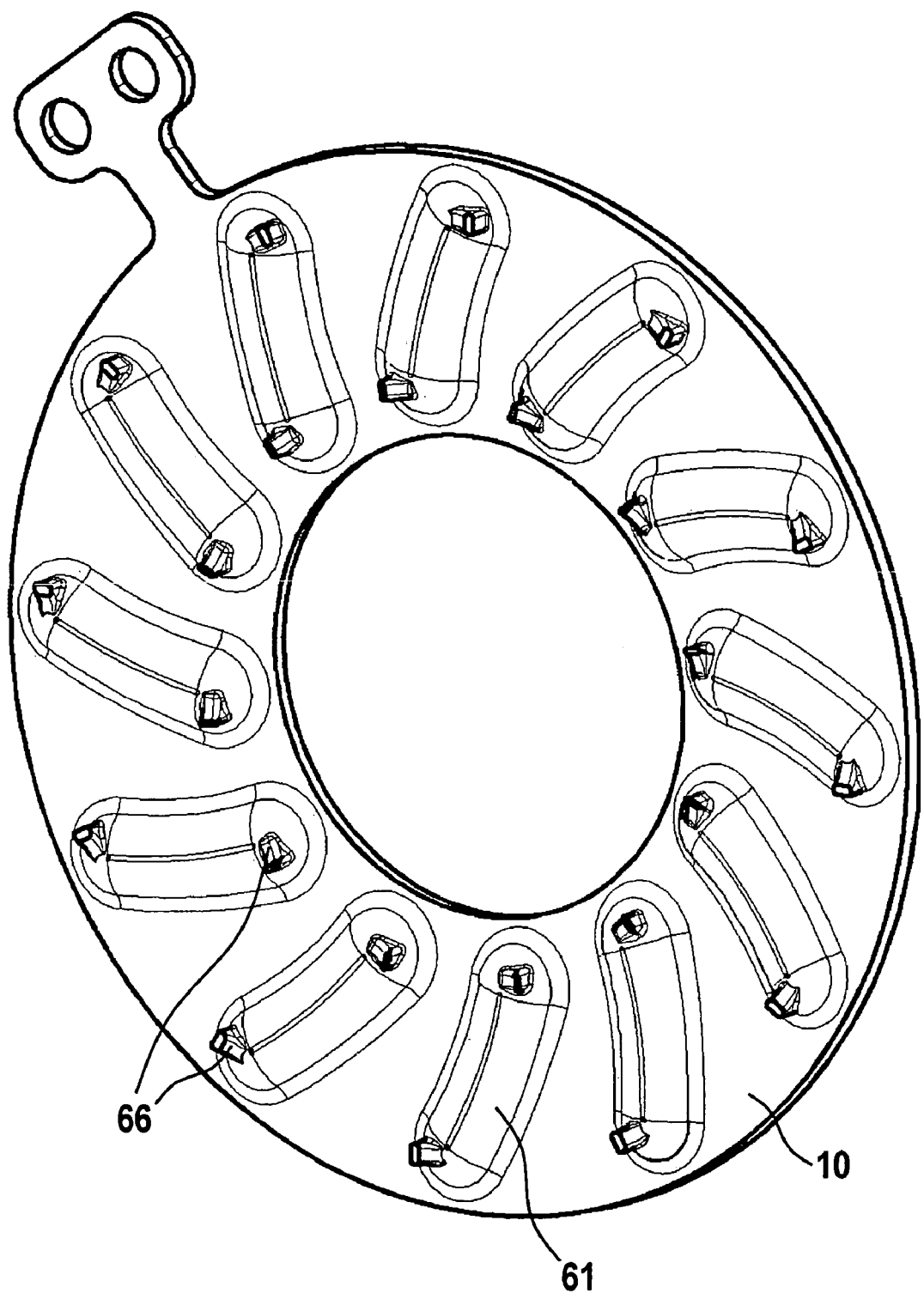
FIG. 45 shows a design of the disengaging spring having stop cams positioned at the end of the cages for accommodating the rollers (spirals)

FIG. 44 shows another possibility for designing a mechanical disengager having manual actuation. Here again, according to the basic principle of the inventive idea, the length ratios of the lever are changed by rollers 31 acting on it, and thus support point B of disengaging spring 10 (or spiral plate 7d) is changed. FIG. 45 shows this mechanical embodiment of the disengager, the design of disengaging spring 10, 7d. What is new in comparison to the embodiments presented in FIGS. 7a and 7b is that at the end of each of the spiral-shaped cages 61 there are stop cams 66, which prevent disengaging spring 10, 7d from rotating too far and thus prevent rollers 31 from slipping out of cage 61.

Figure 46:
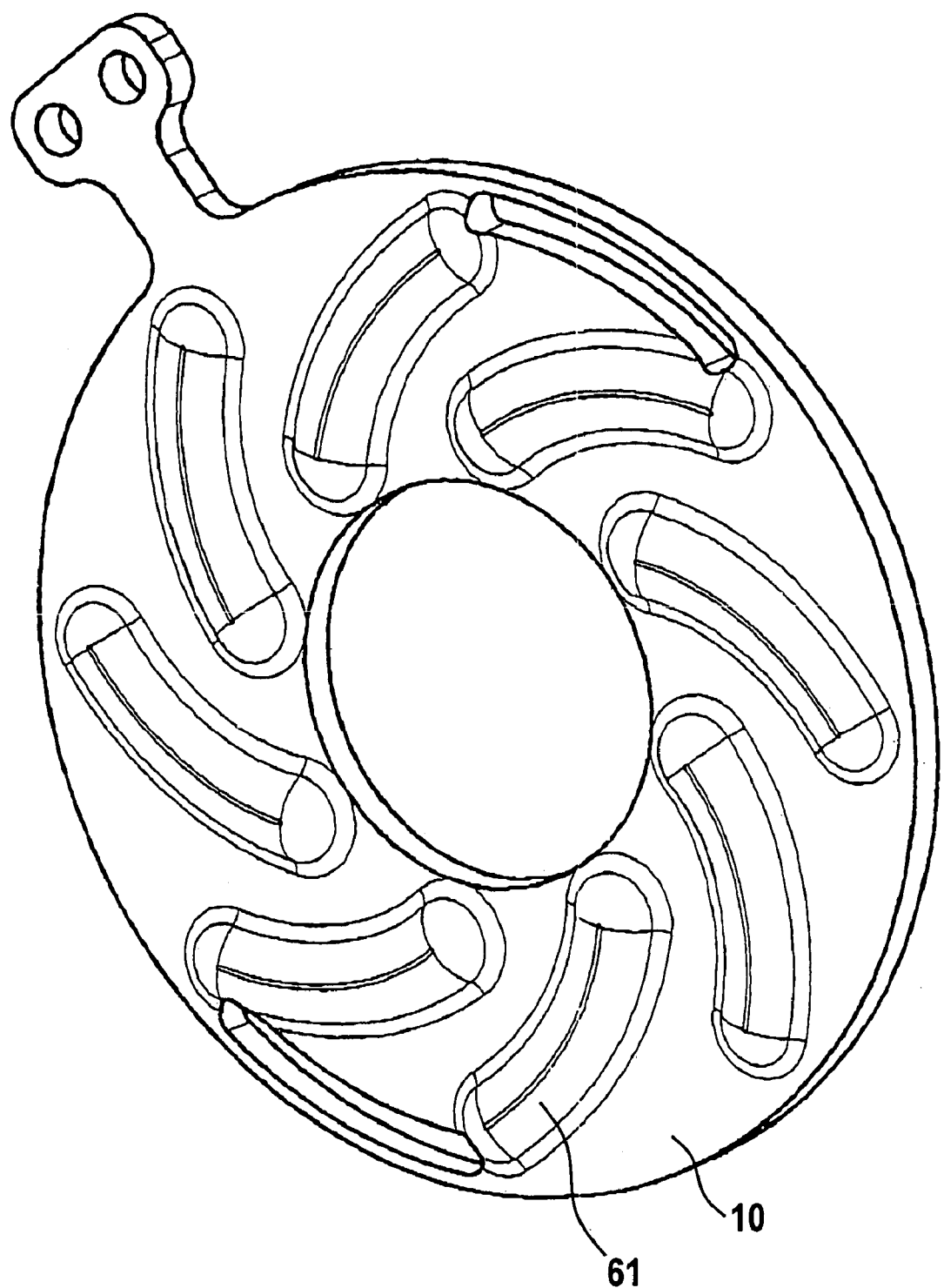
FIGS. 46 and 47 show additional designs of the disengaging springs.
Figure 47:
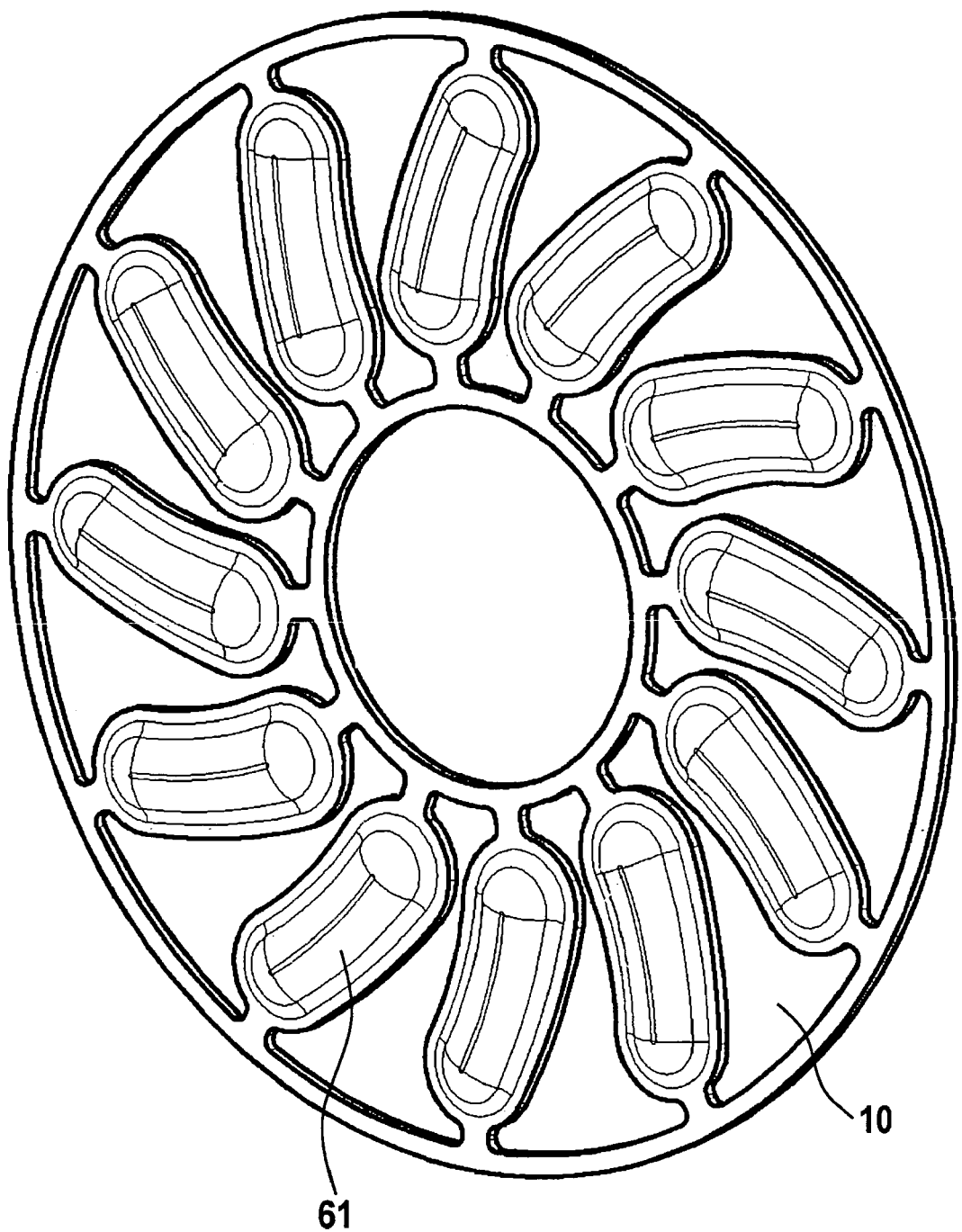

In FIGS. 46 and 47, disengaging spring 10, 7d is made of thin-walled sheet metal, in which spirally arranged cages 61 are also formed. This design of disengaging spring 10, 7d has the advantage that the latter may be case-hardened after the cages 61 are in place. That increases the permissible surface pressure in an advantageous way. This results in a reduction of the pressure ellipsis of the Hertzian stress, and thus in minimization of boring friction losses. Because of its axial and radial softness, disengaging spring 10, 7*d* is able to adapt to a corresponding movement. This also makes it possible to exploit the effect of the support point shift at disengaging spring 10, 7*d*.

The resilience of disengaging spring 10, 7*d* in the axial direction is achieved through another special design, as shown in FIG. 47. The primary characteristic is that cages 61 are formed individually and are connected to a thin outer and inner ring only by narrow bridging links. That enables them to adapt ideally to the deformation of the disk spring behind them.

An additional possibility is to place spiral cams on a relatively stiff case-hardened plate (disk spring 10) as rollers 31. A flat disk spring 7*a* (without beads 62) is braced against this plate. The outside support diameter of disk spring 7*a* is determined by the shape of the side opposite the spiral cams (cages 61) (torus), or an additionally inserted wire ring. This arrangement has the advantage that support point B of the spiral cams (cages 61) is completely uncoupled from support point A of the lever (disk spring 7*a*), with smaller influences on tolerance to be expected as a result. Within the bounds of the characteristic curve the force of disk spring 7*a* remains relatively constant (operation in the relatively flat range of the disk spring characteristic).

This variant is distinguished by high rigidity of the plate against "dishing" (movement of the disk spring), which is achieved through great thickness of the sheet metal in combination with a corresponding height of the spiral cams (cages 61).

In addition to these variants, there is also in principle the possibility of positioning a plurality of levers 7 (in the form of disk springs) in succession. This makes particular sense in applications with high axial forces and small construction space diameters. Preferably, wire rings are placed between the individual disk springs to minimize the friction that develops between them.

By increasing the hardness, for example by using an additional metal plate, it is possible to reduce the requisite number of rollers 31, which permits a greater inclination of cages 61 in the form of spirals (e.g., >30°). That increases the torsion angle, which results in a reduction of the adjusting torque and lower tolerance sensitivity.

As shown in FIG. 45, end stops may be provided at the ends of spiral-shaped cage 61 to limit travel. In terms of manufacturing, however, it is simpler instead of stops on disk spring 7 to make grooves at its edge, as depicted in FIG. 46.

Figure 48:
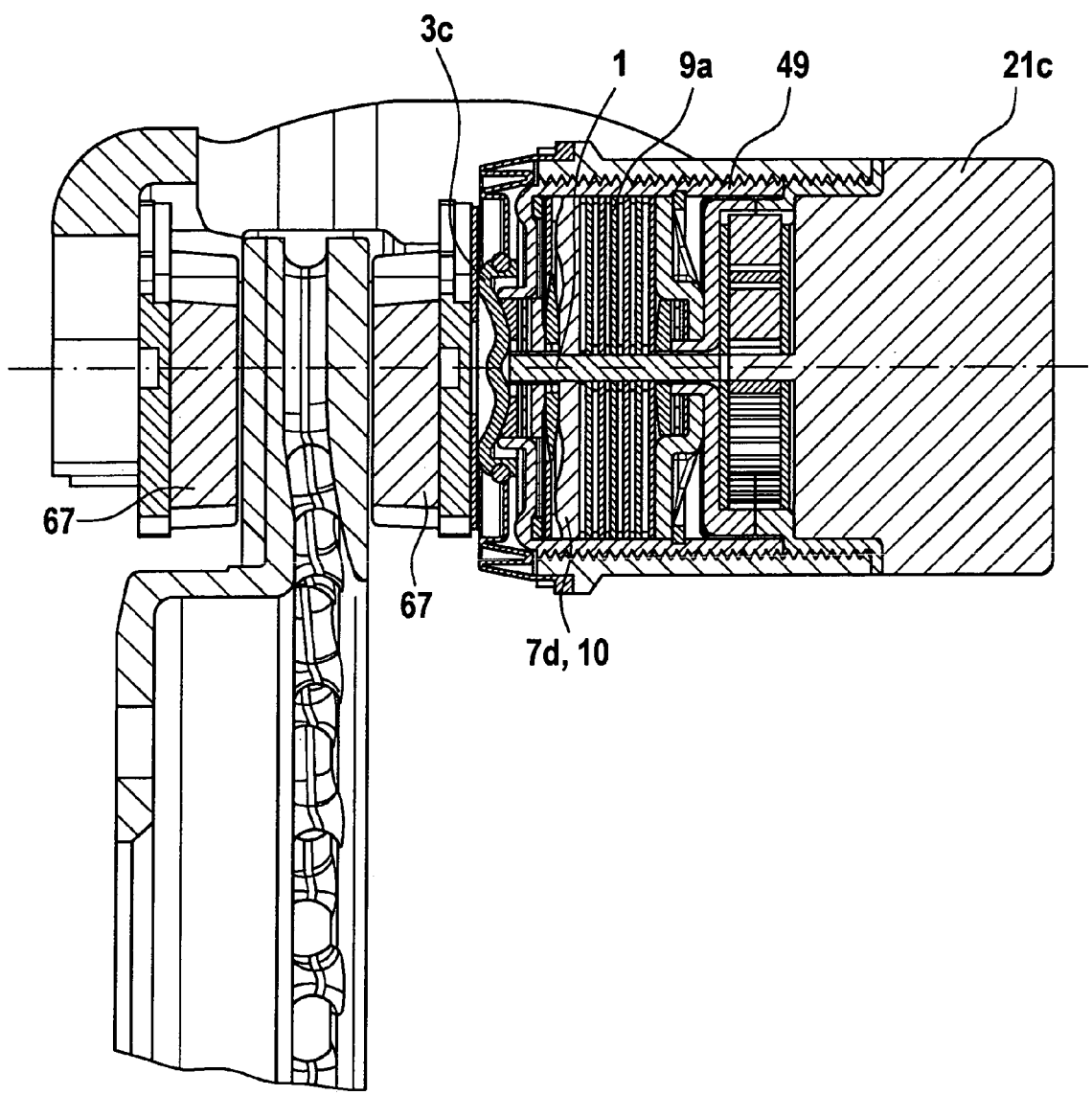
FIG. 48 shows use of the invention for an electrically actuated disk brake.

In order to need little actuating energy to actuate an adjusting device, FIG. 48 shows the use of the embodiment according to the present invention for an electrically actuated disk brake. Here spiral plate 7*d* of the disengager is of rigid design. This spiral plate 7*d* is pressed against by a multi-layered disk spring pack as energy storage mechanism 9*a*. To minimize friction, the individual disk springs of disk spring pack 9*a* are braced against each other through round rings. Rollers 31 are braced against spiral plate 7*d*, which is provided with a predefined raceway 53 (rocking curve); rotating spiral plate 7*d* results in a shift of support point B. In that way, rollers 31 exert an actuating force on the needle bearing and hence further on pressure plate 3*c*.

This force leads to actuation of brake shoes 67. The rotation of spiral plate 7*d* together with the disk spring pack is performed via central shaft 1. The rotary connection between shaft 1 and the combination of spiral plate 7*d* and disk springs 9*a* is implemented by gearing. It is important here for the connection to be axially movable.

All of these components are housed in a pot-shaped housing 49. This has fine threading on the outside, so that all components may be screwed into the housing of the brake. The appropriate air gap is set by twisting the thread. In operation, wear readjustment is implemented by controlled rotation of the thread by electric motor 21.

To achieve the adjusting torque there is an intermediate gear system, which is implemented in this case by a coupled planetary gear. This design makes a compact structure possible with relatively short axial dimensions.

Due to the special design of pressure plate 3*c* in FIG. 48, in which the contact surface with the thrust bearing is spherically shaped, and because a corresponding hollow sphere is formed on the thrust bearing ring, it is possible for pressure plate 3*c* to tilt spatially and thus adapt to uneven wear of the brake linings. That prevents lateral forces and thus the occurrence of friction forces on pressure plate 3*c*.

What is claimed is:

1. A lever system for actuating one of a clutch and a transmission brake, the lever system comprising:

a lever having a first end portion, a second end portion, a first support point, and a second support point, the lever providing an actuating force for the one of the clutch and the transmission brake; and a fulcrum displaceable between a first position engaging the lever at the first support point to a second position engaging the lever at the second support point;

wherein a displacement of the fulcrum from the first position to the second position changes the actuating force.

2. The lever system as recited in claim 1, wherein the one of the clutch and transmission brake is in a motor vehicle.

3. The lever system as recited in claim 1, further comprising:

an energy storage mechanism engaging at least one of the first end portion of the lever and the first support point, the energy storage mechanism including at least one of an elastomer and a metallic material and including one of a disk spring, a helical spring, a leg spring and a shock absorber; and a pressure plate, wherein the second end portion of the lever acts on the pressure plate.

4. The lever system as recited in claim 3, wherein the second end portion of the lever acts indirectly on the pressure plate.

5. The lever system as recited in claim 1, wherein the fulcrum is radially displaceable.

6. The lever system as recited in claim 1, wherein the fulcrum is circumferentially displaceable.

7. The lever system as recited in claim 5, wherein the fulcrum is displaceable simultaneously both radially and circumferentially.

8. The lever system as recited in claim 7, further comprising a cage for guiding the fulcrum along a spiral segment.

9. The lever system as recited in claim 7, wherein the fulcrum is guided along at least one full spiral.

10. The lever system as recited in claim 7, wherein the displacement of the fulcrum is guided along a path in a running surface.

11. The lever system as recited in claim 8, wherein the fulcrum is movable on a smooth running surface.

12. The lever system as recited in claim 11, wherein the running surface is a surface of the lever and is flat.

13. The lever system as recited in claim 11, wherein the running surface is a surface of the lever and is concave.

14. The lever system as recited in claim 1, further comprising:
   a pressure plate
   a first axial bearing, the axial bearing being displaceable in an axial direction; and
   a second lever, wherein the lever acts on the pressure plate indirectly via the first axial bearing and the second lever.

15. The lever system as recited in claim 14, wherein the second lever includes a disk spring.

16. The lever system as recited in claim 14, wherein the pressure plate is part of the clutch.

17. The lever system as recited in claim 1, wherein the fulcrum includes at least one roller body.

18. The lever system as recited in claim 17, wherein the at least one roller body includes at least two roller balls aligned adjacent one another in a pressing direction.

19. The lever system as recited in claim 17, wherein the at least one roller body includes a plurality of cylindrical rollers.

20. The lever system as recited in claim 19, wherein at least two of the plurality of cylindrical rollers are aligned adjacent one another in a pressing direction.

21. The lever system as recited in claim 17, further comprising meander-shaped spring having a changeable diameter and recesses, and wherein the at least one roller body is guided in the recesses.

22. The lever system as recited in claim 21, further comprising a ring-shaped spring having a neutral axis and an inner area, the ring-shaped spring being allocated to the meander-shaped spring at a radially inner area of the meander-shaped spring, the ring-shaped spring capable of swiveling around the neutral axis when a force acts axially on the inner area.

23. The lever system as recited in claim 17, further comprising a spring band actuator allocated for displacing the fulcrum.

24. The lever system as recited in claim 17, further comprising a shaft and a gate configured to displace the fulcrum and disposed eccentrically to a shaft and rotatable concentrically relative to the shaft.

25. The lever system as recited in claim 17, further comprising a concentric cone and an axially operating bearing actuating the concentric cone for displacing the fulcrum.

26. The lever system as recited in claim 17, further comprising a centrifugal force compensating device for displacing the fulcrum.

27. The lever system as recited in claim 1, further comprising:
   a holding ring; and
   a bridging link, wherein the lever includes a segmented ring having a circular surface and a radial axis and is connected to the holding ring by the bridging link, and wherein the fulcrum includes a rolling body rolling on the circular surface, and wherein the lever swivels around the radial axis due an action of forces on the lever.

28. The lever system as recited in claim 1, further comprising a support and wherein the fulcrum includes at least one roller body having two circumferential surfaces and an axis so that, when the fulcrum is displaced, one of the circumferential surfaces runs on the lever and the other circumferential surface runs on the support.

29. The lever system as recited in claim 1, further comprising a servomotor for displacing the fulcrum.

30. The lever system as recited in claim 29, further comprising a shaft, and wherein the servomotor is an electric motor disposed concentrically to the shaft.

31. The lever system as recited in claim 30, wherein the servomotor is a short electric motor having an upstream double planetary gear and is disposed concentrically to the shaft.

32. The lever system as recited in claim 29, further comprising a disengager, and a controller in operative connection with an automatic transmission, wherein the servomotor is disposed at the disengager and controlled by the controller.

33. The lever system as recited in claim 32, further comprising a hydraulic cylinder for displacing the fulcrum.

34. The lever system as recited in claim 1, further comprising a case having a floor, the lever being disposed in the case, wherein the floor acts as a support and a running surface for the fulcrum.

35. The lever system as recited in claim 34, wherein the case includes stamped sheet metal.

36. The lever system as recited in claim 34, wherein the floor includes a longitudinal profile in a same direction as a displacement of the fulcrum.

37. The lever system as recited in claim 34, further comprising an energy storage mechanism and abutment, the abutment disposed in a corner of the case at a distance from the case floor, an end of the energy storage mechanism facing away from the lever being supported by the abutment.

38. The lever system as recited in claim 37, wherein the abutment hooks into slots of the case.

39. The lever system as recited in claim 38, further comprising a joint bearing between the abutment and the energy storage mechanism.

40. The lever system as recited in claim 39, wherein the lever includes a stamped sheet metal part.

41. The lever system as recited in claim 40, wherein the lever includes profiling extending in a direction of a displacement of the fulcrum.

42. The lever system as recited in claim 41, wherein the energy storage mechanism engages the lever at a third support point.

43. The lever system as recited in claim 42, further comprising a pivot bearing at the third support point.

44. The lever system as recited in claim 1, wherein the fulcrum includes two rollers bodies, each having a hollow interior space, and further comprising a yoke having two ends, each end extending into one of the hollow interior spaces so as to form a kinematically connected double fulcrum.

45. The lever system as recited in claim 44, further comprising an adjusting nut coupled with the yoke.

46. The lever system as recited in claim 45, wherein the adjusting nut is disposed between the double fulcrum.

47. The lever system as recited in claim 46, further comprising an adjusting spindle drivable by an electric motor, wherein the adjusting nut has an internal thread which is engaged by the spindle.

48. The lever system as recited in claim 44, wherein the ends of the yoke have a spherical shape.

49. The lever system as recited in claim 47, wherein the internal thread and a thread of the adjusting spindle are mutually self-locking.

50. The lever system as recited in claim 47, wherein the internal thread and a thread of the adjusting spindle are not mutually self-locking.

51. The lever system as recited in claim 44, further comprising a servomotor and wherein the double fulcrum moves to a predetermined position if the servomotor fails.

52. The lever system as recited in claim 47, wherein the internal thread and a thread of the adjusting spindle are configured to slide with respect to each other.

53. The lever system as recited in claim 52, wherein the threads of the adjusting nut and of the adjusting spindle are equipped with a roller bearing with respect to each other.

54. The lever system as recited in claim 44, wherein the double fulcrum is configured to be guidable.

55. The lever system as recited in claim 44, wherein the double fulcrum is configured to be self-guiding.

56. The lever system as recited in claim 54, wherein the double fulcrum is configured to be positively guided.

57. The lever system as recited in claim 1, wherein the lever system exists in duplicate in a motor vehicle and is used for actuating a double clutch.

58. The lever system as recited in claim 1, wherein the lever system is used in a motor vehicle for an electrically actuatable disk brake.

59. The lever system as recited in claim 3, wherein the energy storage mechanism is displaceable with the fulcrum.

* * * * *